United States Patent
Eisen

(10) Patent No.: US 11,410,179 B2
(45) Date of Patent: *Aug. 9, 2022

(54) SYSTEMS AND METHODS OF GLOBAL IDENTIFICATION

(71) Applicant: THE 41ST PARAMETER, INC., Scottsdale, AZ (US)

(72) Inventor: Ori Eisen, Scottsdale, AZ (US)

(73) Assignee: THE 41ST PARAMETER, INC., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/092,045

(22) Filed: Nov. 6, 2020

(65) Prior Publication Data

US 2021/0224811 A1     Jul. 22, 2021

Related U.S. Application Data

(63) Continuation of application No. 16/511,618, filed on Jul. 15, 2019, now Pat. No. 10,853,813, which is a (Continued)

(51) Int. Cl.
    *G06K 5/00*     (2006.01)
    *G06Q 20/40*     (2012.01)
    *G06F 21/44*     (2013.01)

(52) U.S. Cl.
    CPC ......... *G06Q 20/4016* (2013.01); *G06F 21/44* (2013.01)

(58) Field of Classification Search
    CPC ............................ G06F 21/44; G06Q 20/4016
    See application file for complete search history.

(56) References Cited

U.S. PATENT DOCUMENTS

| | | | |
|---|---|---|---|
| 4,801,924 | A | 1/1989 | Burgmann et al. |
| 4,805,222 | A | 2/1989 | Young et al. |

(Continued)

FOREIGN PATENT DOCUMENTS

| | | |
|---|---|---|
| EP | 0 418 144 | 3/1991 |
| EP | 0 645 692 | 3/1995 |

(Continued)

OTHER PUBLICATIONS

U.S. Appl. No. 14/710,552, U.S. Pat. No. 9,990,631, Systems and Methods of Global Identification, May 12, 2015.

(Continued)

*Primary Examiner* — Thien M Le
(74) *Attorney, Agent, or Firm* — Knobbe, Martens, Olson & Bear, LLP

(57) ABSTRACT

The invention provides one or more consortia of networks that identify and share information about users and/or user devices interacting with the consortia. User devices may be identified, at least in part, by a delta of time parameter between a user device used and a reference time. Other parameters may be analyzed to identify a computer user and/or device and noteworthy transactions. The invention may be used for identity-based applications such as network security, the detection of fraudulent transactions, identity theft, ratings-based communities and law enforcement. User may be permitted to register user devices in order to control access for performing transactions.

20 Claims, 16 Drawing Sheets

Related U.S. Application Data continuation of application No. 15/971,203, filed on May 4, 2018, now Pat. No. 10,395,252, which is a continuation of application No. 14/710,552, filed on May 12, 2015, now Pat. No. 9,990,631, which is a continuation of application No. PCT/US2013/070146, filed on Nov. 14, 2013.

(60) Provisional application No. 61/726,518, filed on Nov. 14, 2012.

(56) References Cited

U.S. PATENT DOCUMENTS

| | | |
|---|---|---|
| 4,912,761 A | 3/1990 | Tan et al. |
| 4,924,387 A | 5/1990 | Jeppesen |
| 5,184,849 A | 2/1993 | Taylor |
| 5,491,735 A | 2/1996 | Hsieh |
| 5,519,827 A | 5/1996 | Mizushima |
| 5,521,907 A | 5/1996 | Ennis, Jr. |
| 5,557,686 A | 9/1996 | Brown et al. |
| 5,583,380 A | 12/1996 | Larsen et al. |
| 5,627,886 A | 5/1997 | Bowman |
| 5,679,940 A | 10/1997 | Templeton et al. |
| 5,721,765 A | 2/1998 | Smith |
| 5,724,424 A | 3/1998 | Giffor |
| 5,748,740 A | 5/1998 | Curry et al. |
| 5,748,780 A | 5/1998 | Stolfo et al. |
| 5,764,275 A | 6/1998 | Lappington et al. |
| 5,802,156 A | 9/1998 | Felger |
| 5,819,226 A | 10/1998 | Gopinathan et al. |
| 5,864,620 A | 1/1999 | Pettitt |
| 5,884,289 A | 3/1999 | Anderson et al. |
| 5,886,334 A | 3/1999 | D'Entremont |
| 5,892,900 A | 4/1999 | Ginter et al. |
| 5,894,510 A | 4/1999 | Felger |
| 5,899,980 A | 5/1999 | Wilf et al. |
| 5,903,646 A | 5/1999 | Rackman |
| 5,903,721 A | 5/1999 | Sixtus |
| 5,933,480 A | 8/1999 | Felger |
| 5,960,069 A | 9/1999 | Felger |
| 6,009,523 A | 12/1999 | Owaki et al. |
| 6,029,154 A | 2/2000 | Pettitt |
| 6,029,159 A | 2/2000 | Zorba et al. |
| 6,062,474 A | 5/2000 | Kroll |
| 6,078,907 A | 6/2000 | Lamm |
| 6,092,053 A | 7/2000 | Boesch et al. |
| 6,094,643 A | 7/2000 | Anderson et al. |
| 6,105,012 A | 8/2000 | Chang et al. |
| 6,112,240 A | 8/2000 | Pogue et al. |
| 6,148,407 A | 11/2000 | Aucsmith |
| 6,151,593 A | 11/2000 | Cho et al. |
| 6,163,604 A | 12/2000 | Baulier et al. |
| 6,163,771 A | 12/2000 | Walker et al. |
| 6,164,528 A | 12/2000 | Hills et al. |
| 6,205,436 B1 | 3/2001 | Rosen et al. |
| 6,209,104 B1 | 3/2001 | Jalili |
| 6,216,153 B1 | 4/2001 | Vortriede |
| 6,223,289 B1 | 4/2001 | Wall et al. |
| 6,282,276 B1 | 8/2001 | Felger |
| 6,295,605 B1 | 9/2001 | Dockter et al. |
| 6,327,384 B1 | 12/2001 | Hirao et al. |
| 6,330,546 B1 | 12/2001 | Gopinathan et al. |
| 6,370,648 B1 | 4/2002 | Diep |
| 6,405,922 B1 | 6/2002 | Kroll |
| 6,442,529 B1 | 8/2002 | Krishan et al. |
| 6,442,692 B1 | 8/2002 | Zilberman |
| 6,457,021 B1 | 9/2002 | Berkowitz et al. |
| 6,480,710 B1 | 11/2002 | Laybourn et al. |
| 6,509,847 B1 | 1/2003 | Anderson |
| 6,523,019 B1 | 2/2003 | Borthwick |
| 6,546,493 B1 | 4/2003 | Magdych et al. |
| 6,553,108 B1 | 4/2003 | Felger |
| 6,560,455 B2 | 5/2003 | Amin et al. |
| 6,567,099 B1 | 5/2003 | Dawson |
| 6,597,775 B2 | 7/2003 | Lawyer et al. |
| 6,646,765 B1 | 11/2003 | Barker et al. |
| 6,678,666 B1 | 1/2004 | Boulware |
| 6,687,390 B2 | 2/2004 | Avni et al. |
| 6,687,696 B2 | 2/2004 | Hofmann et al. |
| 6,689,055 B1 | 2/2004 | Mullen et al. |
| 6,718,363 B1 | 4/2004 | Ponte |
| 6,745,333 B1 | 6/2004 | Thomsen |
| 6,803,920 B2 | 10/2004 | Gossett et al. |
| 6,804,624 B2 | 10/2004 | Silverman |
| 6,850,606 B2 | 2/2005 | Lawyer et al. |
| 6,892,307 B1 | 5/2005 | Wood et al. |
| 6,895,507 B1 | 5/2005 | Tepler |
| 6,895,514 B1 | 5/2005 | Kermani |
| 6,898,709 B1 | 5/2005 | Teppler |
| 6,908,030 B2 | 6/2005 | Rajasekaran et al. |
| 6,937,569 B1 | 8/2005 | Sarkar et al. |
| 6,947,978 B2 | 9/2005 | Huffman |
| 6,954,532 B1 | 10/2005 | Handley et al. |
| 6,957,185 B1 | 10/2005 | Labaton |
| 6,957,339 B2 | 10/2005 | Shinzaki |
| 7,002,712 B2 | 2/2006 | Barker et al. |
| 7,003,670 B2 | 2/2006 | Heaven et al. |
| 7,007,174 B2 | 2/2006 | Wheeler et al. |
| 7,013,001 B1 | 3/2006 | Felger |
| 7,027,800 B2 | 4/2006 | Haumont et al. |
| 7,039,505 B1 | 5/2006 | Southard et al. |
| 7,039,699 B1 | 5/2006 | Narin et al. |
| 7,043,640 B2 | 5/2006 | Pritchard et al. |
| 7,089,310 B1 | 8/2006 | Ellerman et al. |
| 7,089,585 B1 | 8/2006 | Dharmarajan |
| 7,096,192 B1 | 8/2006 | Pettitt |
| 7,100,049 B2 | 8/2006 | Gasparini et al. |
| 7,103,570 B1 | 9/2006 | Morea et al. |
| 7,103,668 B1 | 9/2006 | Corley et al. |
| 7,120,590 B1 | 10/2006 | Eisen et al. |
| 7,130,858 B2 | 10/2006 | Ciaramitaro et al. |
| 7,143,095 B2 | 11/2006 | Barrett et al. |
| 7,158,622 B2 | 1/2007 | Lawyer et al. |
| 7,165,051 B2 | 1/2007 | Ronning et al. |
| 7,174,454 B2 | 2/2007 | Roskind |
| 7,191,467 B1 | 3/2007 | Dujari et al. |
| 7,197,646 B2 | 3/2007 | Fritz et al. |
| 7,206,938 B2 | 4/2007 | Bender et al. |
| 7,221,949 B2 | 5/2007 | Clough |
| 7,225,974 B2 | 6/2007 | Yamauchi |
| 7,237,717 B1 | 7/2007 | Rao et al. |
| 7,249,093 B1 | 7/2007 | King |
| 7,251,624 B1 | 7/2007 | Lee et al. |
| 7,260,837 B2 | 8/2007 | Abraham et al. |
| 7,263,492 B1 | 8/2007 | Suresh et al. |
| 7,263,506 B2 | 8/2007 | Lee et al. |
| 7,272,610 B2 | 9/2007 | Torres |
| 7,272,728 B2 | 9/2007 | Pierson et al. |
| 7,292,723 B2 | 11/2007 | Tedesco et al. |
| 7,293,096 B1 | 11/2007 | Foltak et al. |
| 7,296,088 B1 | 11/2007 | Padmanabhan et al. |
| 7,328,216 B2 | 2/2008 | Hofmann et al. |
| 7,330,824 B1 | 2/2008 | Kanojia et al. |
| 7,330,871 B2 | 2/2008 | Barber |
| 7,340,045 B2 | 3/2008 | Felger |
| 7,346,551 B2 | 3/2008 | Pe Jimenez et al. |
| 7,346,775 B2 | 3/2008 | Gasparinl et al. |
| 7,349,955 B1 | 3/2008 | Korb et al. |
| 7,359,962 B2 | 4/2008 | Willebeek-Lemair et al. |
| 7,363,170 B2 | 4/2008 | Seul et al. |
| 7,373,669 B2 | 5/2008 | Eisen |
| 7,376,618 B1 | 5/2008 | Anderson et al. |
| 7,379,891 B1 | 5/2008 | Donner et al. |
| 7,386,892 B2 | 6/2008 | Gilfix et al. |
| 7,404,087 B2 | 6/2008 | Teunen |
| 7,401,082 B2 | 7/2008 | Keene et al. |
| 7,403,922 B1 | 7/2008 | Lewis et al. |
| 7,406,441 B2 | 7/2008 | Kimura et al. |
| 7,428,587 B2 | 9/2008 | Rowland et al. |
| 7,436,780 B2 | 10/2008 | Stephens |
| 7,438,226 B2 | 10/2008 | Helsper et al. |
| 7,447,494 B2 | 11/2008 | Law et al. |
| 7,451,487 B2 | 11/2008 | Oliver et al. |
| 7,457,401 B2 | 11/2008 | Lawyer et al. |

(56) References Cited

U.S. PATENT DOCUMENTS

| | | |
|---|---|---|
| 7,457,823 B2 | 11/2008 | Shraim et al. |
| 7,475,242 B2 | 1/2009 | Baird et al. |
| 7,478,182 B2 | 1/2009 | Schweig |
| 7,487,350 B2 | 2/2009 | Utin |
| 7,496,752 B2 | 2/2009 | Yamaguchi et al. |
| 7,497,374 B2 | 3/2009 | Helsper et al. |
| 7,502,610 B2 | 3/2009 | Maher |
| 7,502,933 B2 | 3/2009 | Jakobsson et al. |
| 7,526,796 B2 | 4/2009 | Lulich et al. |
| 7,543,740 B2 | 6/2009 | Greene et al. |
| 7,552,090 B1 | 6/2009 | Barber |
| 7,555,458 B1 | 6/2009 | Felger |
| 7,562,221 B2 | 7/2009 | Nyström et al. |
| 7,577,620 B1 | 8/2009 | Donner |
| 7,581,112 B2 | 8/2009 | Brown et al. |
| 7,606,560 B2 | 10/2009 | Labrou et al. |
| 7,630,924 B1 | 12/2009 | Collins et al. |
| 7,631,808 B2 | 12/2009 | Kundu et al. |
| 7,657,626 B1 | 2/2010 | Zwicky |
| 7,660,902 B2 | 2/2010 | Graham et al. |
| 7,665,140 B2 | 2/2010 | Oliver et al. |
| 7,665,658 B2 | 2/2010 | Fields |
| 7,673,793 B2 | 3/2010 | Greene et al. |
| 7,685,629 B1 | 3/2010 | White et al. |
| 7,698,743 B2 | 4/2010 | Ohmori et al. |
| 7,708,200 B2 | 5/2010 | Helsper et al. |
| 7,711,846 B2 | 5/2010 | Padmanabhan et al. |
| 7,735,141 B1 | 6/2010 | Noel et al. |
| 7,739,402 B2 | 6/2010 | Roese et al. |
| 7,739,512 B2 | 6/2010 | Hawkes |
| 7,743,409 B2 | 6/2010 | Gonzalez et al. |
| 7,752,084 B2 | 7/2010 | Pettitt |
| 7,756,783 B2 | 7/2010 | Crooks |
| 7,761,379 B2 | 7/2010 | Zoldi et al. |
| 7,769,032 B1 | 8/2010 | Ou |
| 7,778,846 B2 | 8/2010 | Suresh et al. |
| 7,813,937 B1 | 10/2010 | Pathria et al. |
| 7,813,944 B1 | 10/2010 | Luk et al. |
| 7,814,029 B1 | 10/2010 | Siegel |
| 7,849,029 B2 | 12/2010 | Crooks et al. |
| 7,849,307 B2 | 12/2010 | Roskind |
| 7,853,526 B2 | 12/2010 | Milana |
| 7,853,533 B2 | 12/2010 | Eisen |
| 7,856,372 B2 | 12/2010 | Ullah |
| 7,860,783 B2 | 12/2010 | Yang et al. |
| 7,861,260 B2 | 12/2010 | Shkedi |
| 7,865,427 B2 | 1/2011 | Wright et al. |
| 7,882,217 B2 | 2/2011 | Katzir |
| 7,908,223 B2 | 3/2011 | Klein et al. |
| 7,908,645 B2 | 3/2011 | Varghese et al. |
| 7,930,285 B2 | 4/2011 | Abraham et al. |
| 7,933,984 B1 | 4/2011 | Smith et al. |
| 7,937,467 B2 | 5/2011 | Barber |
| 7,940,929 B1 | 5/2011 | Sengupta |
| 7,945,494 B2 | 5/2011 | Williams |
| 7,945,515 B2 | 5/2011 | Zoldi et al. |
| 7,949,564 B1 | 5/2011 | Hughes et al. |
| 7,958,029 B1 | 6/2011 | Bobich et al. |
| 7,958,246 B2 | 6/2011 | Barber |
| 7,961,857 B2 | 6/2011 | Zoldi et al. |
| 7,970,701 B2 | 6/2011 | Lewis et al. |
| 7,983,490 B1 | 7/2011 | Minter |
| 7,983,691 B1 | 7/2011 | Wong et al. |
| 7,991,716 B2 | 8/2011 | Crooks et al. |
| 7,995,996 B2 | 8/2011 | Link, II et al. |
| 8,001,376 B2 | 8/2011 | Utin |
| 8,001,597 B2 | 8/2011 | Crooks |
| 8,015,614 B2 | 9/2011 | Matsuzaki et al. |
| 8,015,921 B2 | 9/2011 | Leppanen et al. |
| 8,019,678 B2 | 9/2011 | Wright et al. |
| 8,020,763 B1 | 9/2011 | Kowalchyk et al. |
| 8,024,266 B1 | 9/2011 | Barber |
| 8,025,220 B2 | 9/2011 | Zoldi et al. |
| 8,027,439 B2 | 9/2011 | Zoldi et al. |
| 8,032,448 B2 | 10/2011 | Anderson et al. |
| 8,037,097 B2 | 10/2011 | Guo et al. |
| 8,037,511 B1 | 10/2011 | Lundy et al. |
| 8,041,597 B2 | 10/2011 | Li et al. |
| 8,042,164 B2 | 10/2011 | Sheynblat et al. |
| 8,046,271 B2 | 10/2011 | Jimenez et al. |
| 8,060,922 B2 | 11/2011 | Crichton et al. |
| 8,065,233 B2 | 11/2011 | Lee et al. |
| 8,090,648 B2 | 1/2012 | Zoldi et al. |
| 8,108,378 B2 | 1/2012 | Ott, IV et al. |
| 8,121,962 B2 | 2/2012 | Vaiciulis et al. |
| 8,122,082 B2 | 2/2012 | Klein |
| 8,126,816 B2 | 2/2012 | Mu et al. |
| 8,131,615 B2 | 3/2012 | Diev et al. |
| 8,140,689 B2 | 3/2012 | Barber |
| 8,141,148 B2 | 3/2012 | Thomas et al. |
| 8,145,560 B2 | 3/2012 | Kulkarni et al. |
| 8,145,762 B2 | 3/2012 | Barber |
| 8,150,968 B2 | 4/2012 | Barber |
| 8,151,327 B2 | 4/2012 | Eisen |
| 8,166,068 B2 | 4/2012 | Stevens |
| 8,175,897 B2 | 5/2012 | Lee et al. |
| 8,176,178 B2 | 5/2012 | Thomas et al. |
| 8,180,686 B2 | 5/2012 | Ryu et al. |
| 8,181,015 B2 | 5/2012 | Roskind |
| 8,185,953 B2 | 5/2012 | Rothstein et al. |
| 8,190,513 B2 | 5/2012 | Felger |
| 8,190,529 B2 | 5/2012 | Abe et al. |
| 8,191,148 B2 | 5/2012 | Oliver et al. |
| 8,201,099 B1 | 6/2012 | Osbourn et al. |
| 8,204,833 B2 | 6/2012 | Mu et al. |
| 8,209,744 B2 | 6/2012 | Zhu et al. |
| 8,209,760 B1 | 6/2012 | Hardman |
| 8,213,898 B2 | 7/2012 | Choti et al. |
| 8,214,232 B2 | 7/2012 | Tyler et al. |
| 8,214,285 B2 | 7/2012 | Hu et al. |
| 8,219,415 B2 | 7/2012 | Tyler et al. |
| 8,224,308 B1 | 7/2012 | Gavrylyako et al. |
| 8,224,348 B2 | 7/2012 | Bolon et al. |
| 8,229,844 B2 | 7/2012 | Felger |
| 8,250,631 B2 | 8/2012 | Iyengar et al. |
| 8,266,295 B2 | 9/2012 | Klein et al. |
| 8,271,891 B1 | 9/2012 | Osbourn et al. |
| 8,280,833 B2 | 10/2012 | Miltonberger |
| 8,290,838 B1 | 10/2012 | Thakur et al. |
| 8,295,898 B2 | 10/2012 | Ashfield et al. |
| 8,296,228 B1 | 10/2012 | Kloor |
| 8,296,229 B1 | 10/2012 | Yellin et al. |
| 8,296,245 B2 | 10/2012 | Barber et al. |
| 8,296,250 B2 | 10/2012 | Crooks et al. |
| 8,306,933 B2 | 11/2012 | Kawai et al. |
| 8,307,430 B1 | 11/2012 | Chen et al. |
| 8,311,907 B2 | 11/2012 | Klein et al. |
| 8,321,269 B2 | 11/2012 | Linden et al. |
| 8,326,759 B2 | 12/2012 | Hammad |
| 8,326,760 B2 | 12/2012 | Ma et al. |
| 8,326,763 B2 | 12/2012 | Zuili |
| 8,332,338 B2 | 12/2012 | Vaiciulis et al. |
| 8,332,522 B2 | 12/2012 | Barber |
| 8,370,253 B1 | 2/2013 | Grossman et al. |
| 8,370,638 B2 | 2/2013 | Duane et al. |
| 8,380,831 B2 | 2/2013 | Barber |
| 8,392,987 B2 | 3/2013 | Sasamura et al. |
| 8,407,112 B2 | 3/2013 | Walter |
| 8,407,798 B1 | 3/2013 | Lotem et al. |
| 8,417,587 B2 | 4/2013 | Jimenez et al. |
| 8,423,458 B2 | 4/2013 | Barber |
| 8,424,061 B2 | 4/2013 | Rosenor |
| 8,429,070 B2 | 4/2013 | Hu et al. |
| 8,438,134 B2 | 5/2013 | Wang et al. |
| 8,438,184 B1 | 5/2013 | Wang |
| 8,443,202 B2 | 5/2013 | White et al. |
| 8,452,715 B2 | 5/2013 | Barber |
| 8,453,226 B2 | 5/2013 | Hammad |
| 8,462,161 B1 | 6/2013 | Barber |
| 8,464,290 B2 | 6/2013 | Beyda et al. |
| 8,468,582 B2 | 6/2013 | Kuang et al. |
| 8,484,470 B2 | 7/2013 | Sakakihara et al. |
| 8,495,714 B2 | 7/2013 | Jones et al. |
| 8,516,439 B2 | 8/2013 | Brass et al. |

(56) References Cited

U.S. PATENT DOCUMENTS

| | | |
|---|---|---|
| 8,539,070 B2 | 9/2013 | Barber |
| 8,543,522 B2 | 9/2013 | Ryman-Tubb et al. |
| 8,548,137 B2 | 10/2013 | Zoldi et al. |
| 8,559,607 B2 | 10/2013 | Zoldi et al. |
| 8,567,669 B2 | 10/2013 | Griegel et al. |
| 8,588,816 B2 | 11/2013 | Collins |
| 8,601,109 B2 | 12/2013 | Johannsen |
| 8,611,856 B2 | 12/2013 | Yan et al. |
| 8,612,854 B2 | 12/2013 | Eisen et al. |
| 8,620,942 B1 | 12/2013 | Hoffman et al. |
| 8,631,006 B1 | 1/2014 | Haveliwala et al. |
| 8,660,539 B2 | 2/2014 | Khambete et al. |
| 8,661,119 B1 | 2/2014 | Jindal et al. |
| 8,676,684 B2 | 3/2014 | Newman et al. |
| 8,677,398 B2 | 3/2014 | Shkedi |
| 8,683,561 B2 | 3/2014 | Utin |
| 8,688,543 B2 | 4/2014 | Dominquez |
| 8,701,168 B2 | 4/2014 | Sastry et al. |
| 8,701,170 B1 | 4/2014 | Barber |
| 8,725,570 B2 | 5/2014 | Doughty et al. |
| 8,751,815 B2 | 6/2014 | Lunde et al. |
| 8,762,283 B2 | 6/2014 | Gerber et al. |
| 8,762,574 B2 | 6/2014 | Barber |
| 8,763,113 B2 | 6/2014 | Thomas et al. |
| 8,776,225 B2 | 7/2014 | Pierson et al. |
| 8,779,981 B2 | 7/2014 | Eisen et al. |
| 8,781,975 B2 | 7/2014 | Bennett et al. |
| 8,782,783 B2 | 7/2014 | Thomas et al. |
| 8,799,458 B2 | 8/2014 | Barber |
| 8,817,984 B2 | 8/2014 | Miller et al. |
| 8,826,393 B2 | 9/2014 | Eisen |
| 8,838,478 B2 | 9/2014 | Kretz et al. |
| 8,838,967 B1 | 9/2014 | Mills et al. |
| 8,862,514 B2 | 10/2014 | Eisen |
| 8,862,526 B2 | 10/2014 | Miltonberger |
| 8,874,735 B2 | 10/2014 | Barber |
| 8,880,097 B1 | 11/2014 | Xu et al. |
| 8,881,288 B1 | 11/2014 | Levy et al. |
| 8,938,671 B2 | 1/2015 | Eisen et al. |
| 8,954,560 B2 | 2/2015 | Johannsen |
| 8,966,276 B2 | 2/2015 | Nanopoulos et al. |
| 9,037,483 B1 | 5/2015 | Curcio et al. |
| 9,038,153 B2 | 5/2015 | Barber |
| 9,060,012 B2 | 6/2015 | Eisen |
| 9,075,896 B2 | 7/2015 | Barber |
| 9,083,735 B2 | 7/2015 | Reumann et al. |
| 9,098,617 B1 | 8/2015 | Pauley, Jr. et al. |
| 9,112,850 B1 | 8/2015 | Eisen |
| 9,118,646 B2 | 8/2015 | Pierson et al. |
| 9,172,691 B2 | 10/2015 | Barber |
| 9,177,293 B1 | 11/2015 | Gagnon et al. |
| 9,183,567 B2 | 11/2015 | Barber |
| 9,191,370 B2 | 11/2015 | Barber et al. |
| 9,196,004 B2 | 11/2015 | Eisen |
| 9,202,039 B2 | 12/2015 | Dandu et al. |
| 9,203,837 B2 | 12/2015 | Pierson et al. |
| 9,294,448 B2 | 3/2016 | Miller et al. |
| 9,298,677 B2 | 3/2016 | Tollinger et al. |
| 9,332,020 B2 | 5/2016 | Thomas et al. |
| 9,361,597 B2 | 6/2016 | Britton et al. |
| 9,378,500 B2 | 6/2016 | Jimenez et al. |
| 9,390,384 B2 | 7/2016 | Eisen |
| 9,396,331 B2 | 7/2016 | Eisen et al. |
| 9,412,123 B2 | 8/2016 | Eisen |
| 9,477,968 B2 | 10/2016 | Barber |
| 9,514,248 B1 | 12/2016 | Guan et al. |
| 9,514,446 B1 | 12/2016 | Rajkumar et al. |
| 9,521,161 B2 | 12/2016 | Reumann et al. |
| 9,521,551 B2 | 12/2016 | Eisen et al. |
| 9,559,852 B2 | 1/2017 | Miller et al. |
| 9,603,016 B1 | 3/2017 | Mills et al. |
| 9,633,201 B1 | 4/2017 | Katz |
| 9,699,164 B2 | 7/2017 | Barber |
| 9,702,961 B2 | 7/2017 | Shields |
| 9,703,983 B2 | 7/2017 | Eisen et al. |
| 9,712,497 B2 | 7/2017 | Barber et al. |
| 9,722,968 B2 | 8/2017 | Barber |
| 9,754,256 B2 | 9/2017 | Britton et al. |
| 9,754,311 B2 | 9/2017 | Eisen |
| 9,781,151 B1 | 10/2017 | McCorkendale et al. |
| 9,785,973 B2 | 10/2017 | Tollinger et al. |
| 9,916,393 B2 | 3/2018 | Barber |
| 9,948,629 B2 | 4/2018 | Eisen |
| 9,990,631 B2 | 6/2018 | Eisen |
| 10,021,099 B2 | 7/2018 | Eisen et al. |
| 10,037,529 B2 | 7/2018 | Barber |
| 10,089,679 B2 | 10/2018 | Eisen |
| 10,091,312 B1 | 10/2018 | Khanwalkar et al. |
| 10,123,368 B2* | 11/2018 | Gundavelli ............ H04W 76/12 |
| 10,231,120 B2* | 3/2019 | Nethi .................. H04L 63/1408 |
| 10,290,017 B2 | 5/2019 | Traasdahl et al. |
| 10,305,880 B2 | 5/2019 | Barber |
| 10,321,309 B2* | 6/2019 | Lee .................... H04W 12/0431 |
| 10,339,306 B1 | 7/2019 | Katz |
| 10,341,344 B2 | 7/2019 | Eisen et al. |
| 10,395,252 B2 | 8/2019 | Eisen |
| 10,402,854 B2 | 9/2019 | Barber |
| 10,417,637 B2 | 9/2019 | Eisen |
| 10,425,379 B2 | 9/2019 | Barber |
| 10,453,066 B2 | 10/2019 | Eisen |
| 10,535,093 B2 | 1/2020 | Eisen |
| 10,616,201 B2 | 4/2020 | Eisen |
| 10,642,899 B2 | 5/2020 | Barber |
| 10,679,216 B2 | 6/2020 | Barber |
| 10,691,751 B2 | 6/2020 | Atlas et al. |
| 10,726,151 B2 | 7/2020 | Eisen et al. |
| 10,728,350 B1 | 7/2020 | Khanwalkar et al. |
| 10,754,913 B2 | 8/2020 | Liodden et al. |
| 10,853,813 B2 | 12/2020 | Eisen |
| 10,862,889 B2 | 12/2020 | Eisen et al. |
| 10,902,327 B1 | 1/2021 | Yalov et al. |
| 10,956,732 B2* | 3/2021 | Le Henaff ............ G06K 9/6201 |
| 10,984,128 B1* | 4/2021 | Hoffer .................... G16H 50/20 |
| 10,999,298 B2 | 5/2021 | Eisen |
| 11,010,468 B1 | 5/2021 | Katz |
| 11,095,643 B2 | 8/2021 | Huffman et al. |
| 11,176,200 B2 | 11/2021 | Barber |
| 11,176,573 B2 | 11/2021 | Barber |
| 11,177,967 B2* | 11/2021 | Pala ...................... H04L 9/3242 |
| 11,195,225 B2 | 12/2021 | Eisen |
| 11,223,621 B2 | 1/2022 | Cano et al. |
| 11,238,456 B2 | 2/2022 | Eisen |
| 11,240,326 B1 | 2/2022 | Khanwalkar et al. |
| 2001/0011243 A1 | 8/2001 | Dembo et al. |
| 2001/0011304 A1 | 8/2001 | Wesigner et al. |
| 2001/0016840 A1 | 8/2001 | Hijikata et al. |
| 2001/0016876 A1 | 8/2001 | Kurth et al. |
| 2001/0018739 A1 | 8/2001 | Anderson et al. |
| 2001/0034712 A1 | 10/2001 | Colvin |
| 2001/0046096 A1 | 11/2001 | Worden |
| 2002/0035622 A1 | 3/2002 | Barber |
| 2002/0041328 A1 | 4/2002 | LeCompte et al. |
| 2002/0046157 A1 | 4/2002 | Solomon |
| 2002/0052852 A1 | 5/2002 | Bozeman |
| 2002/0056042 A1 | 5/2002 | van der Kaay et al. |
| 2002/0073046 A1 | 6/2002 | David |
| 2002/0073327 A1 | 6/2002 | Vellandi |
| 2002/0083079 A1 | 6/2002 | Meier et al. |
| 2002/0107853 A1 | 8/2002 | Hofmann et al. |
| 2002/0112171 A1 | 8/2002 | Ginter et al. |
| 2002/0128917 A1 | 9/2002 | Grounds |
| 2002/0138335 A1 | 9/2002 | Palmer et al. |
| 2002/0138577 A1 | 9/2002 | Teng et al. |
| 2002/0153424 A1 | 10/2002 | Li |
| 2002/0156724 A1 | 10/2002 | Levchin et al. |
| 2002/0156836 A1 | 10/2002 | Janosik, Jr. et al. |
| 2002/0166063 A1 | 11/2002 | Lachman et al. |
| 2002/0167965 A1 | 11/2002 | Beasley et al. |
| 2003/0002732 A1 | 1/2003 | Gossett et al. |
| 2003/0002740 A1 | 1/2003 | Melikian et al. |
| 2003/0014327 A1 | 1/2003 | Skantze |
| 2003/0033161 A1 | 2/2003 | Walker et al. |
| 2003/0033356 A1 | 2/2003 | Tran et al. |
| 2003/0070080 A1 | 4/2003 | Rosen |

(56) References Cited

U.S. PATENT DOCUMENTS

| | | |
|---|---|---|
| 2003/0074301 A1 | 4/2003 | Solomon |
| 2003/0076242 A1 | 4/2003 | Burns et al. |
| 2003/0105707 A1 | 6/2003 | Audebert et al. |
| 2003/0105854 A1 | 6/2003 | Thorsteinsson et al. |
| 2003/0113033 A1 | 6/2003 | Huang |
| 2003/0115334 A1 | 6/2003 | Bhat et al. |
| 2003/0115481 A1 | 6/2003 | Baird et al. |
| 2003/0120543 A1 | 6/2003 | Carey |
| 2003/0120586 A1 | 6/2003 | Litty |
| 2003/0140258 A1 | 7/2003 | Nelson et al. |
| 2003/0140283 A1 | 7/2003 | Nishio |
| 2003/0154214 A1 | 8/2003 | Tu et al. |
| 2003/0158751 A1 | 8/2003 | Suresh et al. |
| 2003/0163359 A1 | 8/2003 | Kanesaka |
| 2003/0163398 A1 | 8/2003 | Yoshioka et al. |
| 2003/0163413 A1 | 8/2003 | Wiczkowski |
| 2003/0172036 A1 | 9/2003 | Feigenbaum |
| 2003/0182551 A1 | 9/2003 | Frantz et al. |
| 2003/0208684 A1 | 11/2003 | Camacho et al. |
| 2003/0212618 A1 | 11/2003 | Keyes et al. |
| 2003/0233553 A1 | 12/2003 | Parks et al. |
| 2003/0237000 A1 | 12/2003 | Denton et al. |
| 2004/0001044 A1 | 1/2004 | Lucian et al. |
| 2004/0004733 A1 | 1/2004 | Barker et al. |
| 2004/0006553 A1 | 1/2004 | de Vries et al. |
| 2004/0010682 A1 | 1/2004 | Foster et al. |
| 2004/0027385 A1 | 2/2004 | Rekimoto et al. |
| 2004/0030912 A1 | 2/2004 | Merkle, Jr. et al. |
| 2004/0034652 A1 | 2/2004 | Hofmann et al. |
| 2004/0034794 A1 | 2/2004 | Mayer et al. |
| 2004/0066023 A1 | 4/2004 | Joseph |
| 2004/0073809 A1 | 4/2004 | Wing Keong |
| 2004/0088313 A1 | 5/2004 | Torres |
| 2004/0098618 A1 | 5/2004 | Kim et al. |
| 2004/0105431 A1 | 6/2004 | Monjas-Llorente et al. |
| 2004/0111621 A1 | 6/2004 | Himberger et al. |
| 2004/0111632 A1 | 6/2004 | Halperin |
| 2004/0117321 A1 | 6/2004 | Sancho |
| 2004/0139008 A1 | 7/2004 | Mascavaage, III |
| 2004/0153644 A1 | 8/2004 | McCorkendale et al. |
| 2004/0159699 A1 | 8/2004 | Nelson et al. |
| 2004/0166857 A1 | 8/2004 | Shim et al. |
| 2004/0171381 A1 | 9/2004 | Inselberg |
| 2004/0181598 A1 | 9/2004 | Paya et al. |
| 2004/0187023 A1 | 9/2004 | Alagna et al. |
| 2004/0203750 A1 | 10/2004 | Cowdrey et al. |
| 2004/0230820 A1 | 11/2004 | Hui Hsu et al. |
| 2004/0236696 A1 | 11/2004 | Aoki et al. |
| 2004/0236702 A1 | 11/2004 | Fink et al. |
| 2004/0254890 A1 | 12/2004 | Sancho et al. |
| 2004/0260876 A1 | 12/2004 | Singh et al. |
| 2004/0260922 A1 | 12/2004 | Goodman et al. |
| 2005/0008148 A1 | 1/2005 | Jacobson |
| 2005/0015601 A1 | 1/2005 | Tabi |
| 2005/0022020 A1 | 1/2005 | Fremberg et al. |
| 2005/0033653 A1 | 2/2005 | Eisenberg et al. |
| 2005/0033703 A1 | 2/2005 | Holdsworth |
| 2005/0039034 A1 | 2/2005 | Doyle et al. |
| 2005/0039219 A1 | 2/2005 | Cooper et al. |
| 2005/0074015 A1 | 4/2005 | Chari et al. |
| 2005/0076230 A1 | 4/2005 | Redenbaugh et al. |
| 2005/0085931 A1 | 4/2005 | Willeby |
| 2005/0097320 A1 | 5/2005 | Golan et al. |
| 2005/0108177 A1 | 5/2005 | Sancho |
| 2005/0111054 A1 | 5/2005 | Umeda |
| 2005/0113092 A1 | 5/2005 | Coppinger et al. |
| 2005/0131826 A1 | 6/2005 | Cook |
| 2005/0165643 A1 | 7/2005 | Wilson et al. |
| 2005/0185225 A1 | 8/2005 | Brawn et al. |
| 2005/0187883 A1 | 8/2005 | Bishop et al. |
| 2005/0188423 A1 | 8/2005 | Motsinger et al. |
| 2005/0204159 A1 | 9/2005 | Davis et al. |
| 2005/0210533 A1 | 9/2005 | Copeland et al. |
| 2005/0246551 A1 | 11/2005 | Dondl et al. |
| 2005/0278542 A1 | 12/2005 | Pierson et al. |
| 2006/0008779 A1 | 1/2006 | Shand et al. |
| 2006/0010072 A1 | 1/2006 | Eisen |
| 2006/0026669 A1 | 2/2006 | Zakas |
| 2006/0031938 A1 | 2/2006 | Choi |
| 2006/0048211 A1 | 3/2006 | Pierson et al. |
| 2006/0064346 A1 | 3/2006 | Steenstra et al. |
| 2006/0069619 A1 | 3/2006 | Walker et al. |
| 2006/0075492 A1 | 4/2006 | Golan et al. |
| 2006/0080263 A1 | 4/2006 | Willis et al. |
| 2006/0126829 A1 | 6/2006 | Lai |
| 2006/0130132 A1 | 6/2006 | Dharmarajan |
| 2006/0155985 A1 | 7/2006 | Canard et al. |
| 2006/0161501 A1 | 7/2006 | Waserstein et al. |
| 2006/0176984 A1 | 8/2006 | Lee et al. |
| 2006/0190331 A1 | 8/2006 | Tollinger et al. |
| 2006/0190489 A1 | 8/2006 | Watt et al. |
| 2006/0200855 A1 | 9/2006 | Willis |
| 2006/0200856 A1 | 9/2006 | Salowey et al. |
| 2006/0224898 A1 | 10/2006 | Ahmed |
| 2006/0237531 A1 | 10/2006 | Heffez et al. |
| 2006/0253327 A1 | 11/2006 | Morris et al. |
| 2006/0253328 A1 | 11/2006 | Kohli et al. |
| 2006/0264202 A1 | 11/2006 | Hagmeier et al. |
| 2006/0281541 A1 | 12/2006 | Nguyen et al. |
| 2006/0282660 A1 | 12/2006 | Varghese et al. |
| 2006/0284838 A1 | 12/2006 | Tsatalos et al. |
| 2007/0011078 A1 | 1/2007 | Jain et al. |
| 2007/0026942 A1 | 2/2007 | Kinsley et al. |
| 2007/0030528 A1 | 2/2007 | Quaeler et al. |
| 2007/0038568 A1 | 2/2007 | Greene et al. |
| 2007/0043837 A1 | 2/2007 | Kruse et al. |
| 2007/0061211 A1 | 3/2007 | Ramer et al. |
| 2007/0061273 A1 | 3/2007 | Greene et al. |
| 2007/0073630 A1 | 3/2007 | Greene et al. |
| 2007/0094594 A1 | 4/2007 | Matichuk et al. |
| 2007/0097076 A1 | 5/2007 | Gross |
| 2007/0097976 A1 | 5/2007 | Wood et al. |
| 2007/0101405 A1 | 5/2007 | Engle et al. |
| 2007/0107059 A1 | 5/2007 | Chasin et al. |
| 2007/0118892 A1 | 5/2007 | Sastry et al. |
| 2007/0124246 A1 | 5/2007 | Lawyer et al. |
| 2007/0162763 A1 | 7/2007 | Bender et al. |
| 2007/0198410 A1 | 8/2007 | Labgold et al. |
| 2007/0199054 A1 | 8/2007 | Florencio et al. |
| 2007/0204044 A1 | 8/2007 | Rice et al. |
| 2007/0208619 A1 | 9/2007 | Branam et al. |
| 2007/0214151 A1 | 9/2007 | Scott et al. |
| 2007/0220594 A1 | 9/2007 | Tulsyan |
| 2007/0233599 A1 | 10/2007 | Ganesan et al. |
| 2007/0233759 A1 | 10/2007 | Tomlinson et al. |
| 2007/0234070 A1 | 10/2007 | Horning et al. |
| 2007/0239604 A1 | 10/2007 | O'Connell et al. |
| 2007/0239606 A1 | 10/2007 | Eisen |
| 2007/0255821 A1 | 11/2007 | Ge et al. |
| 2007/0266257 A1 | 11/2007 | Camaisa et al. |
| 2007/0271466 A1 | 11/2007 | Mak |
| 2007/0294401 A1 | 12/2007 | Shkedi |
| 2007/0297459 A1 | 12/2007 | Cucos et al. |
| 2008/0002725 A1 | 1/2008 | Alicherry et al. |
| 2008/0005394 A1 | 1/2008 | Crooks |
| 2008/0010367 A1 | 1/2008 | Chen et al. |
| 2008/0010678 A1 | 1/2008 | Burdette et al. |
| 2008/0015988 A1 | 1/2008 | Brown et al. |
| 2008/0021801 A1 | 1/2008 | Song et al. |
| 2008/0040653 A1 | 2/2008 | Levine |
| 2008/0040802 A1 | 2/2008 | Pierson et al. |
| 2008/0043634 A1 | 2/2008 | Wang et al. |
| 2008/0045201 A1 | 2/2008 | Kies |
| 2008/0046562 A1 | 2/2008 | Butler |
| 2008/0049779 A1 | 2/2008 | Hopmann et al. |
| 2008/0052629 A1 | 2/2008 | Phillips et al. |
| 2008/0071682 A1 | 3/2008 | Dominguez |
| 2008/0098222 A1 | 4/2008 | Zilberman |
| 2008/0101277 A1 | 5/2008 | Taylor |
| 2008/0104070 A1 | 5/2008 | Lonchar |
| 2008/0104672 A1 | 5/2008 | Lunde et al. |
| 2008/0109307 A1 | 5/2008 | Ullah |
| 2008/0120195 A1 | 5/2008 | Shakkarwar |
| 2008/0120214 A1 | 5/2008 | Steele et al. |

(56) References Cited

U.S. PATENT DOCUMENTS

| | | |
|---|---|---|
| 2008/0121690 A1 | 5/2008 | Carani et al. |
| 2008/0126180 A1 | 5/2008 | Ullah |
| 2008/0133420 A1 | 6/2008 | Barber |
| 2008/0162200 A1 | 7/2008 | O'Sullivan et al. |
| 2008/0162202 A1 | 7/2008 | Khanna et al. |
| 2008/0162475 A1 | 7/2008 | Meggs |
| 2008/0163128 A1 | 7/2008 | Callanan et al. |
| 2008/0184355 A1 | 7/2008 | Walrath et al. |
| 2008/0184372 A1 | 7/2008 | Hoshina |
| 2008/0189790 A1 | 8/2008 | Park |
| 2008/0191007 A1 | 8/2008 | Keay |
| 2008/0201214 A1 | 8/2008 | Aaron |
| 2008/0204788 A1 | 8/2008 | Kelly et al. |
| 2008/0222706 A1 | 9/2008 | Renaud et al. |
| 2008/0235623 A1 | 9/2008 | Li |
| 2008/0239365 A1 | 10/2008 | Salgado et al. |
| 2008/0249820 A1 | 10/2008 | Pathria et al. |
| 2008/0255944 A1 | 10/2008 | Shah et al. |
| 2008/0281606 A1 | 11/2008 | Kitts |
| 2008/0281941 A1 | 11/2008 | Park et al. |
| 2008/0288299 A1 | 11/2008 | Schultz |
| 2008/0301281 A1 | 12/2008 | Wang et al. |
| 2008/0306830 A1 | 12/2008 | Lasa et al. |
| 2008/0313079 A1 | 12/2008 | Van Bosch et al. |
| 2008/0319774 A1 | 12/2008 | O'Sullivan et al. |
| 2008/0319841 A1 | 12/2008 | Oliver et al. |
| 2009/0017805 A1 | 1/2009 | Sarukkai et al. |
| 2009/0018940 A1 | 1/2009 | Wang et al. |
| 2009/0024971 A1 | 1/2009 | Willner et al. |
| 2009/0037602 A1 | 2/2009 | Patel et al. |
| 2009/0044279 A1 | 2/2009 | Crawford et al. |
| 2009/0044282 A1 | 2/2009 | Govindaraju |
| 2009/0055398 A1 | 2/2009 | Zhu et al. |
| 2009/0055929 A1 | 2/2009 | Lee et al. |
| 2009/0070664 A1 | 3/2009 | Gavin et al. |
| 2009/0083184 A1 | 3/2009 | Eisen |
| 2009/0089869 A1 | 4/2009 | Varghese |
| 2009/0106413 A1 | 4/2009 | Salo |
| 2009/0138590 A1 | 5/2009 | Lee et al. |
| 2009/0138593 A1 | 5/2009 | Kalavade |
| 2009/0157417 A1 | 6/2009 | Bradley et al. |
| 2009/0164269 A1 | 6/2009 | Gupta et al. |
| 2009/0171760 A1 | 7/2009 | Aarnio et al. |
| 2009/0177692 A1 | 7/2009 | Chagoly et al. |
| 2009/0183010 A1 | 7/2009 | Schnell et al. |
| 2009/0187625 A1 | 7/2009 | Blackstock et al. |
| 2009/0205031 A1 | 8/2009 | Sato et al. |
| 2009/0222308 A1 | 9/2009 | Zoldi et al. |
| 2009/0228340 A1 | 9/2009 | Bohannon |
| 2009/0228585 A1 | 9/2009 | Kosbab et al. |
| 2009/0234738 A1 | 9/2009 | Britton et al. |
| 2009/0241174 A1 | 9/2009 | Rajan et al. |
| 2009/0254430 A1 | 10/2009 | Cherenson |
| 2009/0260064 A1 | 10/2009 | Mcdowell et al. |
| 2009/0265773 A1 | 10/2009 | Schultz |
| 2009/0271306 A1 | 10/2009 | Pierson |
| 2009/0307141 A1 | 10/2009 | Kongalath et al. |
| 2009/0280777 A1 | 11/2009 | Doherty |
| 2009/0292568 A1 | 11/2009 | Khosravani et al. |
| 2009/0293128 A1 | 11/2009 | Lippmann et al. |
| 2009/0296907 A1 | 12/2009 | Vendrow et al. |
| 2009/0298480 A1 | 12/2009 | Khambete et al. |
| 2009/0307119 A1 | 12/2009 | Ahles et al. |
| 2009/0313134 A1 | 12/2009 | Faith et al. |
| 2009/0327333 A1 | 12/2009 | Diener et al. |
| 2010/0004965 A1 | 1/2010 | Eisen |
| 2010/0005013 A1 | 1/2010 | Uriarte |
| 2010/0030641 A1 | 2/2010 | Ibenforth |
| 2010/0030777 A1 | 2/2010 | Panwar et al. |
| 2010/0057623 A1 | 3/2010 | Kapur et al. |
| 2010/0057843 A1 | 3/2010 | Landsman et al. |
| 2010/0070606 A1 | 3/2010 | Shenfield et al. |
| 2010/0082136 A1 | 4/2010 | Rosenblatt et al. |
| 2010/0082972 A1 | 4/2010 | Benco et al. |
| 2010/0094767 A1 | 4/2010 | Miltonberger |
| 2010/0094768 A1 | 4/2010 | Miltonberger |
| 2010/0106611 A1 | 4/2010 | Paulsen et al. |
| 2010/0107225 A1 | 4/2010 | Spencer et al. |
| 2010/0121716 A1 | 5/2010 | Golan |
| 2010/0138299 A1 | 6/2010 | Preston et al. |
| 2010/0145960 A1 | 6/2010 | Casteel et al. |
| 2010/0153540 A1 | 6/2010 | Li et al. |
| 2010/0157848 A1 | 6/2010 | Das et al. |
| 2010/0161424 A1 | 6/2010 | Sylvain |
| 2010/0161566 A1 | 6/2010 | Adair et al. |
| 2010/0161728 A1 | 6/2010 | Drozt et al. |
| 2010/0169157 A1 | 7/2010 | Muhonen et al. |
| 2010/0169192 A1 | 7/2010 | Zoldi et al. |
| 2010/0192082 A1 | 7/2010 | Sodah |
| 2010/0199332 A1 | 8/2010 | Bachmann et al. |
| 2010/0199338 A1 | 8/2010 | Craddock et al. |
| 2010/0211464 A1 | 8/2010 | Zhu et al. |
| 2010/0223105 A1 | 9/2010 | Gassewitz et al. |
| 2010/0223145 A1 | 9/2010 | Dragt |
| 2010/0228624 A1 | 9/2010 | Morris et al. |
| 2010/0228625 A1 | 9/2010 | Priyadarshan et al. |
| 2010/0228638 A1 | 9/2010 | Mikan et al. |
| 2010/0235220 A1 | 9/2010 | Guha et al. |
| 2010/0257065 A1 | 10/2010 | Gupta et al. |
| 2010/0262467 A1 | 10/2010 | Barnhill, Jr. et al. |
| 2010/0274678 A1 | 10/2010 | Rolf et al. |
| 2010/0293094 A1 | 11/2010 | Kolkowitz et al. |
| 2010/0306827 A1 | 12/2010 | Esteve Balducci et al. |
| 2010/0313009 A1 | 12/2010 | Combet et al. |
| 2010/0321296 A1 | 12/2010 | Gross |
| 2010/0333170 A1 | 12/2010 | Cox et al. |
| 2011/0015497 A1 | 1/2011 | Eggenberger et al. |
| 2011/0022483 A1 | 1/2011 | Hammad |
| 2011/0022517 A1 | 1/2011 | Hammad |
| 2011/0023115 A1 | 1/2011 | Wright |
| 2011/0029339 A1 | 2/2011 | Callahan |
| 2011/0035302 A1 | 2/2011 | Martell et al. |
| 2011/0047072 A1 | 2/2011 | Ciurea |
| 2011/0055627 A1 | 3/2011 | Zawacki et al. |
| 2011/0082768 A1 | 4/2011 | Eisen |
| 2011/0082858 A1 | 4/2011 | Yu et al. |
| 2011/0106610 A1 | 5/2011 | Landis et al. |
| 2011/0112901 A1 | 5/2011 | Fried et al. |
| 2011/0119267 A1 | 5/2011 | Forman et al. |
| 2011/0153426 A1 | 6/2011 | Reddy et al. |
| 2011/0161228 A1 | 6/2011 | Suzuki et al. |
| 2011/0173281 A1 | 7/2011 | Smith |
| 2011/0184778 A1 | 7/2011 | Graepel et al. |
| 2011/0194679 A1 | 8/2011 | Patisaul et al. |
| 2011/0218860 A1 | 9/2011 | Barber |
| 2011/0225091 A1 | 9/2011 | Plastina et al. |
| 2011/0238575 A1 | 9/2011 | Nightengale et al. |
| 2011/0251951 A1 | 10/2011 | Kolkowitz et al. |
| 2011/0258118 A1 | 10/2011 | Ciurea |
| 2011/0282778 A1 | 11/2011 | Wright et al. |
| 2011/0288932 A1 | 11/2011 | Marks et al. |
| 2011/0302087 A1 | 12/2011 | Crooks |
| 2011/0302096 A1 | 12/2011 | Lowry |
| 2011/0307341 A1 | 12/2011 | Zohar et al. |
| 2011/0313847 A1 | 12/2011 | Cao et al. |
| 2011/0314557 A1 | 12/2011 | Marshall |
| 2012/0022883 A1 | 1/2012 | Morrison |
| 2012/0030083 A1 | 2/2012 | Newman et al. |
| 2012/0030757 A1 | 2/2012 | Baikalov et al. |
| 2012/0030771 A1 | 2/2012 | Pierson et al. |
| 2012/0036042 A1 | 2/2012 | Graylin et al. |
| 2012/0036261 A1 | 2/2012 | Salazar et al. |
| 2012/0041841 A1 | 2/2012 | Hu et al. |
| 2012/0042361 A1 | 2/2012 | Wong et al. |
| 2012/0054136 A1 | 3/2012 | Maulik |
| 2012/0054847 A1 | 3/2012 | Schultz et al. |
| 2012/0059711 A1 | 3/2012 | Ramer et al. |
| 2012/0078708 A1 | 3/2012 | Taylor et al. |
| 2012/0084203 A1 | 4/2012 | Mehew et al. |
| 2012/0084860 A1 | 4/2012 | Cao et al. |
| 2012/0094639 A1 | 4/2012 | Carlson et al. |
| 2012/0096076 A1 | 4/2012 | Chan |
| 2012/0101939 A1 | 4/2012 | Kasower |
| 2012/0150742 A1 | 6/2012 | Poon et al. |

(56) References Cited

U.S. PATENT DOCUMENTS

| | | |
|---|---|---|
| 2012/0150750 A1 | 6/2012 | Law et al. |
| 2012/0157062 A1 | 6/2012 | Kim et al. |
| 2012/0158586 A1 | 6/2012 | Ganti et al. |
| 2012/0166533 A1 | 6/2012 | Rubinstein et al. |
| 2012/0173465 A1 | 7/2012 | Hore et al. |
| 2012/0179558 A1 | 7/2012 | Fischer |
| 2012/0197981 A1 | 8/2012 | Chan |
| 2012/0204262 A1 | 8/2012 | Thomas et al. |
| 2012/0215777 A1 | 8/2012 | Malik et al. |
| 2012/0215896 A1 | 8/2012 | Johannsen |
| 2012/0216282 A1 | 8/2012 | Pappu et al. |
| 2012/0221404 A1 | 8/2012 | Ahmed et al. |
| 2012/0221470 A1 | 8/2012 | Lyon |
| 2012/0222111 A1 | 8/2012 | Oliver et al. |
| 2012/0233640 A1 | 9/2012 | Odryna et al. |
| 2012/0233665 A1 | 9/2012 | Ranganathan et al. |
| 2012/0239553 A1 | 9/2012 | Gonen et al. |
| 2012/0239574 A1 | 9/2012 | Smith et al. |
| 2012/0239774 A1 | 9/2012 | Tola et al. |
| 2012/0254320 A1 | 10/2012 | Dove et al. |
| 2012/0271860 A1 | 10/2012 | Graham, Jr. et al. |
| 2012/0278127 A1 | 11/2012 | Kirakosyan et al. |
| 2012/0278321 A1 | 11/2012 | Traub et al. |
| 2012/0295580 A1 | 11/2012 | Corner |
| 2012/0297380 A1 | 11/2012 | Colbert et al. |
| 2012/0299925 A1 | 11/2012 | Najork et al. |
| 2012/0311162 A1 | 12/2012 | Paulsen et al. |
| 2012/0323788 A1 | 12/2012 | Keresman et al. |
| 2012/0323836 A1 | 12/2012 | Wright et al. |
| 2012/0324027 A1 | 12/2012 | Vaynblat et al. |
| 2012/0324060 A1 | 12/2012 | Afergan et al. |
| 2012/0330787 A1 | 12/2012 | Hanson et al. |
| 2013/0005299 A1 | 1/2013 | Raleigh |
| 2013/0006743 A1 | 1/2013 | Moore et al. |
| 2013/0018789 A1 | 1/2013 | Kaufmann |
| 2013/0018791 A1 | 1/2013 | Mendicino et al. |
| 2013/0024300 A1 | 1/2013 | Choudhuri et al. |
| 2013/0036304 A1 | 2/2013 | Lin et al. |
| 2013/0040603 A1 | 2/2013 | Stahlberg et al. |
| 2013/0042298 A1 | 2/2013 | Plaza Fonseca et al. |
| 2013/0054433 A1 | 2/2013 | Giard et al. |
| 2013/0055388 A1 | 2/2013 | Thomas et al. |
| 2013/0073463 A1 | 3/2013 | Dimmick et al. |
| 2013/0073473 A1 | 3/2013 | Heath |
| 2013/0080327 A1 | 3/2013 | Baldrick et al. |
| 2013/0085841 A1 | 4/2013 | Singleton et al. |
| 2013/0097673 A1 | 4/2013 | Meehan et al. |
| 2013/0097701 A1 | 4/2013 | Moyle et al. |
| 2013/0097706 A1 | 4/2013 | Titonis et al. |
| 2013/0103482 A1 | 4/2013 | Song et al. |
| 2013/0103629 A1 | 4/2013 | Vaiciulis et al. |
| 2013/0110623 A1 | 5/2013 | Kilroy et al. |
| 2013/0110637 A1 | 5/2013 | Bott |
| 2013/0111592 A1 | 5/2013 | Zhu et al. |
| 2013/0117832 A1 | 5/2013 | Gandhi |
| 2013/0124329 A1 | 5/2013 | Tengler |
| 2013/0124332 A1 | 5/2013 | Doughty et al. |
| 2013/0124333 A1 | 5/2013 | Doughty et al. |
| 2013/0144539 A1 | 6/2013 | Allen et al. |
| 2013/0148525 A1 | 6/2013 | Sanchez et al. |
| 2013/0159192 A1 | 6/2013 | Partridge et al. |
| 2013/0159195 A1 | 6/2013 | Kirillin et al. |
| 2013/0185764 A1 | 7/2013 | Krstić et al. |
| 2013/0197998 A1 | 8/2013 | Buhrmann et al. |
| 2013/0198066 A1 | 8/2013 | Wall et al. |
| 2013/0204793 A1 | 8/2013 | Kerridge et al. |
| 2013/0217330 A1 | 8/2013 | Gardenfors et al. |
| 2013/0226692 A1 | 8/2013 | Kouladjie et al. |
| 2013/0226717 A1 | 8/2013 | Ahluwalia et al. |
| 2013/0253965 A1 | 9/2013 | Joseph |
| 2013/0290119 A1 | 10/2013 | Howe et al. |
| 2013/0325601 A1 | 12/2013 | Shekhawat et al. |
| 2013/0326007 A1 | 12/2013 | Turner et al. |
| 2013/0339186 A1 | 12/2013 | French |
| 2013/0339848 A1 | 12/2013 | Patil et al. |
| 2014/0019542 A1 | 1/2014 | Rao et al. |
| 2014/0032902 A1 | 1/2014 | Agrawal et al. |
| 2014/0095320 A1 | 4/2014 | Sivaramakrishnan et al. |
| 2014/0114821 A1 | 4/2014 | Yoshioka et al. |
| 2014/0120864 A1 | 5/2014 | Manolarakis et al. |
| 2014/0122343 A1 | 5/2014 | Einav et al. |
| 2014/0122697 A1 | 5/2014 | Liu et al. |
| 2014/0129322 A1 | 5/2014 | George et al. |
| 2014/0148197 A1 | 5/2014 | Shields |
| 2014/0180802 A1 | 6/2014 | Boal |
| 2014/0197950 A1 | 7/2014 | Shupp et al. |
| 2014/0258125 A1 | 9/2014 | Gerber et al. |
| 2014/0289867 A1 | 9/2014 | Bukai |
| 2014/0361926 A1 | 12/2014 | Eisen et al. |
| 2015/0026027 A1 | 1/2015 | Priess et al. |
| 2015/0039596 A1 | 2/2015 | Stewart |
| 2015/0046989 A1 | 2/2015 | Oberheide et al. |
| 2015/0088980 A1 | 3/2015 | Lakes et al. |
| 2015/0106198 A1 | 4/2015 | Miller et al. |
| 2015/0106270 A1 | 4/2015 | Burrell et al. |
| 2015/0120717 A1 | 4/2015 | Kim et al. |
| 2015/0127825 A1 | 5/2015 | Johannsen |
| 2015/0142767 A1 | 5/2015 | Wu et al. |
| 2015/0161207 A1 | 6/2015 | Li et al. |
| 2015/0186901 A1 | 7/2015 | Miltonberger |
| 2015/0188897 A1 | 7/2015 | Grigorovici et al. |
| 2015/0193769 A1 | 7/2015 | Barber |
| 2015/0193821 A1 | 7/2015 | Izumori et al. |
| 2015/0205978 A1 | 7/2015 | Eisen et al. |
| 2015/0235258 A1 | 8/2015 | Shah et al. |
| 2015/0235275 A1 | 8/2015 | Shah et al. |
| 2015/0242861 A9 | 8/2015 | Baldassano |
| 2015/0254658 A1 | 9/2015 | Bondesen et al. |
| 2015/0294316 A1 | 10/2015 | Eisen |
| 2015/0326517 A1* | 11/2015 | Block .................... H04L 67/12 726/7 |
| 2015/0350856 A1 | 12/2015 | Circosta et al. |
| 2016/0034954 A1 | 2/2016 | Tollinger et al. |
| 2016/0036782 A1 | 2/2016 | Jeffrey et al. |
| 2016/0125461 A1 | 5/2016 | Sivaramakrishnan et al. |
| 2016/0182657 A1 | 6/2016 | Mukherjee et al. |
| 2016/0246581 A1 | 8/2016 | Jimenez et al. |
| 2016/0275545 A1 | 9/2016 | Dasdan et al. |
| 2016/0321701 A1 | 11/2016 | Artman et al. |
| 2017/0039571 A1 | 2/2017 | Eisen |
| 2017/0053208 A1 | 2/2017 | Krishnamurthy et al. |
| 2017/0142106 A1 | 5/2017 | Eisen et al. |
| 2018/0089459 A1 | 3/2018 | Eisen et al. |
| 2018/0101890 A1 | 4/2018 | Eisen |
| 2018/0108029 A1 | 4/2018 | Sinha et al. |
| 2018/0121915 A1 | 5/2018 | Britton et al. |
| 2018/0227299 A1* | 8/2018 | Varon ................... H04W 76/10 |
| 2018/0262478 A1 | 9/2018 | Eisen |
| 2019/0028472 A1 | 1/2019 | Eisen |
| 2019/0066192 A1 | 2/2019 | Eisen |
| 2019/0340642 A1 | 11/2019 | Barber |
| 2019/0356659 A1 | 11/2019 | Eisen et al. |
| 2019/0370859 A1 | 12/2019 | Traasdahl et al. |
| 2020/0013064 A1 | 1/2020 | Eisen |
| 2020/0034845 A1 | 1/2020 | Eisen |
| 2020/0064444 A1* | 2/2020 | Regani ................... G01S 7/415 |
| 2020/0092287 A1 | 3/2020 | Cano et al. |
| 2020/0218763 A1 | 7/2020 | Barber |
| 2020/0219173 A1 | 7/2020 | Eisen |
| 2020/0226186 A1 | 7/2020 | Liodden et al. |
| 2020/0294086 A1 | 9/2020 | Traasdahl et al. |
| 2020/0380162 A1 | 12/2020 | Eisen et al. |
| 2021/0226950 A1 | 7/2021 | Eisen |
| 2021/0281580 A1 | 9/2021 | Eisen |
| 2021/0336955 A1 | 10/2021 | Huffman et al. |

FOREIGN PATENT DOCUMENTS

| | | |
|---|---|---|
| EP | 0 923 039 | 6/1999 |
| EP | 1 067 792 | 1/2001 |
| EP | 1 209 935 | 5/2002 |
| EP | 1 256 911 | 11/2002 |
| EP | 1 201 070 B1 | 6/2006 |
| EP | 1 703 382 | 9/2006 |

(56) References Cited

FOREIGN PATENT DOCUMENTS

| | | |
|---|---|---|
| EP | 1 197 032 B1 | 8/2007 |
| EP | 2 154 891 | 2/2010 |
| EP | 2 323 091 | 5/2011 |
| EP | 3 583 758 | 4/2021 |
| EP | 3 937 456 | 1/2022 |
| GB | 2 491 101 | 11/2012 |
| GB | 2 492 604 | 1/2013 |
| JP | 05-257602 | 10/1993 |
| JP | 2000-020467 | 1/2000 |
| JP | 2000-099250 | 4/2000 |
| JP | 2000-137755 | 5/2000 |
| JP | 2000-242582 | 9/2000 |
| JP | 2000-276281 | 10/2000 |
| JP | 2002-007697 | 1/2002 |
| JP | 2002-297869 | 10/2002 |
| JP | 2002-304568 | 10/2002 |
| JP | 2003-050910 | 2/2003 |
| JP | 2005-063216 | 3/2005 |
| JP | 2005-115644 | 4/2005 |
| JP | 2005-135431 | 5/2005 |
| JP | 2006-004333 | 1/2006 |
| JP | 2007-018446 | 1/2007 |
| JP | 2007-041642 | 2/2007 |
| JP | 2007-272520 | 10/2007 |
| JP | 2007-282249 | 10/2007 |
| JP | 2008-022298 | 1/2008 |
| JP | 2008-065363 | 3/2008 |
| JP | 2008-171315 | 7/2008 |
| JP | 2008-535062 | 8/2008 |
| JP | 2008-535124 | 8/2008 |
| JP | 2008-242805 | 10/2008 |
| JP | 2008-243008 | 10/2008 |
| JP | 2008-257434 | 10/2008 |
| JP | 2008-269229 | 11/2008 |
| JP | 4202314 | 12/2008 |
| JP | 2009-017298 | 1/2009 |
| JP | 2009-048538 | 3/2009 |
| JP | 2009-512940 | 3/2009 |
| JP | 2009-122880 | 6/2009 |
| JP | 2009-175984 | 8/2009 |
| JP | 2009-271661 | 11/2009 |
| JP | 2010-020728 | 1/2010 |
| JP | 2010-061254 | 3/2010 |
| JP | 2010-122955 | 6/2010 |
| JP | 2010-122956 | 6/2010 |
| JP | 2010-146153 | 7/2010 |
| JP | 2010-225040 | 10/2010 |
| JP | 2010-250664 | 11/2010 |
| JP | 2011-065531 | 3/2011 |
| JP | 2011-134252 | 7/2011 |
| JP | 2011-159264 | 8/2011 |
| JP | 2011-159307 | 8/2011 |
| JP | 2011-524560 | 9/2011 |
| JP | 2011-210263 | 10/2011 |
| JP | 2012-234503 | 11/2012 |
| JP | 5191376 | 5/2013 |
| JP | 5216932 | 6/2013 |
| JP | 2015-503148 | 1/2015 |
| KR | 10-1999-0015738 | 3/1999 |
| KR | 10-0645983 | 11/2006 |
| KR | 10-2008-0044558 | 5/2008 |
| KR | 10-2009-0051977 | 9/2009 |
| KR | 10-2010-0085888 | 7/2010 |
| WO | WO 96/041488 | 12/1996 |
| WO | WO 97/003410 | 1/1997 |
| WO | WO 97/023816 | 7/1997 |
| WO | WO 99/050775 | 10/1999 |
| WO | WO 01/011450 | 2/2001 |
| WO | WO 01/033520 | 5/2001 |
| WO | WO 01/086877 | 11/2001 |
| WO | WO 01/095550 | 12/2001 |
| WO | WO 01/097134 | 12/2001 |
| WO | WO 02/001462 | 1/2002 |
| WO | WO 02/071176 | 9/2002 |
| WO | WO 02/091226 | 11/2002 |
| WO | WO 03/017155 | 2/2003 |
| WO | WO 03/025868 | 3/2003 |
| WO | WO 03/075197 | 9/2003 |
| WO | WO 03/075197 A3 | 12/2003 |
| WO | WO 02/037219 A9 | 5/2004 |
| WO | WO 2004/038997 | 5/2004 |
| WO | WO 2005/038818 | 4/2005 |
| WO | WO 2005/099166 | 10/2005 |
| WO | WO 2006/135367 | 12/2006 |
| WO | WO 2007/001394 | 1/2007 |
| WO | WO 2007/045818 | 4/2007 |
| WO | WO 2007/072238 | 6/2007 |
| WO | WO 2007/075573 | 7/2007 |
| WO | WO 2008/029828 | 3/2008 |
| WO | WO 2008/054849 | 5/2008 |
| WO | WO 2009/132148 | 10/2009 |
| WO | WO 2011/081818 | 7/2011 |
| WO | WO 2011/104864 | 9/2011 |
| WO | WO 2012/054646 | 4/2012 |
| WO | WO 2012/061801 | 5/2012 |
| WO | WO 2012/142121 | 10/2012 |
| WO | WO 2012/142584 | 10/2012 |
| WO | WO 2013/006538 | 1/2013 |
| WO | WO 2013/070687 | 5/2013 |
| WO | WO 2013/074750 | 5/2013 |
| WO | WO 2013/142722 | 9/2013 |
| WO | WO 2014/022813 | 2/2014 |
| WO | WO 2017/040799 | 3/2017 |
| WO | WO 2018/129373 | 7/2018 |
| WO | WO 2018/151822 | 8/2018 |

OTHER PUBLICATIONS

U.S. Appl. No. 15/971,203, U.S. Pat. No. 10,395,252, Systems and Methods of Global Identification, May 4, 2018.
U.S. Appl. No. 16/511,618, U.S. Pat. No. 10,853,813, Systems and Methods of Global Identification, Jul. 15, 2019.
U.S. Appl. No. 14/473,818, Eisen.
Banking Services Newsletter, "Keeping You Up-to-Date on Banking Developments Throughout the UC System", University of California, Office of the President, Banking Services Group, Newsletter 1, Dec. 2005, p. 1.
Bharosa, "Bharosa Authenticator", http://www.bharosa.com/authenticator.html, Jan. 18, 2007, pp. 3.
Bharosa, "Bharosa Announces Online Authentication Solution to Counter Check 21-Based Fraud", http://www.bharosa.com/news/PR-110705.html, Jan. 18, 2007, pp. 2.
Darlin, Damon, "Opening the Door on the Credit Report and Throwing Away the Lock", http://www.nytimes.com/2006/03/18/business/yourmoney/18money.html, The New York Times, Saturday Mar. 18, 2006, pp. 2.
Derfler, Jr. et al, "How Networks Work", Millennium Edition, Que Corporation, Indianapolis, IN, Sep. 2000, pp. 230.
Gralla, Preston, "How The Internet Works", Millennium Edition, Que Corporation, Indianapolis, IN, Aug. 1999, pp. 329.
Gueye et al., "Constraint-Based Geolocation of Internet Hosts", ACM Internet Measurement Conference 2004, Oct. 25-27, 2004, Taormina, Sicily, Italy, vol. 14, No. 6, pp. 288-293.
"ISO 8583", Wikipedia, http://en.wikipedia.org/wiki/ISO_8583, dated Apr. 13, 2015 in 14 pages.
Kohno et al., "Remote Physical Device Fingerprinting", Proceedings of 2005 IEEE Symposium on Security and Privacy, May 8-11, 2005, Oakland, CA, pp. 211-225.
Manavoglu et al., "Probabilistic User Behavior Models", ICDM, Third IEEE International Conference on Data Mining, Nov. 19-22, 2003, pp. 203-210.
TechWeb, "Wells Fargo Intros Anti-Theft Alerts", http://www.techweb.com/wire/166404177, Aug. 1, 2005, pp. 1.
The Knightmare, "Secrets of a Super Hacker", Loompanics Unlimited, Port Townsend, Washington, 1994, pp. 233.
"UPIC Marketing Guide—The Clearing House", http://www.upic.com/infofiles/UPIC_Marketing_Guide.pdf, as printed Dec. 19, 2006. pp. 1-16.
White, Ron, "How Computers Work", Millennium Edition, Que Corporation, Indianapolis, IN, Sep. 1999, pp. 284.

(56) References Cited

OTHER PUBLICATIONS

Official Communication in European Patent Application No. 05818903. 6, dated Dec. 23, 2011.
Official Communication in European Patent Application No. 05818903. 6, dated Mar. 18, 2014.
Official Communication in European Patent Application No. 05818903. 6, dated Jul. 18, 2017.
Official Communication in European Patent Application No. 19189189. 4, dated Jan. 21, 2020.
International Search Report and Written Opinion for Application No. PCT/US2005/035532, dated Oct. 29, 2007.
International Preliminary Report on Patentability and Written Opinion for Application No. PCT/US2005/035532, dated Jan. 9, 2008.
Official Communication in European Patent Application No. 6845722. 5, dated Mar. 13, 2009.
Official Communication in European Patent Application No. 19181057. 1, dated Sep. 17, 2019.
Official Communication in European Patent Application No. 8159110. 9, dated Oct. 27, 2008.
Official Communication in European Patent Application No. 8159110. 9, dated Mar. 22, 2010.
International Search Report and Written Opinion for Application No. PCT/US2006/048251, dated Feb. 26, 2008.
International Preliminary Report on Patentability and Written Opinion for Application No. PCT/US2006/048251, dated Jun. 18, 2008.
International Search Report and Written Opinion for Application No. PCT/US2007/065776, dated Jul. 3, 2008.
International Preliminary Report on Patentability and Written Opinion for Application No. PCT/US2007/065776, dated Sep. 30, 2008.
International Search Report and Written Opinion received in PCT Application No. PCT/US2005/020750, dated Jun. 13, 2008.
International Preliminary Report on Patentability and Written Opinion received in PCT Application No. PCT/US2005/020750, dated Jul. 1, 2008.
Official Communication in European Patent Application No. 08165224. 0, dated Nov. 15, 2010.
Supplementary European Search Report for Application No. EP09735653, dated Dec. 16, 2011.
Official Communication for Application No. EP09735653, dated Jan. 4, 2013.
Summons to Attend Oral Proceedings received in European Application No. EP09735653, dated Oct. 7, 2016.
International Search Report and Written Opinion for Application No. PCT/US2009/041462, dated Dec. 1, 2009.
International Preliminary Report on Patentability and Written Opinion for Application No. PCT/US2009/041462, dated Nov. 4, 2010.
International Search Report and Written Opinion for Application No. PCT/US2011/056948, dated Apr. 18, 2012.
International Preliminary Report on Patentability in Application No. PCT/US2011/056948, dated May 2, 2013.
International Search Report and Written Opinion for Application No. PCT/US2013/033357, dated Jul. 10, 2013.
International Preliminary Report on Patentability in Application No. PCT/US2013/033357, dated Sep. 23, 2014.
International Search Report and Written Opinion for Application No. PCT/US2013/053495, dated Nov. 22, 2013.
International Preliminary Report on Patentability in Application No. PCT/US2013/053495, dated Feb. 3, 2015.
International Search Report and Written Opinion for Application No. PCT/US2013/070146, dated Mar. 3, 2014.
International Preliminary Report on Patentability in Application No. PCT/US2013/070146, dated May 28, 2015.
Provisional Application as filed in U.S. Appl. No. 61/324,312, dated Apr. 15, 2010 in 15 pages.
Bourobou et al., "User Activity Recognition in Smart Homes Using Pattern Clustering Applied to Temporal ANN Algorithm", Sensors, May 21, 2015, vol. 15, pp. 11953-11971.
Elkhodr et al., "A Review of Mobile Location Privacy in the Internet of Things", 2012 Tenth International Conference on ICT and Knowledge Engineering, 2012, pp. 266-272.
Kisel et al., "Utilizing a Personalization-Enabled Access Node in Support of Converged Cross-Domain Scoring and Advertising", Bell Labs Technical Journal, 2010, vol. 15, No. 1, pp. 77-94.
Marshall, Jack, "Device Fingerprinting Could Be Cookie Killer", ClickZ. Mar. 2, 2011, pp. 7. http://www.clickz.com/clickz/news/2030243/device-fingerprinting-cookie-killer.
Quora, [No Author Listed], How does a tracking pixel work? by Quora, 2011.
Official Communication in European Patent Application No. 19189189. 4, dated Nov. 19, 2020.
Official Communication in European Patent Application No. 19181057. 1, dated Oct. 25, 2021.
Summons to Attend Oral Proceedings received in European Application No. EP08159110, dated Jul. 23, 2020.
Official Communication received in European Patent Application No. 16766741.9, dated Aug. 20, 2019.
Summons to Attend received in European Patent Application No. 16766741.9, dated Mar. 25, 2020.
Official Communication received in European Patent Application No. 21154719.5, dated Jun. 15, 2021.
International Search Report and Written Opinion for Application No. PCT/US2012/065220, dated Mar. 21, 2013.
International Preliminary Report on Patentability in Application No. PCT/US2012/065220, dated May 30, 2014.
International Search Report and Written Opinion for Application No. PCT/US2016/049930, dated Nov. 9, 2016.

* cited by examiner

| Server A Local Time | User Computer Local Time | User Computer Information | Delta of Time with respect to Server A Local Time (hrs) | Consortium Time | Server A Local Time with respect to Consortium Time | Delta of Time with respect to Consortium Time (hrs) |
|---|---|---|---|---|---|---|
| 1/1/08 9:00 AM | 1/1/08 10:00 AM | #1: ABCDEF | 1 | 1/1/08 5:00 PM | -8 | -7 |
| 1/1/08 9:05 AM | 1/1/08 11:05 AM | #2: GHIJKL | 2 | 1/1/08 5:05 PM | -8 | -6 |

| Server B Local Time | User Computer Local Time | User Computer Information | Delta of Time with respect to Server B Local Time (hrs) | Consortium Time | Server B Local Time with respect to Consortium Time | Delta of Time with respect to Consortium Time (hrs) |
|---|---|---|---|---|---|---|
| 1/1/08 11:00 AM | 1/1/08 9:00 AM | #1: ABCDEF | -2 | 1/1/08 4:00 PM | -5 | -7 |
| 1/1/08 11:05 AM | 1/1/08 10:05 AM | #2: GHIJKL | -1 | 1/1/08 4:05 PM | -5 | -6 |

FIGURE 5B

| Server A Local Time | User Computer Local Time | User Computer Information | Delta of Time with respect to Server A Local Time (hrs) | Consortium Time | Server A Local Time with respect to Consortium Time | Delta of Time with respect to Consortium Time (hrs) |
|---|---|---|---|---|---|---|
| 1/1/08 8:00 AM | 1/1/08 10:00 AM | #1: UVWXYZ | 2 | 1/1/08 3:00 PM | -7 | -5 |

| Server B Local Time | User Computer Local Time | User Computer Information | Delta of Time with respect to Server B Local Time (hrs) | Consortium Time | Server B Local Time with respect to Consortium Time | Delta of Time with respect to Consortium Time (hrs) |
|---|---|---|---|---|---|---|
| 1/1/08 4:00 PM | 1/1/08 11:00 AM | #1: UVWXYZ | -5 | 1/1/08 4:00 PM | 0 | -5 |

FIGURE 6B

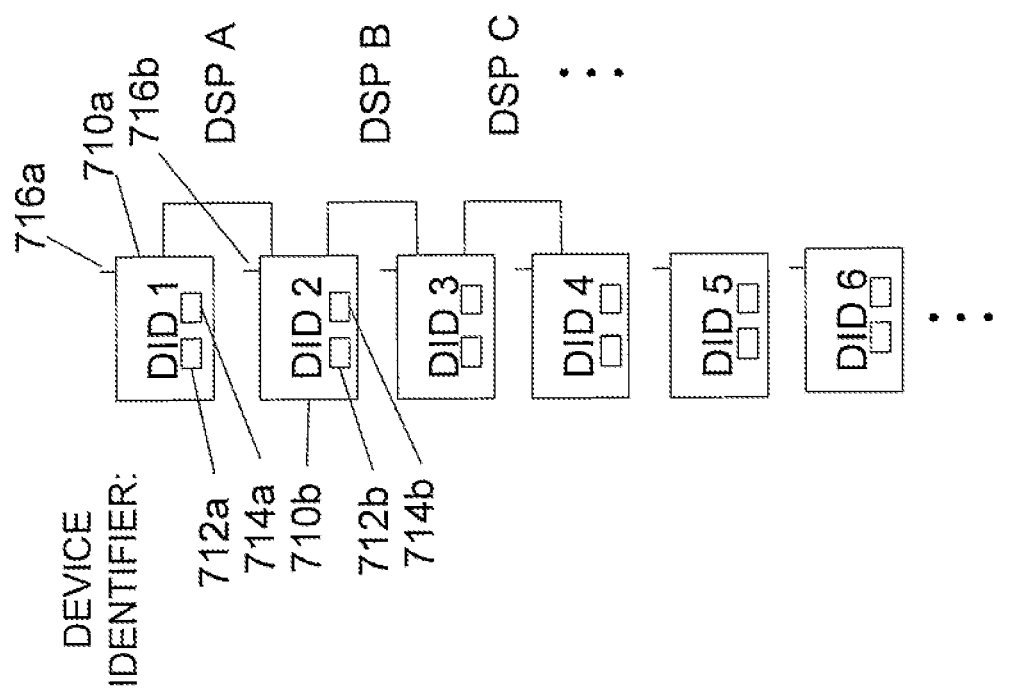

Device Identifier:
Anchor:
Age of Anchor:
Global Identifier:
Age of Global Identifier:
First Visit:
Last Visit:
Visit #:
TrustScore:
Time Difference
DSP:
Processing Time:

FIGURE 9A

| | |
|---|---|
| Anchor: | 3bfa9006d04948ca52a7fc1b5ac407149da8ea63 (208.100.40.43) |
| Age of Anchor: | 2,079 hours (86 days) |
| Global ID: | 896a8b24-a3bb-4c98-84bb-3b74227ce6fb |
| Age of Global ID: | 0 hours |
| Global ID First Visit: | Tue, Sep 25 2012 03:37:06 PM UTC |
| Global ID Last Visit: | Tue, Sep 25 2012 03:43:23 PM UTC |
| Global ID Visit #: | 8 |
| Global ID TrustScore: | 60 |
| TDL: | -28799 seconds |
| DSP: | 100% |
| Processing Time: | 80 ms |

FIGURE 9B

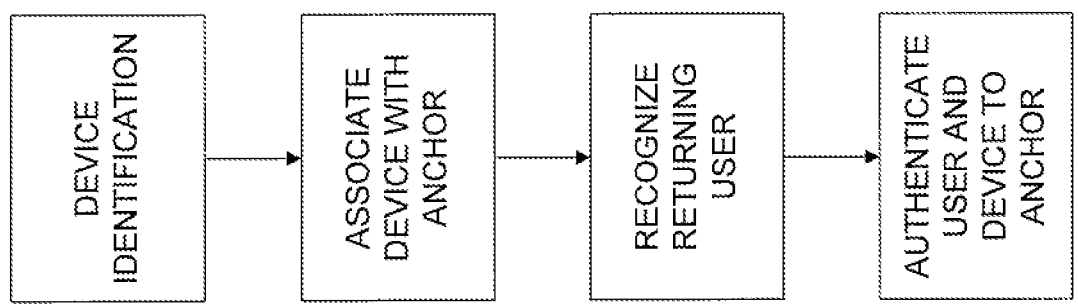

LIST OF TRANSACTIONS FOR AN ANCHOR (NTEMP) WITH DIFFERENT DEVICES

| 1110 DATE TIME | 1112 RAW ANCHOR VALUE | 1114 TrustInsight ANCHOR VALUE | 1116 DSP | 1118 # Unique TrustInsight ID | 1120 TrustInsight ID | 1122 VISIT # |
|---|---|---|---|---|---|---|
| 1130 | 1130a | 1130b | 1130c | 1130d | 1130e | |
| 02/16/2011 07:22:56 | ntemp@gmail.com | 5c441a1dea399046a5fb1d3d881d72dba9ece38f | 100.00% | | d91c04a1-d6a9-466e-9453-672afa5bb498 | 1 |
| 02/16/2011 07:23:33 | ntemp@gmail.com | 5c441a1dea399046a5fb1d3d881d72dba9ece38f | 100.00% | | d91c04a1-d6a9-466e-9453-672afa5bb498 | 2 |
| 02/16/2011 07:24:02 | ntemp@gmail.com | 5c441a1dea399046a5fb1d3d881d72dba9ece38f | 100.00% | | d91c04a1-d6a9-466e-9453-672afa5bb498 | 3 |
| 1132 | 1132a | 1132b | 1132c | 1132d | 1132e | 1132f |
| 02/19/2011 07:22:00 | ntemp@gmail.com | 5c441a1dea399046a5fb1d3d881d72dba9ece38f | 63.43% | 2 | 2c26d07f-1f2e-4e9b-a9c0-076f10954dee | 1 |
| 1142 | | | 1142c | | | 1142f |
| 02/20/2011 08:10:13 | ntemp@gmail.com | 5c441a1dea399046a5fb1d3d881d72dba9ece38f | 99.69% | | d91c04a1-d6a9-466e-9453-672afa5bb498 | 1 |
| 02/20/2011 08:10:56 | ntemp@gmail.com | 5c441a1dea399046a5fb1d3d881d72dba9ece38f | 100.00% | | d91c04a1-d6a9-466e-9453-672afa5bb498 | 5 |
| 02/20/2011 08:12:12 | ntemp@gmail.com | 5c441a1dea399046a5fb1d3d881d72dba9ece38f | 100.00% | | d91c04a1-d6a9-466e-9453-672afa5bb498 | 6 |
| 02/20/2011 08:12:48 | ntemp@gmail.com | 5c441a1dea399046a5fb1d3d881d72dba9ece38f | 100.00% | | d91c04a1-d6a9-466e-9453-672afa5bb498 | 7 |
| 02/20/2011 08:15:55 | ntemp@gmail.com | 5c441a1dea399046a5fb1d3d881d72dba9ece38f | 100.00% | | d91c04a1-d6a9-466e-9453-672afa5bb498 | 8 |
| 02/25/2011 10:40:03 | ntemp@gmail.com | 5c441a1dea399046a5fb1d3d881d72dba9ece38f | 99.59% | | d91c04a1-d6a9-466e-9453-672afa5bb498 | 41 |
| 03/03/2011 06:54:36 | ntemp@gmail.com | 5c441a1dea399046a5fb1d3d881d72dba9ece38f | 98.35% | | d91c04a1-d6a9-466e-9453-672afa5bb498 | 67 |
| 03/08/2011 20:46:37 | ntemp@gmail.com | 5c441a1dea399046a5fb1d3d881d72dba9ece38f | 98.66% | | d91c04a1-d6a9-466e-9453-672afa5bb498 | 68 |
| 03/25/2011 07:12:54 | ntemp@gmail.com | 5c441a1dea399046a5fb1d3d881d72dba9ece38f | 97.56% | | d91c04a1-d6a9-466e-9453-672afa5bb498 | 69 |
| 04/10/2011 06:51:01 | ntemp@gmail.com | 5c441a1dea399046a5fb1d3d881d72dba9ece38f | 99.90% | | d91c04a1-d6a9-466e-9453-672afa5bb498 | 70 |
| 1136 | | | 1136c | | | |
| 05/01/2011 09:05:17 | ntemp@gmail.com | 5c441a1dea399046a5fb1d3d881d72dba9ece38f | 99.69% | | d91c04a1-d6a9-466e-9453-672afa5bb498 | 89 |
| 1134 | | | 1134c | 1134d | 1134e | 1134f |
| 05/05/2011 22:05:33 | ntemp@gmail.com | 5c441a1dea399046a5fb1d3d881d72dba9ece38f | 49.25% | 3 | 7313f02d-414b-42f0-a93b-c7892942f6a30 | 1 |

FIGURE 11 (continued on next page)

LIST OF TRANSACTIONS FOR AN ANCHOR (NTEMP) WITH DIFFERENT DEVICES

| DATE TIME | RAW ANCHOR VALUE | TrustInsight ANCHOR VALUE | DSP | # Unique TrustInsight ID | TrustInsight ID | VISIT # |
|---|---|---|---|---|---|---|
| 05/05/2011 22:07:05 | ntemp@gmail.com | 5c441a1dea399046a5fb1d3d881d72dba9ece38f | 100.00% | | 7313902d-414b-42f0-a93b-c78929426a30 | 1138f  /  2 |
| 05/05/2011 22:08:49 | ntemp@gmail.com | 5c441a1dea399046a5fb1d3d881d72dba9ece38f | 100.00% | | 7313902d-414b-42f0-a93b-c78929426a30 | 1140f  /  3 |
| 05/05/2011 22:49:46 | ntemp@gmail.com | 5c441a1dea399046a5fb1d3d881d72dba9ece38f | 100.00% | | 7313902d-414b-42f0-a93b-c78929426a30 | 4 |
| 05/06/2011 01:26:21 | ntemp@gmail.com | 5c441a1dea399046a5fb1d3d881d72dba9ece38f | 98.56% | | d91c04a1-d6a9-466e-9453-672afa5bb498 | 99 |
| 06/26/2011 19:03:40 | ntemp@gmail.com | 5c441a1dea399046a5fb1d3d881d72dba9ece38f | 98.07% | | d91c04a1-d6a9-466e-9453-672afa5bb498 | 118 |
| 07/17/2011 04:32:21 | ntemp@gmail.com | 5c441a1dea399046a5fb1d3d881d72dba9ece38f | 99.90% | | d91c04a1-d6a9-466e-9453-672afa5bb498 | 126 |
| 08/05/2011 09:22:15 | ntemp@gmail.com | 5c441a1dea399046a5fb1d3d881d72dba9ece38f | 99.33% | | d91c04a1-d6a9-466e-9453-672afa5bb498 | 170 |
| 08/05/2011 09:27:18 | ntemp@gmail.com | 5c441a1dea399046a5fb1d3d881d72dba9ece38f | 100.00% | | d91c04a1-d6a9-466e-9453-672afa5bb498 | 171 |
| 08/05/2011 09:29:16 | ntemp@gmail.com | 5c441a1dea399046a5fb1d3d881d72dba9ece38f | 100.00% | | d91c04a1-d6a9-466e-9453-672afa5bb498 | 172 |
| 09/04/2011 05:50:05 | ntemp@gmail.com | 5c441a1dea399046a5fb1d3d881d72dba9ece38f | 98.16% | | d91c04a1-d6a9-466e-9453-672afa5bb498 | 173 |
| 09/15/2011 09:40:49 | ntemp@gmail.com | 5c441a1dea399046a5fb1d3d881d72dba9ece38f | 98.67% | | d91c04a1-d6a9-466e-9453-672afa5bb498 | 260 |
| 09/18/2011 05:28:53 | ntemp@gmail.com | 5c441a1dea399046a5fb1d3d881d72dba9ece38f | 100.00% | | d91c04a1-d6a9-466e-9453-672afa5bb498 | 261 |
| 10/03/2011 18:30:14 | ntemp@gmail.com | 5c441a1dea399046a5fb1d3d881d72dba9ece38f | 98.98% | | d91c04a1-d6a9-466e-9453-672afa5bb498 | 269 |
| 10/11/2011 20:45:16 | ntemp@gmail.com | 5c441a1dea399046a5fb1d3d881d72dba9ece38f | 74.50% | 4 | a8198ca5-98b4-49da-b1f2-3654a6b4cc77 | 1 |
| 10/11/2011 20:47:14 | ntemp@gmail.com | 5c441a1dea399046a5fb1d3d881d72dba9ece38f | 100.00% | | a8198ca5-98b4-49da-b1f2-3654a6b4cc77 | 2 |
| 10/11/2011 21:02:30 | ntemp@gmail.com | 5c441a1dea399046a5fb1d3d881d72dba9ece38f | 100.00% | | a8198ca5-98b4-49da-b1f2-3654a6b4cc77 | 3 |
| 10/12/2011 03:07:10 | ntemp@gmail.com | 5c441a1dea399046a5fb1d3d881d72dba9ece38f | 100.00% | | d91c04a1-d6a9-466e-9453-672afa5bb498 | 385 |
| 10/12/2011 03:08:43 | ntemp@gmail.com | 5c441a1dea399046a5fb1d3d881d72dba9ece38f | 100.00% | | d91c04a1-d6a9-466e-9453-672afa5bb498 | 386 |

FIGURE 11 (continued from previous page)

SYSTEMS AND METHODS OF GLOBAL IDENTIFICATION

CROSS-REFERENCE

This application is a continuation application of U.S. application Ser. No. 16/511,618 filed on Jul. 15, 2019, entitled SYSTEMS AND METHOD OF GLOBAL IDENTIFICATION, which is a continuation application of U.S. application Ser. No. 15/971,203 filed on May 4, 2018, now U.S. Pat. No. 10,395,252, issued Aug. 27, 2019, entitled SYSTEMS AND METHODS OF GLOBAL IDENTIFICATION, which is a continuation application of U.S. application Ser. No. 14/710,552 filed on May 12, 2015, now U.S. Pat. No. 9,990,631, issued Jun. 5, 2018, entitled SYSTEMS AND METHODS OF GLOBAL IDENTIFICATION, which is a continuation of PCT/US2013/070146, filed on Nov. 14, 2013, entitled SYSTEMS AND METHODS OF GLOBAL IDENTIFICATION, which claims priority to U.S. Provisional Patent Application Ser. No. 61/726,518, filed on Nov. 14, 2012, entitled SYSTEMS AND METHODS OF GLOBAL IDENTIFICATION, where all above-cited applications are hereby incorporated herein by reference in their entireties.

FIELD OF THE INVENTION

The invention relates to network security, the detection of fraudulent transactions and identity theft, and reputation. More particularly, the invention relates to one or more consortia of computer networks that identify and share information about users and/or computing devices.

BACKGROUND OF THE INVENTION

Many methods and systems have been developed over the years to prevent or detect Internet fraud. Today, to gain consumer confidence and prevent revenue loss, a website operator or merchant desires an accurate and trustworthy way of detecting possible Internet fraud. Merely asking for the user name, address, phone number, and e-mail address will not suffice to detect and determine a probable fraudulent transaction because such information can be altered, manipulated, fraudulently obtained, or simply false.

Furthermore, a fraudulent user may conduct transactions with numerous websites or online businesses. One website merely relying on information gathered during previous transactions with that particular website may limit the scope of fraud prevention potential.

Accordingly, what is needed is a method and system that overcomes the problems associated with a typical verification and fraud prevention system for Internet transactions by identifying each user and/or user device and sharing that information. Then, when a user seeks a second fraudulent transaction, whether the transaction is with the same or different website, the website operator may detect the fraud and take appropriate action.

SUMMARY OF THE INVENTION

The invention provides systems and methods that identify users and/or user devices connecting to a network. Information about a user or user device may be collected during a transaction between a user device and an online host. In some embodiments, a device identifier may be derived from the collected information and assigned to a user device. Optionally, a global identifier can be derived from device information and/or user information. This information can be used to observe user behavior and activity, such as an account connecting from many different devices, or many accounts connecting from the same device. Such information may help validate devices and the status of the device identifier may be verified as acceptable to the online business based on the status rules of the online business. In addition, this information can be used to cross-reference computing devices used by known fraudulent accounts, and cross-reference other accounts used by specific devices. In some cases, the online hosts may communicate with an authentication repository, which may also include a centralized database of gathered information, such as device identifiers or fraud history, that can be updated and shared.

Accordingly, computing devices involved in suspicious or fraudulent activity, or devices associated with accounts involved in suspicious activity can be identified. This information can be shared with other online hosts and networks within one or more consortia. In this way, computer devices associated with suspicious or fraudulent activity on one network may be denied access to other networks.

The invention may be applied to provide a fraud detection and prevention system that can significantly reduce the risk associated with Internet transactions and fraud. By sharing information about potentially fraudulent users or devices, and identifying user devices as well as their association with certain online activity, the system may allow businesses to avoid problem customers or devices associated with fraudulent activity. The system can track device activity and user behavior over selected periods of time, thereby identifying suspicious activity based on selected parameters established by online businesses.

Information shared across a consortium may include a delta of time parameter. The delta of time parameter may be shared directly and/or may be shared as part of a device identifier. The delta of time parameter may be calculated as a difference between a user device clock time and a reference time. A reference time may include an online business server clock time or a repository server clock time, which may be synchronized to a time, such as Coordinated Universal Time (UTC). Information shared across a consortium may also include personal and non-personal identification information, which may or may not be incorporated as part of a device identifier.

Device similarity percentages (DSPs) may be used to assist with identifier a device. Device information sharing the same anchor and collected over time may be compared. If the device information matches within a predetermined threshold, the device identifiers formatted from the device information collected at the different points in time may be determined to belong to the same device. Device identification can be used in fraud detection and/or determining device reputation.

A registry may be provided through which a user may be able to register the user's devices. Access to a system or permission of transactions may be controlled based on whether a requesting device has been registered. The device may be identified using any of the techniques described in embodiments herein in order to determine whether the device has been registered and/or has been involved in any suspicious behavior.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The features and advantages of the invention may be further explained by reference to the following detailed description and accompanying drawings that sets forth illustrative embodiments.

FIG. 5B shows a table with an example of the use of the consortium with a reference time.

FIG. 6B shows a table with an additional example of the use of the consortium with a reference time.

FIG. 7 shows an example of how device identifiers may change over time.

FIG. 9A shows an example of information that may be tracked for identification verification and/or fraud detection.

FIG. 9B shows another example of tracked information in accordance with an embodiment of the invention.

FIG. 10 shows an example of a tracking method in accordance with an embodiment of the invention.

FIG. 11 provides an illustration of information that may be stored and used to track a device and/or user in accordance with an embodiment of the invention.

DETAILED DESCRIPTION OF THE INVENTION

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and methods that identify users and/or user devices connecting to a network. The invention relates to one or more consortia of communication networks that share information about users or user devices. The invention is applicable to network security and the detection of fraudulent transactions and identity theft. It will be appreciated, however, that the systems and methods in accordance with the invention can have greater utility; for example, the invention may also be applicable to any system where a user or user device identification may be relevant. One aspect of the invention is creating associations, tracking behavior over time, and sharing information with multiple networks or businesses that stand to benefit from sharing this type of information.

The invention may be applicable to any type of transaction in which it may be desirable to identify a user or device. For example, the invention may be used to detect fraud being carried out by one or more network devices and user accounts over a communications network, or even detecting and preventing potential fraud or identity theft by individuals trying to complete a transaction remotely by phone or mail, or even in person. The invention may be used to build user and/or device reputation, whether good or bad. One aspect of this system and method is to associate pieces of information about a transaction, monitor these associations, and share the information about these associations with other businesses within one or more consortia.

Figure 1:
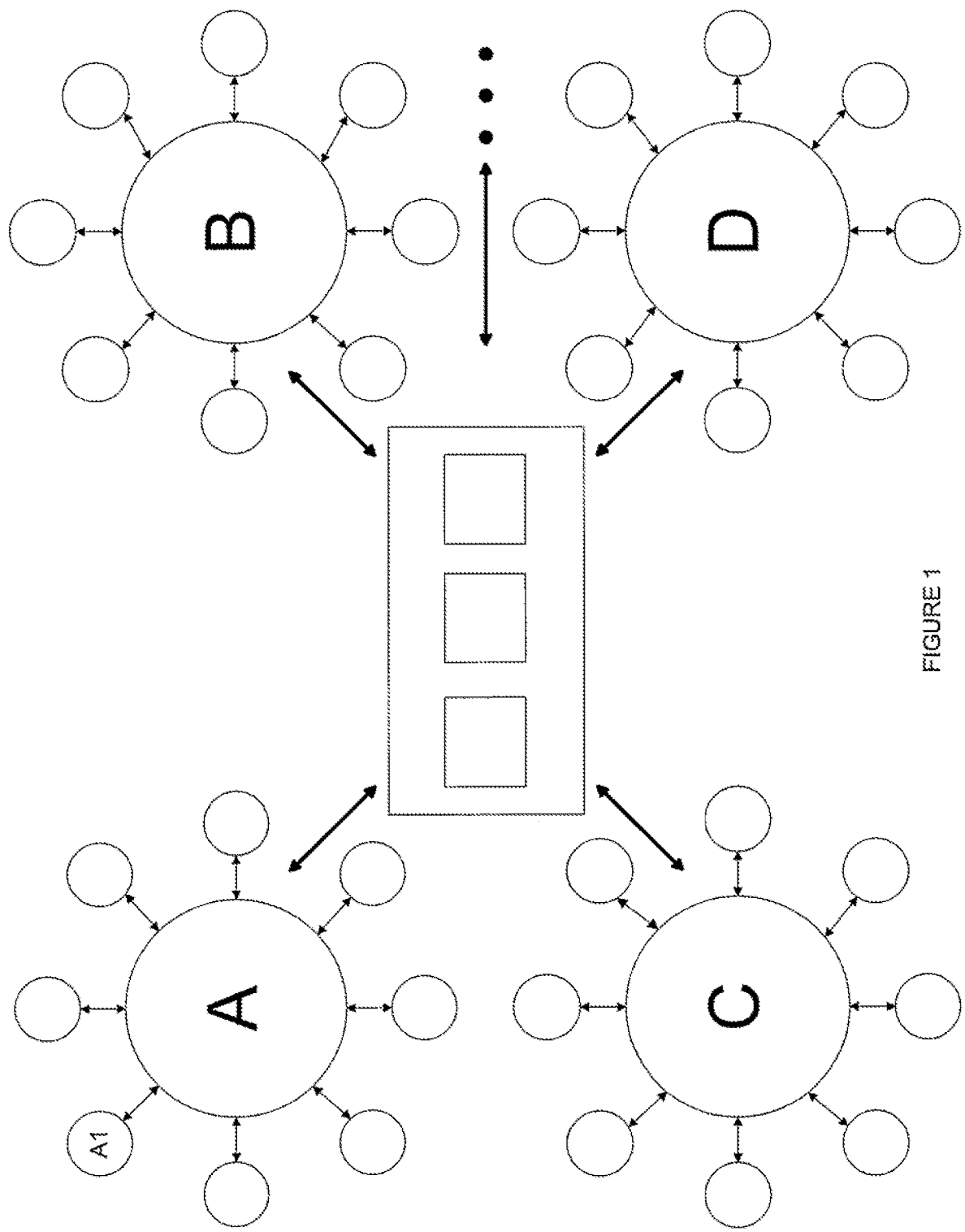
FIG. 1 is a diagram illustrating a consortium having one or more user devices being connected to one or more online businesses that share user device information with an authentication repository that is part of the consortium in accordance with the invention.

FIG. 1 is a diagram illustrating a consortium having one or more user devices being connected to one or more online organizations or hosts that share user device information with an authentication repository that is part of the consortium in accordance with one embodiment of the invention. The one or more user devices may include user computers whether they be a personal computer, server computer, or laptop computer; personal digital assistants (PDAs) such as a Palm-based device or Windows CE device; phones such as cellular phones; a wireless device such as a wireless email device or other device capable of communicating wireless with a computer network; or any other type of network device that may communicate over a network and handle electronic transactions.

A user device may have a memory and a processor. The memory may store non-transitory computer-readable media comprising code, logic, or instructions for executing one or more step described herein. A processor may execute any of the steps described herein. A user device may have a user interface. For example, a display may be provided capable of conveying information to the user. For example, a display may show a web browser and information relating to an interaction or transaction between a user device and an online organization. The user device may be able to receive an input from a user. For example, a user device may have or accept input from a computer, mouse, joystick, trackball, pointer, pen, microphone, motion sensor, optical sensor, infrared sensor, capacitive sensor, pressure sensor, camera, touchscreen, or any other input device. The user may be able to enter information relating to a transaction via any input device. The user device may have a clock or other timekeeping device. The device clock may indicate a time for the device, which may or may not correspond to an objective time for a location of the device. The device clock may or may not be synchronized with other clocks. The device may have an Internet Protocol (IP) address.

The online organizations connected to the one or more user devices may be any sort of host, such as an electronic commerce business, an online merchant, a financial institution, or any other type of website service provider that may provide a service to a user or may interact with a user device. An online organization and a user device may perform an electronic transaction, such as a purchase of a product or service, such as online banking. In accordance with one aspect of the invention, each electronic transaction may be susceptible to fraud and each user device or user can be identified to reduce the risk of fraud. In some instances, a user device reputation or trust score may be monitored, and less processing or fewer security checks may be required for a user device with a good reputation than a user device with a bad reputation.

The connection between a user device and an online organization may be, for example, a connection between a client computer and a website server over a network. One or more servers may communicate with one or more client computers across a network. The network, for example, can include a private network, such as a LAN, or interconnections to the online organizations over a communications network, such as the Internet or World Wide Web or any other network that is capable of communicating digital data, such as a wireless or cellular network. Each user device may connect to any online organization over the network using data protocols, such as HTTP, HTTPS and the like.

When a user device is communicating with the consortium, the device memory may store an operating system (OS) and a browser application. For example, the operating system may operate to display a graphical user interface to the user and permit the user to execute other computer programs, such as the browser application. The browser application, such as Microsoft Internet Explorer, when executed by the processor, permits the user to access the World Wide Web as is well known. The user device may interact with an online organization that is part of the consortium, which may perform some fraud prevention and detection functions and may generate a device identifier derived from information gathered about the user and/or user device in accordance with the invention. The online organization and/or consortium may generate a device identifier, analyze a device identifier, generate a global identifier, and/or analyze a global identifier. Any description herein of device identifiers may also be applied to global identifiers and vice versa.

In some embodiments, an online organization may have one or more web-based server computers, such as a web server, an application server, a database server, etc., that are capable of communicating with a user device over a network, such as the Internet or a wireless network, and are capable of downloading web pages to the user device. In some implementations, the online organization may comprise one or more processors, one or more persistent storage devices and a memory. For the online organization to interact with the user devices, the memory may store (and the processor(s) may execute) a server operating system and a transaction processing software system to facilitate an electronic transaction between the online organization and one or more user devices. For example, memory may store non-transitory computer readable media comprising code, logic or instructions for performing one or more step. One or more programmable processor may be capable of executing the steps. Each online organization may further comprise a database, such as a database server or a data structure stored in the memory of the online organization, that stores the electronic transaction data for the online organization. In some embodiments, a server for an online organization may have greater computing or processing power than a user device. Similarly, the server may have more memory than a user device.

The online organization may control each device and/or each user's access to the resources of the online organization by, for example, denying access to a user or device in particular circumstances. For example, if a user device has been implicated in fraud, an online organization may prevent a transaction with the user device from occurring. In another example, if a user has a 'bad' or 'low' rating, an online organization may prevent the user from participating in an electronic sales forum, or may require further security checks or identity verification. In another example, if a user has a 'good' or 'high' rating, an online organization may permit the user to participate in the electronic sales forum, perform fewer checks on the user, and/or provide rewards, discounts, or privileges. A user's rating or reputation may be calculated as a score (e.g., numerical value, letter grade, etc.) as described elsewhere herein.

In a preferable embodiment of the invention, the online organizations may be connected to an authentication repository. The authentication repository or fraud detection monitor that is part of a fraud detection consortium may be connected to the online organizations over a network. If the central repository is connected to the network, then the data between the online organizations and the authentication repository may be encrypted or may travel over a virtual private network to ensure privacy and security.

Thus, the authentication repository may receive user and/or user device information from each online organization, which may collect user or user device information from each user device during an online transaction. The repository may store some or all of the information received. The repository may store information received in a memory of the repository. In some instances, one or more databases may be provided for a repository. In some embodiments, a distributed or cloud computing environment may be used to store information. The repository may have a processor capable of performing one or more step. The processor may be used to generate a device identifier and/or access information stored in records. The processor may be used to normalize information or put information into a desired format.

In some implementations, the authentication repository may generate a device identifier that identifies each user device. In some cases, the device identifiers may be unique identifiers for each user device. In other cases, the device identifiers may not be unique for each user device, but may be derived from information gathered about a user and/or user device which may or may not be duplicative in another user device. The device identifiers may be static, or may change for a device over time. In some cases, a device identifier may function as a "fingerprint" of a user device, and include various parameters derived from gathered information about a user and/or user device to be discussed in greater detail below. In some instances, one or more of the various parameters for a device may change over time or transactions, and the device identifier may incorporate such changes. In some implementations, the authentication repository may generate a global identifier, which may incorporate the device identifier. The global identifier may have one or more of the characteristics of the device identifier. Any description of identification information may also include the device identifier and/or global identifier.

Using the identification information in accordance with the invention, the authentication repository may be able to detect fraudulent activities across the consortium. In particular, the authentication repository may provide a centralized service utilizing this invention to identify user devices, store user and device information, track end-user logins, associate an end-user account with one or more specific devices, associate a device with one or more end-user accounts, associate a device or end-user with fraudulent activity, and share this information with each online organization of the consortium. The authentication repository may include a centralized database.

Any action taken within a fraud detection consortium may be directed by computer readable media, code, instructions, or logic thereof. These may be stored in a memory, such as the memory of an authentication repository or the memory for an online organization.

In one example, a user computer, such as A1, may request access to the fraud detection consortium and a particular online business, such as A. To gain access to A, complete a transaction, or access a particular part of the network, a user may connect through a user device, which in this case may be user computer A1. The online business A may receive user and/or user information from the user computer and may then pass the information to the authentication repository. The online business may or may not store the information gathered through the user device that is passed onto the authentication repository.

In some implementations, the authentication repository may generate a computer identifier which may be derived from the information gathered. The authentication repository may generate a global identifier which may be derived from the information gathered. The global identifier may incorporate the computer identifier. Any description of the computer identifier may also pertain to the global identifier and vice versa. In other implementations, a computer identifier may be generated at different stages. For example, an online business A may gather information from A1 and may generate a computer identifier for A1, and may pass the computer identifier to the authentication repository. The online business A may only pass the computer identifier, may only pass the global identifier, may only pass gathered information, or may pass a combination of any of the three to the authentication repository.

Information or data, such as a computer identifier, global identifier, anchor, raw data, data used to make up the computer identifier or the global identifier, or any combination thereof may be stored in "pairs," or may be "linked" or "associated." Any type of data may be coupled with the same or different type of data when stored in memory. The paired data may be linked within memory where they are stored, or may have some other mechanism that associates them with one another. In one example, an email address and a computer identifier may be stored as a pair. The email address and computer identifier may be stored in memory together, as a unit of data. An anchor may include one or more items of user information. An anchor and a computer identifier may be stored as a pair. An anchor may be stored with multiple iterations of the computer identifier collected over time. Alternatively, they need not be stored together but may include pointers that associate them with one another. Although the term "pair" may be used, any number of data items may be linked in memory. For example, two, three, four, five, six, seven, eight, ten, twelve, fifteen, twenty, thirty, forty, fifty, eighty, one hundred, two hundred, or more items may be linked in memory. As discussed in greater detail below, any of these linked sets of data may be shared together. In some instances, an anchor may include information that may be used to access the data item pairs. For instances, anchor may remain the same for multiple iterations of the computer identifier collected at different points in time and associate with the anchor. The anchor may serve as an index, baseline, or reference point to find the related pairs of information. The system and method may search or organize records by the anchor in order to find information about related pairs of information.

In one embodiment, the authentication repository may store some or all of the information. For example, the authentication repository may store all of the information gathered by online business A, B, C, D, and any other businesses in the consortium. Online businesses A, B, C, and D may or may not also store the information that is stored by the authentication repository. The authentication repository may share some or all of the information gathered or generated, such as global identifiers, computer identifiers or detected fraud information, with the online businesses of the consortium.

In an alternate embodiment, the fraud detection monitor or repository may facilitate transfer of information between one or more online business without actually storing the gathered information. For example, information gathered by online business A may be stored on A's server, and information gathered by online business B may be stored on B's server. The fraud detection monitor may enable transfer of information from A to B, C, D, and any other businesses and so forth for the other online businesses. The fraud detection monitor may also process information, with or without storing it on a fraud detection monitor server, such as generating global identifiers or computer identifiers, or detecting fraud from information gathered from one or more online business, and may share this information with the online businesses of the consortium. The fraud detection monitor may detect fraud by cross referencing the gathered information and tracking user and device behavior over time. In some cases, the fraud detection monitor may only store processed information, such as global identifiers, computer identifiers, fraud indicators, or reputation scores.

In some embodiments, each online business may represent different private network environments operated by independent organizations that do not share end-user identities. The data storage system, such as a set of databases, used by each online business may be remotely located at the authentication repository and can be a service provided by a third party. Alternatively, online businesses may communicate via a network, such as the Internet, such that end-user identifiers may be shared.

Another example provides fraud detection and information processing applications distributed across a plurality of computing devices (with no central authentication repository and database). The computing devices may be the online businesses' devices, the user devices, or a combination of the user devices and online businesses, such that each may perform part of the functions of the fraud detection and prevention system in accordance with the invention. For instance, the various online businesses may share information with one another in a peer to peer manner, and may collectively detect fraud. In one case, online business A may detect an at-risk user device and share this information with online businesses B, C, D, and so forth. Online businesses A, B, C, and D may share information in a peer to peer manner such that they all have access to certain information.

Those skilled in the art will appreciate that the fraud detection consortium may be implemented in various different manners that are within the scope of this invention, such that previous discussions are provided by way of example only and are not limiting.

One aspect of the invention provides for multiple consortia that may interact with one another and share information. For example, an authentication repository may communicate with another authentication repository. In some embodiments, information gathered from an online business may be shared between one or more authentication repositories, which may subsequently share the information with the other online businesses that they are connected to. In some implementations, the information shared between a first repository and second repository may be stored by both the first and second repositories before being distributed to connected online businesses. Alternatively, a repository may merely pass on information it receives from another repository. The information may be stored or shared in various ways that are known in the art.

For instance, any information stored by an authentication repository may be stored in one or more database of the authentication repository. In one example, the database may have a database table containing pertinent information. However, the data may be stored in different databases and may include different database data structures that are within the scope of this invention. In this example, a database table may include a host column, a unique user-account name, and a user device identifier column that may permit the fraud detection system to associate a particular host (or online business) with a particular user and a particular user device. As described above, the user-account name may represent end-user accounts that are unique to each host. The user device identifiers may represent user devices that have connected to at least one host. The individual rows in the database table may represent unique combinations of host, user-account names and user device identifiers. The database table may enable the same user connecting to a different online business with the same user device to be tracked and registered in the consortium. A great deal of additional information may be maintained such as last successful login date and time, last unsuccessful login date and time, total successful logins, total unsuccessful logins, etc. as well as any relevant personal and non-personal information, to be discussed in greater detail below. Additional information may be stored in memory, such as information pertaining to global identifiers and/or changes in device identifiers. Such information may be discussed in greater detail below.

As previously discussed, information may be stored in "pairs," which may refer to any number of data items that may be somehow linked or connected together. A database table, as mentioned previously, may be an implementation of storing data in pairs. In a consortia or multiple consortia, such information may also be shared in "pairs." For example, a particular host may always link together a credit card number and email address. Such information may be stored and shared as a pair. In some embodiments, each host may have uniform pairs of data that may be shared. For instance, all of the hosts within an online consortium may store together a credit card number and an email address. Similarly, any time a credit card number is shared or tracked across a consortium, an email address may also be shared and tracked with the corresponding credit card number. In another embodiment of the invention, different hosts may have different pairs of data that are shared (e.g., one host may always pair an email address with a username, and another host may always pair an email address with a delta of time parameter). Any of the data items or types, including global identifiers, anchors, computer identifiers, delta of time parameters, trust scores, or other items discussed herein, may be paired.

When data is stored and tracked as a pair, fraud detection and validation may be improved. For example, if a pair of identifying data is stored, and then the same pair appears again, the device or individual can be identified with greater certainty as the same device or individual. Thus, consortia members may be able to share pairs of information to track a device or user.

Based on gathered information, and any information generated by processing the gathered information, such as a global identifier or computer identifier, to be described in more detail, the likelihood of fraud being committed by a particular user with the user computer A1 may be determined and an appropriate action can be taken. Assuming the user computer A1 is granted access to the network, the user computer performs its electronic transaction. If a fraudulent activity occurs during that electronic transaction, that information may also be conveyed to the authentication repository and may be stored by the authentication repository. Alternatively, if fraudulent activity occurs, the information may be conveyed to the other online businesses. In this manner, the one or more online businesses may share fraud information between each other selectively so that a fraud committed against one online business, i.e. online business A, can be logged into and tracked by the authentication repository in accordance with the invention. Alternatively, information about fraudulent activity can be tracked by the consortium of online businesses without analysis by an authentication repository. Thus, a user or user computer that has committed fraudulent activities can be tracked even when the user or user device logs into a different online business, i.e. online business B. Therefore, the fraudulent activities of a user or user computer can be tracked across the consortium.

Some implementations of using an authentication repository in a consortium may involve repositories capable of handling various tasks. An authentication repository may be one or more stand-alone computing resource, such as a server computer, with a database or storage system, although the functions of the authentication repository and the information storage may be distributed in any number of ways, such as in examples described previously. The authentication repository may include one or more processors, one or more persistent storage devices and a memory. The authentication repository may further include a database server/manager that may store the data in accordance with the invention. The structure and operation of the processor, persistent storage device and memory may be any computing device structure as known in the art. The memory may store a server operating system, and one or more administrator module that are executed by the processor to implement the fraud detection and prevention.

An administrator module may permit an administrator to interact with an online business. For example, an administrator may determine the threshold for enabling a user to interact with the online business if the user may be at risk for fraud. An administrator may also configure items of the system, adjust query items and update items. An administrator module may also process the data stored or received by the repository, such as to generate a device identifier or global identifier. An administrator module may enable an administrator to generate a query of, given a particular user device, what users have used that network device or a query that asks, given a particular user, what network devices have been used by the particular user. The administrator may also configure a query that asks, given a particular user device, what other online businesses set this network device to associate users/computers a predetermined number of levels deep or given a particular user, what is that user's current status in the system. An administrator module may perform additional administrative functions such as generating reports from the fraud detection and prevention system and its database.

In some embodiments, hosts, such as online organizations or businesses, may be able to individually control their interactions with user devices. For example, hosts may set up any number of device and user status levels, and establish any number of behavior patterns, each of which might require a different action, such as notify a particular email address, page a particular number, deny access to the network, allow access but change the status of the device, etc. In some cases, each host can establish its own customized rules for every aspect of the present validation method. Because of this, the same circumstances that result in denied access for an end-user for one host may not result in denied access for another host.

Alternatively, an authentication repository may control a host's interaction with a user device. For example, an authentication repository may determine whether a user device is at risk for fraud and may deny the user device access to the consortium. In some cases, the authentication repository's determination for fraud risk may be uniform for all hosts.

Identifying information may be used for other applications in addition to fraud detection and prevention or network security. For example, gathered information may relate to a user rating, which may or may not relate to fraud. Such information can be shared across one or more online businesses in a consortium, to track the user or user computer across the consortium. In another example, gathered identity information may have applications in national security and law enforcement.

The information gathered in accordance with the invention may be customized for different user device types. For example, with a personal computer that connects to an online business, the information gathered may include an IP address or browser ID and additional personal or non-personal information to identify the user device. With a cellular phone, it is typically possible to extract data from the cellular phone, such as its serial number, so that only non-personal information may be used to identify the cellular phone network device. For a PDA user device, it may be typically possible to put data/information onto the PDA only so that the certain parameters only may be used to identify the PDA. Thus, depending on the user device, different information may be gathered. In accordance with the invention, information may also be gathered from a hardware device, such as a smart card or PCMCIA card, which may have its own unique identifier that may be used to uniquely identify the card. Thus, information gathering in accordance with the invention may be implemented in a variety of different manners.

A user device's information, which may include risk for fraudulent activity or reputation information, may be shared with various hosts at various times or manners. In some instances a user's information and/or a combination of the user's information and user device information may be shared. For example, transaction information may be shared with all hosts whenever a transaction occurs. In another example, transaction information may be shared with all the hosts at particular times, i.e. updating each host every ten minutes, or whatever time an individual host may wish to be updated. Alternatively, transaction information may be provided to a host upon request by the host. For instance, if the information is stored with an authentication repository, a host may choose to automatically update and access repository information whenever a transaction occurs between the host and a user device. In some cases, individual hosts may be able to determine when or how they receive or send shared information. In other cases, information sharing may be uniform across a consortium.

For any of the systems and methods described herein, a consortium may operate taglessly. One or more consortia may be tagless when they do not require a program to be downloaded to a user device. For example, an online host and/or authentication repository may collect information about a user or user device without the use of cookies, text parcels, or programs sent from a server to a client computer. A fraud detection consortium may be able to detect fraud without downloading a fraud detection program to a user device. Rather, a consortium may operate taglessly by collecting information from a user device without requiring a user device to download additional applications from any of the hosts or repositories of the consortium. For example, instead of "pushing" an application or tag onto a user device, a consortium may enable data to be "pulled" or extracted from the user device.

Figure 2:
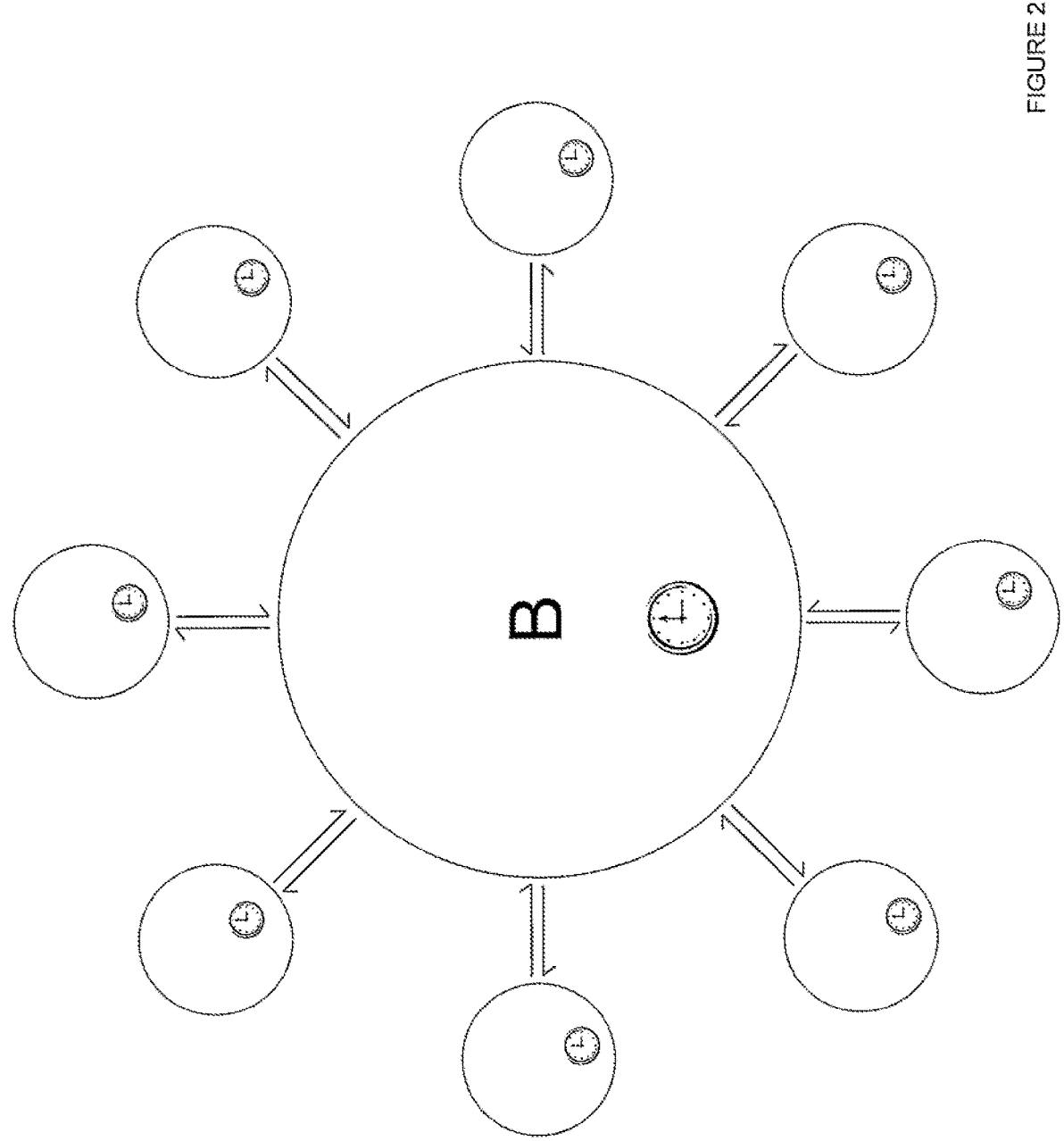
FIG. 2 is a diagram illustrating an example of an online institution connected to one or more user computer in accordance with the invention.

FIG. 2 is a diagram illustrating an example of an online institution connected to one or more user computers or devices in accordance with an embodiment of the invention. An online institution may gather information from a user computer. As discussed previously, the information may be gathered during an online transaction and may be used to identify a user and/or user device. In accordance with the invention, the consortium may utilize a user or device identifier or combination thereof, or any other data that may be used to identify a user or device or combination thereof. In some embodiments, a user may be identified based on a number of parameters. The parameters from the gathered information include a delta of time parameter, to be discussed further below. Other information or parameters may also be used to assist in identifying a user and/or user device. In some situations, it may be impossible to extract data from a user device so that only a generated device name can be used to identify the user device.

A delta of time parameter may be determined from information gathered during a transaction between a user device and an online institution. Such information may include a local time for a user device according to a clock of the user device. A local time may include a date, hour, minute, second, millisecond, or any other denomination of time. In one example, the clock of the user device may be a resident computer clock. In another example, a clock may be an external clock that determines the time of a user device. A user device may have one or more clock for determining a time of the user device. Information from one or more clocks may be collected. Such information collected may also include relevant time zone information, which may include information about Daylight Savings Time.

Other information may be gathered during a transaction between a user device and an online institution. For instance, upon making a connection, an online website receives some non-personal identification information from the customer device. In preferable embodiments, an online website may receive some non-personal information taglessly. This non-personal information typically includes Common Gateway Interface (CGI) parameters such as the customer's Internet Protocol (IP) Address and the computer's Browser ID. While "hackers" can change, disguise, and/or emulate the IP address to mask a fraudulent transaction, most do not now have the capability nor the idea to do the same for the Browser ID. While some "hackers" can change the Browser ID, it is not a trivial tool and if one needs to change it all the time it is not allowing those thieves to easily steal, hence, they are likely to go to a site that does not check Browser IDs. In some instances, some or all of the non-personal information may be used as part of a global identifier.

In a typical embodiment, when a customer decides to purchase services, goods, or information from a website, the customer inputs additional, and more personal, identification information. This personal identification information may commonly include the customer's name, address, billing and shipping information, phone number, and/or e-mail address. Any other personal information, such as a customer's driver's license number, social security number, a personal identification number, retail purchase location, or any other information that may be captured as part of an online transaction could be used to identify and minimize transaction fraud and identity theft. In some instances, some or all of the collected personal information may be used as part of a global identifier.

A website server can capture the local time of the customer's computer, typically through a program such as JavaScript, as well as a reference time. In preferable embodiments, the local customer computer time may be captured taglessly. The website may capture customer computer time using a script that may extract information from the customer computer, without pushing anything onto the customer computer. The script may be a server side script. The script may extract information by querying the customer computer. The script may be a time capture script from the website server for execution by the customer computer. The time capture script may instruct the browser of the customer computer to obtain selected information about the customer computer during an online connection, including a local time according to a clock of the customer computer, a non-personal identification parameter, and/or a personal identification parameter. The customer computer may accordingly provide selected information in response to the queries. The selected information collected by the time capture script, such as the local time of a customer computer clock may be returned to the website server in accordance with the time capture script. Thus, a clientless capture of information may be implemented by the server.

Typically the reference time may be the time of the server's computer. The time of a server's computer may include the local server time and any relevant time zone information, or the server may be synchronized to a set time, such as Coordinated Universal Time (UTC). The reference time may also be an authentication repository server time. This may be the local time for the authentication repository, or the repository time may be synchronized with a set time, such as UTC time. More details about capturing time to calculate a delta of time parameter will follow.

The server then calculates the time difference (or delta of time) between the customer's computer clock and the reference time, such as a server's computer clock. At the server, a delta of time parameter may be calculated based on a difference in time between the reference time (e.g., local server time, UTC time) and the local time of the customer computer clock received from the customer computer. This can be recorded in any desired format such as hours, minutes, seconds, or the like, but corresponds to a delta of time parameter. The delta of time parameter, the non-personal information, including but not limited to the preferred usage of the Browser ID, and/or the personal information are stored by the merchant and used to identify the customer and/or customer computer.

In accordance with one embodiment of the invention, the relative customer computer local time according to its resident clock may be captured, typically through a program such as JavaScript or any other time indicator employed by telecommunications and networking systems such as timestamps within transmitted data packets (e.g., TCP timestamps in packets within a data stream wherein each packet includes a header portion containing a 32-bit timestamp generated by a originating computer according to local resident time). The local time of a customer computer or client may be captured during any selected moment of action such as when the customer visits or is logging into a merchant site, at the time of a purchase or at times during an exchange of information that can be reflected in timestamp to data packets transmitted across a selected network or the Internet. Similarly, the time can be captured at multiple times during an online transaction.

In some embodiments, a merchant web server may also maintain and measure a relative website server time according to a server clock. The time difference or delta of time as between the customer computer clock and the server's computer clock can be therefore calculated. This approach in determining when to measure a time of action or event may be characterized as opportunistic in that measurements are taken at selected moments in time. The delta of time can be measured, calculated and recorded by the merchant web server or any other computer operating with or connected to the merchant online system, such as an authentication repository. The delta of time may be measured in any desired format or increments of time such as days, hours, minutes, seconds, milliseconds (microseconds) or the like. Over different periods of time, the delta of time parameters are generally persistent with relatively high degree of accuracy. Accordingly, the measured time difference between these computer clocks provides a parameter in accordance with this aspect of the invention that may link or associate a particular customer computer with transactions. The association of the customer computer with a transaction may help prevent fraud when a particular transaction may involve fraud.

The delta of time (Time Diff) parameter provided in accordance with this aspect of the invention may function alone or combined with other parameters to provide what may be characterized as a "PC fingerprint." Such devices include personal computers or any other type of computing devices or computers (hereinafter collectively PC). Each PC connected to the Internet may be configured slightly differently and may possess identifiable characteristics distinguishing it from other devices which can be exploited by the invention. A more accurate PC fingerprint may be generally developed by considering a greater number of available computer related parameters. Such computer related parameters may remain the same or may vary over time. Thus, a PC fingerprint may remain static, or may dynamically change over time. The Time Diff parameter may serve as part of a PC fingerprint for identifying a device which serves as a distinctive mark or characteristic about a particular user device. In addition to a Time Diff parameter, the flow of information exchanged during an Internet session may be captured and provide significant information about the user PC on the other end. This type of information exchange considered by the invention is preferably invisible and/or transparent to users, and does not rely on user action or modification of online behavior.

The Time Diff parameter may thus link incidents involving fraud, hacking, phishing etc. by automatically correlating information such as login data, computer data and customer data. For example, by analyzing data sent from the user device, information about the device and browser used by an individual may be obtained such as a Browser ID, the Browser/device IP address and the particular Browser language. By formulating a more accurate PC fingerprint or global identifier, there is less likelihood of mistakenly associating a user with a fraudulent transaction (false positive) during e-commerce transactions, or failing to detect a fraudster. Other applications of the invention include national security and law enforcement whereby a computer can be uniquely identified in a manner similar to way thieves can be identified by a physical fingerprint. Accordingly, a PC fingerprint or global identifier provided by the invention enables the ability to link and connect different online accounts and activity to a same device.

A global identifier provided in accordance with an embodiment of the invention may be captured during selected moments of action during an Internet session, such as the login step or procedure. The global identifier may be generated at a single time or multiple times during an online transaction. Flags may be raised if the global identifier changes in a particular way during an online transaction. The global identifier may or may not incorporate a Time Diff parameter. The global identifier may be analyzed in conjunction with a Time Diff parameter.

The Time Diff parameter provided in accordance with the invention may be captured or measured during various selected moments of action during an Internet session such as the login step or procedure. This may include measuring the Time Diff parameter at multiple times during an online transaction, which may raise flags if the Time Diff parameter changes noticeably during an online transaction. Many e-commerce merchants, financial institutions, and Internet Service Providers (ISPs) manage accounts and user logins on an enormous scale. This aspect of the invention can be applied to broader applications online to authenticate a user or uniquely identify a computer on the Internet in addition to e-commerce transactions and fighting fraud or identify theft. For example, the invention may be applied where a merchant or financial institution (FI) server resides in California, USA and a valid customer (Customer) who also normally resides in California, USA. It shall be understood that the following examples below describe login procedures which could be modified according to the invention for any other selected moment of action during an Internet session such as logout procedures, when a user clicks a "submit" button within a user interface, or transmission of any other information between users online.

During a "valid" login procedure, the Customer may initiate a login procedure from a web browser on a computer that registers a time according to its clock as follows: Time=11:00 am/Time Zone: UTC −8 and an IP address from the California region. Meanwhile, from the perspective of the FI, the recorded time at the FI server according to its respective clock may be: Time=11:01 am/Time Zone: UTC −8 and an IP address from the California region. It shall be understood that the invention may incorporate IP address locator tools which determine an identifier for an online device and its location based on geographic regions within a country or around the world. Upon analysis of this information from the Customer that may be reflected on a conceptual or actual Score Card, which can be calculated and stored in memory within the server of the FI or any its other network computers, the FI can determine whether there is a match indicating a valid user login. Accordingly, the exchange of information in the above described example may be reflected as a match on or as a Score Card that measures the validity of the customer: Time Diff=Match/Time Zone=Match/IP=Match.

During a "suspect" login procedure, a Customer may initiate a login procedure from a web browser on a computer that registers a time according to its clock as follows: Time=10:02 pm/Time Zone: UTC +3 and an IP address from a region in Russia. Meanwhile, from the perspective of an FI, the recorded time at the FI server according to its respective clock may be: Time=11:01 am/Time Zone: UTC −8 and an IP address again from its California region. Upon analysis of this information from the Customer in accordance with the invention, the Time Diff and Time Zone measurements as between the Customer and the FI are different from prior valid logins and therefore not a match. Furthermore, the IP address received by the FI indicating a device outside of the California region would not be a match and further suggest an invalid login attempt by a fraudster or other unauthorized individual. The Score Card for this login example measuring the validity of the customer can thus show: Time Diff=No Match/Time Zone=No Match/IP=No Match. The FI would be thus alerted that the alleged Customer attempting to login was likely invalid.

During a "valid" login procedure from a Customer traveling with a computer and browser in London, the Customer may initiate a login procedure at a registered time according to its clock as follows: Time=11:00 pm/Time Zone: UTC −8 and an IP address from a region around London. Meanwhile, from the perspective of an FI, the recorded time at the FI server according to its respective clock may be: Time=11:01 am/Time Zone: UTC −8 and an IP address again from its California region. Upon analysis of this information from the Customer, the Time Diff and Time Zone measurements as between the Customer and the FI are the same as prior valid logins and therefore a match. While the IP address received by the FI indicating a device outside of the California region would not be a match and suggest an invalid login attempt, the comparison of the Time Diff and the Time Zone measurements would be a match. Because the Time Diff parameter provided in accordance with the invention can be used in combination with other fraud parameters for authentication and identification, a Score Card for this login example measuring the validity of the customer could still show a match nevertheless: Time Diff=Match/Time Zone=Match/IP=No Match.

The Time Diff parameter provides fraud detection tools for online merchants, financial institutions and other parties providing services on the Web. These tools can be applied to combat well recognized problems such as reducing the number of false positives which reduce possible revenue from mistakenly identified valid users. In addition, Time Diff based tools provide an effective solution to identifying and preventing fraud during the course of international and overseas transactions where there are significantly increased risks of fraudulent activity. Accordingly, the Time Diff parameters herein allow the creation of a more accurate and relevant geo-location or PC fingerprint for many different types of online transactions around the world.

It shall be understood that the Time Diff parameters provided in accordance in this aspect of the invention may be defined as the difference in the registered computer times as measured in any unit of time (e.g., days, hours, minutes, seconds, milliseconds, microseconds) between any selected computers either alone, or in combination with the Time Zone herein or any other temporal characteristics. Furthermore, as with other embodiments described herein, the concepts of the invention can be preferably applied to e-commerce transactions to deter or identify fraud but is not limited thereto and are equally applicable to any other online application to uniquely identify and link a computer device on the Internet according to a Time Diff parameter. While consideration of Time Diff parameters alone may not be completely effective as with any solution against fraud, phishing etc., the global identification and/or PC fingerprinting methods and techniques provided herein enables effective link analysis between computer devices and compromised accounts or any other transaction having or associated with a fraudulent past or history. By following and learning from historical incidents of security breaches and fraud, the invention can quickly pinpoint repeat offenders and build a stronger defense against different criminal behavior or schemes now known and those that will be developed in the future. The global identification and/or PC fingerprinting methods may also permit the building of reputations for users and/or devices. The historical information may be gathered and associated to increase, decrease, or maintain a reputation/trust rating. It may be useful to know whether the user and/or device has a high or low reputation rating to expedite transactions, provide incentives or offers, assess likelihood of fraud, and/or prevent attacks.

A global identifier may be generated for use in detecting fraud related to online commercial transactions or other commercial transactions. The global identifier may include or be generated based on a device identifier. Further descriptions relating to the global identifier are provided elsewhere herein.

In accordance with some embodiments of the invention, a device identifier, such as a customer computer identifier may be generated for use in detecting fraud in connection with online commercial transactions. The customer computer identifier may be used to identify any user device. For instance, a merchant web server may receive customer personal information, such as name, address, phone number, etc. A web server may also receive non-personal information from the customer such as IP address and Browser ID. The web server may capture the local time and the time zone at the customer computer. The delta of time parameter may be calculated at one or more times during the transaction. It should be noted that the delta of time parameter may be calculated at the time of the customer login, other times during a transaction or at any selected moment of action. Using the customer information and the delta of time parameters, the customer computer identifier is determined. In some examples, a customer computer identifier may include all the data collected as fields, may be a hash of the data, a combination thereof, or any form of data derived from the collected data. In some instances, a global identifier may include a customer computer identifier or be generated based on multiple customer computer identifiers over time. The global identifier may optionally include an anchor. Any one or more of these steps may be used in combination with each other and in a different order of operation depending on selected applications. It should be further understood that processes in accordance with this embodiment of the invention may provide a delta of time parameter and a computer identifier and/or a global identifier described elsewhere herein and also used together with other aspects of the invention.

In another preferable embodiment of the invention, a particular subset of selected parameters or fields can combined or aggregated to construct a customer computer identifier. For example, the customer computer identifier can be determined based on selected customer personal information, customer non-personal information, including a Browser ID and a delta of time parameter. These selected parameters are not meant to be limiting and other information or fraud parameters described herein or otherwise known to those of ordinary skill may be used to create a customer computer identifier. Specifically, another preferable embodiment of the invention includes a customer computer identifier consisting of a delta of time parameter plus a Browser ID alone which can be used to identify or "fingerprint" a user computer. The delta of time parameters provided in accordance with this and other aspects of the invention herein offer fingerprinting capabilities that uniquely identify particular computing devices used in online transactions. Because computer users rarely personally change the internal clocks within their computers, the delta of time parameter will likely be the same (or within a range or within predictable limits) for a computer every time that computer is used to conduct an online transaction with the same merchant even if the user disguises or changes the IP address. The Browser ID is also not likely to be changed, even by a consumer seeking to perpetuate a fraudulent transaction. Thus, the delta of time parameter (the difference between the time of day of the computer user's clock and a reference time) is an important component of the computer identifier because it, along with the preferred Browser ID or other personal or non-personal information, is a good indication of the identity of a subsequent user on the same computer. The delta of time parameter also allows the merchant to potentially locate the computer in terms of a time zone, region, or country.

An online organization or merchant may include, remove, and weigh each parameter within the computer identifier. For example, the merchant may choose to only use the delta of time parameter and Browser ID to form the unique computer identifier. Accordingly, the merchant may set a matching parameter to fit a level of comparison between a first and subsequent transaction. For example, since deltas of time may slightly change because of the differences in accuracy between the server and the user computer clock mechanism, computer clocks and deltas may slightly vary over time. The merchant may set the matching parameter to include a range of delta of time, such as a few minutes, instead of an exact match. This way, even if the user computer "loses time," the matching parameter can still identify the subsequent transaction as a potential fraudulent one based on other information within the computer identifier.

FIG. 7 shows an example of how device identifiers may change over time. For example one or more device identifiers may be generated for the same device. In some instances, the device identifiers may be generated during each online transaction using the device. A single device identifier or multiple device identifiers may be generated during an online transaction. The device identifiers that have been identified as belonging to the same device may be stored in memory. For example, for a particular device, DID1, DID2, DID3, DID4, DID5, DID6, and any other device identifiers identified as belonging to the same device may be stored in memory and/or accessible. The information relating to a particular device may be aggregated. Thus, a device identifier may have longevity. The change of a device identifier and/or rate of change of a device identifier over time may be tracked.

The device identifiers may or may not change over time. In some instances, one or more parameters making up a device identifier may change. In some instances, a certain degree or magnitude or change may be expected for one or more parameters, if they belong to the same device. Change may be assessed based on which parameters changed. Also, the degree or magnitude or the types of changes may be analyzed. In some instances, overall change of the device identifiers may be monitored. The change of specific parameters used to formulate the device identifiers may be monitored.

In some instances, one or more device similarity percent (DSP) may be calculated. In one example, a device similarity percent (e.g., DSP A) may be calculated between a first device identifier and a second device identifier (e.g., DID1, DID2). The DSP may be calculated based on numerical or value differences between one or more parameters involved in the formulation of the device identifier. In some instances, weighting of the one or more parameters may be involved in calculating the DSP. One or more qualitative aspect may be taken into consideration when calculating the DSP. In some instances, if the DSP exceeds a predetermined threshold, the device identifiers may be determined to belong to the same device. The predetermined threshold may have any value (e.g., numerical percent value, such as 60%, 70%, 80%, 90%, 95%, or 99%). In some instances, DSPs may be calculated for various device identifiers that are alleged to belong to the same device and/or the same user. In other embodiments, DSPs may be calculated for all device identifiers collected by a merchant or consortium, and used to determine whether the device identifiers belong to the same device.

The DSPs may be calculated for the overall device identifier and may have fixed thresholds. In some instances, similarity percentages can be calculated for individual parameters of a device identifier and may have the same thresholds for each parameter, or may have varying thresholds for different parameters (e.g., it may be more acceptable or expected for certain parameters to change than other parameters). In some instances, the rate of change of device identifiers may be considered. For example, if a user for a device regularly makes many changes or updates, then a lower threshold for those changes may be provided, as long as the changes remain within a threshold rate of change.

In one example, a first device identifier (e.g., DID1) and a second device identifier (e.g., DID2) may be compared to generate a device similarity percent (e.g., DSP A). The device identifiers may be determined to belong to the same device. A third device identifier (e.g., DID3) may be compared to determine if the third device identifier belongs to the same device as the first and second device identifier. In some instances, a second device similarity percent (e.g., DSP B) may be calculated. DSP B may be calculated between the third device identifier (e.g., DID3) and the second identifier (e.g., DID2). In some instances, device similarity percents may be calculated between the current device identifier and the immediately previous device identifier to determine if the current device identifier belongs to the same device as the previous device identifier. In some other instances, DSP B may be calculated by assessing the similarity between DID3 and multiple previous device identifiers (e.g., DID1 and DID2). The multiple previous device identifiers may go back to a limited number of previous device identifiers, or may include all device identifiers analyzed as likely belonging to the same device. The DSP may be calculated between each of the previous device identifiers and the current device identifier (e.g., between DID3 and DID2, and between DID3 and DID1). In other embodiments, the DSP may be calculated between the current device identifier and a conglomeration or some sort of combination of the previous device identifiers.

Similarly, when another device identifier (DID4) is generated, the device identifier may be compared with previous device identifiers (e.g., DID3 and/or others). The DSP (e.g., DSP C) may be calculated between DID4 and DID3 (or any previous device identifiers).

The DSPs may acknowledge that a device identifier may evolve over time. One or more parameters used in the generation of a device identifier may change. For example, clock skew may be provided on a device, that may alter the time difference parameter between the device and a server. In another example, software and/or settings of the device may be altered or upgraded. A DSP may be used to determine whether the change is of a type and/or magnitude that makes it likely that the device identifier refers to the same device as the others.

In one example, as illustrated in FIG. 7, the device identifiers (e.g., DID1, DID2, . . . ) may provided for one or more device 710a, 710b. The device identifiers may be provided for the same device or different devices. The device identifiers may be compared (e.g., DID1 vs. DID2) to determine whether the devices associated with the identifiers (e.g., 710a, 710b) are the same device, or different devices. The DSP (e.g., DSP A) may be a measure of the comparison that may used to determine whether the devices are the same devices or different devices. The devices may include a memory 712a, 712b, processor 714a, 714b and/or a communication interface 716a, 716b. The memory may store information and/or non-transitory computer readable media. The processor may be capable of executing one or more step. For example, the processor may execute one or more step in accordance with the non-transitory computer readable media. The communication interface may enable the device to interact directly with an external device or over a network. A device identifier (e.g., DID1) may be determined based on one or more characteristics of a device 710a. In some instances, the information stored in a memory 712a of the device may be used to determine a device identifier. In some instances, the device may have a clock, and information from the clock may be used to determine a device identifier.

Figure 8:
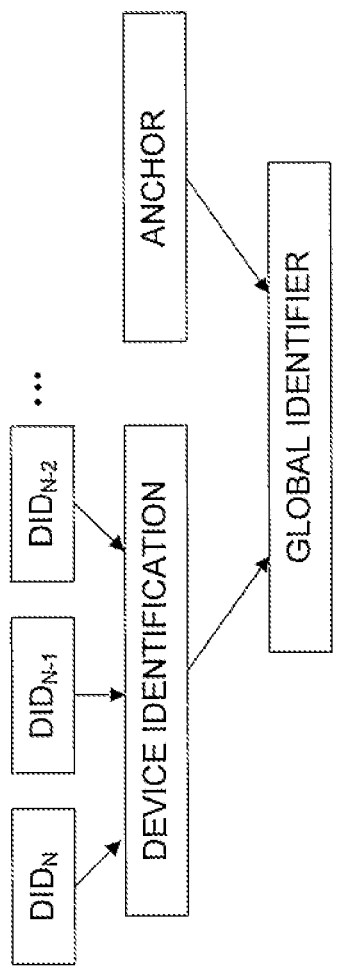
FIG. 8 shows an example of how a global identifier may be formed.

FIG. 8 shows an example of how a global identifier may be formed. A global identifier may be generated based on a device identification component and/or an anchor. In some embodiments, the global identifier may be generated based on a dynamic portion and a static portion. Optionally, the device identification component may be a dynamic portion, and an anchor may be a static portion. The anchor may serve as a baseline or reference. The anchor may serve as an index by which to access information. The global identifier may include a portion that is based on device identification, and a portion that is based on user identification. Optionally, the anchor may be based on user identification.

A global identifier may be stored in memory. For example, the global identifier may be stored in a memory of a repository.

A global identifier may be formulated based on two or more portions. For example a device identification portion and anchor portion may be provided. Such portions may be stored separately, or may be combined together. For example, a device identification portion may be accessed independently of an anchor portion. The device identification portion and the anchor portion may be associated with one another. Such portions may be appended, or hashed together. For example, a string representing a device identification portion may be appended to a string representing an anchor portion. In another example, a string may be formed representing some combination of the device identification and anchor portions.

The device identifier portion may incorporate one or more device identifiers collected over time. For example, the device identifiers may be formulated based on, or may include, one or more characteristics of a user's device, such as IP address, Time Diff Parameter, or other characteristics. In some instances, the device identifiers may incorporate information relating to a physical feature of the user device or data collected from a portion of the device. For example, the device identifier may include or be based on information collected from a clock of the device. The device identifier may or may not include information that is hard-wired into the device. The device identifier may or may not include one or more settings of a device which may or may not change over time.

The device identifiers may be collected at one or more different times. They may be collected over one or more different transactions. In some instances, one or multiple device identifiers may be collected during any given transaction. In one example, a current device identifier $DID_N$, a previous device identifier $DID_{N-1}$, and earlier device identifier $DID_{N-2}$, etc. may be used to formulate a device identification component. The various device identifiers may be appended to one another and/or hashed together. Any number of device identifiers may be used to formulate the device identification component. In some instances, a predetermined number of device identifiers may be used (e.g., the last one, two, three, four, five, six, seven, eight, nine, ten, fifteen, twenty, thirty, fifty, one hundred or more device identifiers may be used to formulate the device identification component). Alternatively, there may be no limit to the number of device identifiers used to formulate the device identification component. The evolution of a device identifier may be stored and/or tracked. As additional information about a device is captured, it may be added to a device identification of a global identifier, which may historically track the evolution of the device identifier. Alternatively, a global identifier may have a single device identifier, and global identifiers having device identifiers determined to belong to the same device may be linked or associated with one another. They may share the same unique trust insight identifier, as described elsewhere herein.

In some instances, a device similarity percent (DSP) may be calculated between device identifiers to determine whether they belong to the same device and whether the new device identifier should be included in the device identification portion of the global identifier. For example, a global identifier for Device A may be provided. The device identification component may be based on $DID_N$, $DID_{N-1}$, $DID_{N-2}$, etc. A new device identifier may be captured and/or formulated from a device $DID_{N+1}$. The DSP may be calculated between $DID_{N+1}$ and $DID_N$, or between $DID_{N+1}$ and each of the device identifiers individually or in some form of combination. The DSP may be used to determine if $DID_{N+1}$ belongs to Device A and should be included with the other identifiers as part of the global identifier for Device A. For example, if the DSP exceeds a threshold value (e.g., 80%, 85%, 90%, 93%, 95%, 97%, or 99%), $DID_{N+1}$ may be added to the device identifier. Adding a new device identifier may or may not cause an older device identifier to drop off.

An anchor portion may include personal information about a user. For example, the anchor portion may include a user's email address, credit card number, name, social security number, phone number, other personal information, or combinations thereof. In some instances, the anchor may include a user's IP address, class C address, user ID, ABA routing and/or account number, or any combinations thereof. The anchor portion may be information or combinations of various pieces of information that may be unique to a user. In some instances, an anchor may be a single piece of information or may be derived from a single piece of information, such as a user's email address alone. In some instances, combinations of various pieces of information may form anchor information that may be appended to one another, and/or hashed together. The anchor portion may be static and not change over time. In some instances, an anchor may be an index, baseline, or reference point.

Optionally, a user may update the user's personal information (e.g., e-mail address, other contact information). Verified updates may cause certain anchor values to be equated to one another. For example, if a user's old email address is an anchor value, the new email address may also be an anchor value. The old and new email addresses may be associated with or equated to one another for device tracking purposes.

In some embodiments, anchors may be one-way hashed. Anchors may enable specific anonymity. For example, analytics may be run on a device's data without actually receiving the data. For example, the device may send one-way hashed data. Such data may include user information and/or device information. For example, if a user's email is johndoe@domain.com, a hashed string may be sent representative of the email (e.g., 6031168D5AF405AFF89A50C900423FB9E3231F5B). Analytics may be performed on the hashed data and/or the hashed data may be used for identification without requiring the underlying initial information. In some instances, such initial information may be collected by a merchant or other host. The merchant or other host may only send the one-way hashed data to the consortium. Thus, other merchants or hosts may not have access to the information. Alternatively, the underlying data itself may be sent for analytics.

FIG. 9A shows an example of information that may be tracked for identification verification and/or fraud detection. One or more of the following may be tracked: device identifier, anchor, age of anchor, global identifier, age of global identifier, first visit, last visit, visit number, trust score, time difference, device similarity percent (DSP), and/or processing time. Such information may be collected during a transaction/communication with a user device and another device (e.g., host server). The information may be collected at a single time during a transaction/communication, or multiple times during the transaction/communication. Information may be collected one or more times during each transaction/communication. The information may be collected from the user device taglessly or by any other techniques.

FIG. 9B shows an example of the information that is collected and/or stored. The anchor may be provided as a string. The anchor may be formulated based on information about a user. The anchor may be a hash of information collected about the user. The age of the anchor may be stored in any time value. For example, the age of the anchor may be stored in years, months, weeks, days, hours, minutes, seconds, or milliseconds.

A global identifier may be provided. The global identifier may be based on the anchor information and/or device identification information. In some instances, a global identifier is a device identifier. The global identifier may be provided as a string or hash of the information collected. The age of the global identifier may be provided in any time value.

The time that a device having the same global identifier first visited a particular host, or any host of the consortium may be stored. The last time the device having the same global identifier visited the particular host, or any host of the consortium may be stored. The number of visits of a device having the same global identifier has visited the same host, or any host of the consortium may be stored. The length of time over which a device having the same global identifier has visited the same host, or any host of the consortium may be stored. The frequency of visits or currency values involved in the visits may also optionally be stored. Such information may be useful in determining a trust score or reputation for the device and/or user.

A trust score may be provided. The trust score may reflect a reputation of the device and/or user. In some instances, the trust score may be reflective of information collected from a device without requiring use of any information pertaining to a user. Alternatively, the trust score may be reflective of information collected relating to a user without requiring use of any information pertaining to a device. In some embodiments, the trust score may be reflective of information collected from both a device and a user of the device. The trust score may or may not include personally identifiable information of the user. The trust score may or may not include information pertaining to one or more user interaction with a host (e.g., currency amounts, types of transactions, etc.).

Having a higher trust score may provide a higher reputation and/or less likelihood of fraud. The trust score may be a numerical value (e.g., 1 to 10, 0 to 100), a letter grade (e.g., A, B, C, . . . ) or any other form of rating. Activity by a user (e.g., online activity, financial information, other detected activity) may be analyzed to determine whether the activity is likely to be good (i.e. or not bad). Good or 'not bad' activity may cause an increase in trust score, whereas 'bad' activity may cause a decrease in the trust score. The trust score may be generated by the consortium based on information collected at the consortium. In other embodiments, the consortium may provide information to a host that may generate the trust score. The trust score may be shared across multiple hosts. In some embodiments, the trust score may be accessible via hosts in the consortium even if the user and/or device has never accessed the host, or it's the first time for the user and/or device to access the host. For example, if a user is interacting (e.g., partaking in a transaction) with a host for the first time, the host may be able to access a trust score for the user from the consortium without having had any previous interactions with the user. The user and/or device's historical interactions with other hosts or members of consortium may be used to determine a trust score and/or reputation for the user and/or device that can follow the user and/or device to a new host. Thus, a new host may use the trust score to determine whether a user and/or device is likely to be trustworthy, even if the user or device has never accessed the site before. This may advantageously leverage historical information from the consortium and the members of the consortium.

The trust score may be useful for determining a likelihood of fraud. For example, a device or user having a lower trust score may be more likely to engage in fraudulent activities or be involved in a fraudulent activity. A trust score may assist with establishing a reputation for a device and/or user. In some instances, information may be collected over a longer period of time before a trust score can increase to a particular level (e.g., it may be difficult to determine if a new device or user is 'trustworthy', but monitoring a device and/or user over an extended period of time may determine with greater confidence whether the device and/or user is trust worthy). In some instances, information may be collected over a larger number of visits before a trust score can increase to a particular level. In some instances, a certain currency (e.g., dollar) amount may need to be exceeded overall in various transactions before a trust score can increase to a particular level.

A trust score may be useful in determining whether to permit the completion of a transaction. For example, a user may interact with a merchant or other entity. A request may be made for a financial transaction (e.g., the user purchases an item or service from the entity, the user provides a donation to the entity). The merchant may send information about the transaction to one or more third party (e.g., acquiring bank, global financial services, issuing bank) that may confirm or deny the transaction. One or more of the third party may access information in a data repository pertaining to the device and/or user, which may include the trust score. The merchant may also optionally access information pertaining to the device and/or user, which may include the trust score. If the trust score meets or exceeds a predetermined threshold, the transaction may be confirmed; if the trust score falls beneath the predetermined threshold, the transaction may be denied. The merchant and/or the third party may be provided with an identifier that may serve as an index to access the information. In some instances, the index may be a global identifier as described elsewhere herein, or an anchor value. In some instances, the index may be formed of information that may be sent to the one or more third party in a usual course of confirming or denying a payment. The index may include a user name, credit card number, and/or transaction amount. In some instances, the index may be an anchor value as described elsewhere herein.

Having a lower reputation may provide an increased likelihood of fraudulent activity. In some instances, having a higher reputation may provide specialized privileges and/or treatment. In one example, a denial of service (e.g., DDOS) attack may occur on a server. Devices or users with high reputation may be identified and allowed to go through (e.g., perform actions/transactions on the server). Devices with low reputation and/or not high reputation may be prevented from performing an action with the server, thereby reducing traffic and the likelihood of a DDOS attack. In some instances, more security checks or identification verification procedures may be implemented for users and/or devices with a lower reputation.

Another example of specialized privileges or treatment for a higher reputation user or device may be qualifying the user for a special offer or status. The special offer may include discounts, coupons, rewards, cash, certificates, promotions, or other rewards for having a high reputation. In some instances having a higher status may allow a user to receive specialized treatment (e.g., less wait time, accelerated review, easier access to customer service representatives, receipt of special offers not accessible to others, free shipping, access to items or multimedia for free or discounted costs for which others would have to pay full value, higher level of service or credit). In some instances, the special offer or status may be offered outright to the user who is new to the host based on their pre-existing reputation at the consortium, which may reduce or eliminate the need for investigation by the host before providing these offers. This may permit the host or other hosts to focus review efforts on the higher risk transactions.

In some instances, more access or privileges may be granted to devices and/or users with higher trust scores. Trust score information may be useful for account openings, account login, and/or new and repeat buyers. The use of trust scores may permit such actions to take place at a sooner time. For example, a user may be relatively new to a host, but the host may determine that the user has a good reputation based on information from the consortium and provide the access or privileges. For example, a user may be opening an account with a host. The host may determine that the user has a good reputation from the user's pre-existing trust score, and may expedite approval for the user account and/or provide privileges upfront. For example, the host may permit more transactions (e.g., interactions, logins and sales) for new or returning customers at the outset. The host may permit the transactions without requiring the user to go through additional validation. Alternatively, if the host determines that the user has a bad reputation from the user's pre-existing trust score, the host may reject the user's account outright, or may put the user on a probationary period, provide limited access, or require additional specialized actions by the user. This may save the host time be reducing the number of manual reviews and may reduce costs of handling reviews. This may also reduce or eliminate delays for users with good reputations.

A trust score may evolve over time. The trust score may be associated with a device, so even if the device identifiers may evolve over time, the trust score may carry through based on the historical information of the device. Unique trust identifiers may be generated and/or tracked for each of the identified devices.

The trust score may be based on collected information. The trust score may be calculated based on a relationship between a device and an anchor. The relationship may be calculated based on the number of times the device-anchor pairs have been seen in the wild (e.g., among transactions at the same host or across multiple hosts of the consortium), and/or how long the pair has been seen together. This may permit a high score for digital consumers who repeatedly use their devices and anchors together. It may also permit the score to be limited for those who want to inflate their score, by limiting the number or types of interactions used.

A time difference parameter (e.g., TDL) may be provided. The time difference parameter may be stored in any time unit. The time difference parameter may be calculated using any techniques described herein. The time difference parameter may be stored separately from the global identifier and/or may be incorporated into the global identifier.

A device similarity percent (DSP) may be provided in accordance with an embodiment of the invention. The DSP may have characteristics as described elsewhere herein. In some instances, the DSP may be calculated for the present device identifier relative to a previous device identifier. DSPs may be calculated for the present device identifier relative to multiple previous device identifiers. The various DSPs may be compared to determine if the present device identifier belongs to a particular device. A higher DSP may provide a higher likelihood of a match. In some instances, the DSP value exceeds a threshold value in order for a device identifier to be associated with a particular device.

Processing time may be calculated in accordance with an embodiment of the invention. The processing time may be indicative of the amount of time it takes to process the other calculated information. The processing time may be stored in any units of time measurement. In some instances, if a processing time exceeds a particular threshold, a red flag may be raised as suspicious activity.

FIG. 10 shows an example of a tracking method in accordance with an embodiment of the invention. Behavioral analytics may be used to authenticate a user. In some instances, user identification and/or authentication may include one or more factors such as what the user knows (e.g., personal information such as the user's email, phone credit card, etc.), what the user has (e.g., the user's device information), and/or what the user repeatedly does over time (behavioral analytics). Such information may be incorporated in a method of tracking information useful for identification and/or authentication.

In some embodiments, a tracking method may include one or more steps of: device identification, associating a device with an anchor, recognizing a returning user, and/or authenticating a user and/or device to an anchor. Any of the steps may be optional, and/or may occur in the order presented or any other order. Additional steps may be included.

Device identification may occur using one or more techniques described elsewhere herein. Information about a device may be collected, as described in various embodiments herein. Examples of such information may include device IP address, time difference parameter, and/or any other characteristics. The device identification may occur taglessly. The device identification information may be stored in memory. The device identification information may be accessible by one or more entities of a consortium.

The device identifier may be associated with an anchor. The anchor may have one or more characteristics as described elsewhere herein. The anchor may be formulated from personal information of the user. A global identifier may incorporate the device identifier and/or the anchor. The anchor information and/or global identifier may be stored in memory, which may be accessible by one or more entities of a consortium.

A returning user may be recognized. In some instances, the returning user may be recognized based on the device identifier and/or anchor. For example, a device identifier may be compared with previously stored device identifier in order to determine whether the returning device is the same device. A device similarity percentage (DSP) may be calculated. If the DSP exceeds a certain threshold, the device identifier may be determined to belong to the same device as the previously stored device identifier. The anchor may be compared with a previously stored anchor. In some instances, an exact match may be required for the anchor. Alternatively, the anchor may fall into an acceptable range of similarity as the previously stored anchor. In some instances, a global identifier or the combination of a device identifier and anchor may be assessed in determining whether a user has returned. Further examples of techniques of determining whether a device and/or user is returning may be described in greater detail elsewhere herein.

A user and/or device may be authenticated to an anchor. In some instances, if it is determined that the same device or user is returning, authentication may be provided. In some instances, it may be determined whether the returning user and/or device provides an increased likelihood of fraud. Similarly, the returning user and/or device's reputation may be assessed. Based on such assessments, a user and/or device may be authenticated to the anchor.

FIG. 11 provides an illustration of information that may be stored and used to track a device and/or user in accordance with an embodiment of the invention. In some instances, examples of information that may be stored may include a date/time 1110, raw anchor value 1112, formulated anchor value 1114, device similarity percent (DSP) 1116, #unique identifier 1118 (e.g., device identifier/global identifier), identifier 1120 (e.g., device identifier/global identifier), and/or visit number 1122. Such information may be stored in a memory. Examples of memories may include one or more databases, which may be distributed over one or more devices, such as servers. The records may be stored in a cloud computing environment or in a peer to peer manner.

The date/time 1110 may include when information was collected from a user and/or device. The date/time may indicate a time at a transaction when an identifier and/or anchor were calculated. The date/time may indicate a time that information was conveyed to a consortium. The date/time may have any format. The month, day, and/or year may be included. In some instances, the day of the week may be included. The time may be recorded. The time may have any format, such as military time, or a time plus an AM or PM indicator. The time may be provided in hours, minutes, seconds, and/or milliseconds. The times may be in reference a consortium clock or a reference time used by the consortium. Alternatively, the times may be in reference to a host server, and/or user device.

A raw anchor value 1112 may be included. The raw anchor value may or may not be sent from the device to the host. In some instances a one way hash may be provided. In another example, the raw anchor value may or may not be sent from a host to a repository of the consortium, and/or other hosts. In one example, the raw anchor value may be an email address. In other examples, raw anchor information may be associated with a user and/or transaction (e.g., combination of the user's name, credit card number, transaction amount). In the illustrated example, the records having the same anchor value may be gathered and/or associated with one another.

A formulated anchor value 1114 may be included. In some instances, the formulated anchor value may be calculated based on a raw anchor value. The formulated anchor value may be a hash of the raw anchor value. For example, if the raw anchor value is ntemp@gmail.com, the formulated anchor value may be a string, such as 5c441a1dea399046a5fb1d3d881d72dba9ece38f. In some instances, the formulated anchor value may be a one-way hash of the raw anchor value. In some instances, the formulated anchor value may be sent from the device to the host. Alternatively, the formulated anchor value may be sent from the host to a repository of a consortium, or to another host.

The example provided in FIG. 11 shows information collected for a particular anchor. Over multiple transactions (e.g., in the wild), multiple anchors may be collected. In some instances, the information may be sorted or indexed by anchor. Information sharing the same anchor may be grouped, linked, associated, or accessible together. In some instances, one or more anchor may be equated with another. For example, if a user changes the user's email address (and optionally such change is verified to be accurate and not fraudulent), the old email address and new email address anchors may be associated with one another and/or equated to one another. For data entries 1130, 1132 having the same raw anchor value 1130*a*, 1132*a*, the formulated anchor values 1130*b*, 1132*b* may be the same.

A device similarity percentage (DSP) 1116 may be calculated. The DSP may be calculated between one or more device identifier and/or information. In some instances, characteristics of a device, such as IP address, time difference parameter, or any other characteristics may be collected. The characteristics of the device may be compared with previously stored characteristics. In some instances, the characteristics may be used to formulate a device identifier. The device identifier may be compared with a previously stored device identifier in order to calculate a device similarity percent. The device similarity percent may provide a measurement or metric of the similarity between one or more characteristics of the device. In some instances, device characteristics may change over time. For example, a time difference parameter may change over time. A device clock may have an internal clock skew, which may cause the time difference between the device clock and a reference clock to vary over time. In another example, a device system or application may be updated with new versions. In some instances one or more characteristics of the devices may be weighted when calculating the device similarity percent. A device similarity percent of 100% may indicate that the device characteristics match exactly. In some instances, when a new device is detected, it may have a default value of 100% 1130*c*.

A #unique identifier 1118 may be provided. For a given record entry, the number of new devices may be tracked. If the device similarity percent for a device is below a particular threshold, the device may be determined to be a new device. In some instances, the device information is compared to any previous devices. For example, the entry 1134 on 5/05/2011 at 22:05:33 may have one or more device characteristics that may be compared with previously stored device characteristics. This may include comparing a device/global identifier based on one or more device characteristics with previously device/global identifiers. The device characteristics may be compared against those associated with Device #1 (as identified in entry 1130 having the #unique identifier 1 1130*d*), and/or with Device #2 (as identified in entry 1132 having the #unique identifier 2 1132*d*). The DSP 1134*c* was found to be 49.25%. The DSP may be calculated against Device #2 only, or both Device #1 and Device #2. The percentage 49.25% may be the highest DSP found. In this case, the DSP is below a threshold value (e.g., 95%), which indicates a new device, Device #3 (having the #unique identifier 3 1134*d*). By contrast, the entry 1136 on 5/01/2011 at 09:05:17 yielded a DSP 1136*c* of 99.69% relative to Device #2. This value exceeded the threshold, which indicated that entry was performed by Device #2 as well.

An identifier 1120 may be provided. The identifier may be derived from one or more device characteristics. The identifier may be a device identifier. The identifier may be a global identifier which may or may not incorporate the anchor. Devices involved in transactions determined to be performed by the same device may have the same identifier. For example, all of the Device #1 entries may have the same identifier 1130*e*. All of the Device #2 entries may have the same identifier 1132*e* which may be different from the Device #1 identifier. The identifier may be a hashed string. The hashed string may be a one way hash based on one or more device characteristics. The device characteristics may or may not be shared with the consortium. In some instances, only the identifier is shared with the consortium.

Visit numbers 1122 may be tracked. For example, the visit number for each device may be tracked. When a new device is detected (e.g., entry 1134 on 5/05/2011 at 22:05:33), the visit number may be set to 1 1134*f*. Each subsequent visit from the same device may increase the visit number 1138*f*, 1140*f*. In one example, the entry 1132 on 02/19/2011 at 07:22:00 shows a low DSP 1132*c* which indicates a new device (Device #2 1132*d*), and visit #1 1132*f* for that device. The next entry 1142 on 2/20/2011 at 08:10:13 provides a DSP 1142*c* that exceeds a threshold and is identified to match with Device #1, and visit #4 1142*f* for that device.

Thus, for a given anchor, such as email address 1130*a*, the various devices 1130*d*, 1132*d*, 1134*d* may be identified and tracked. The presence of new devices and the number of visits 1122 for the various devices may be tracked. The time that the devices access the system may also be tracked. The pattern of one or more devices for the anchor that access the system may be analyzed. As a device (having a #unique identifier, e.g., trust insight identifier) and anchor pair are tracked over time, the trust score for the pair may be calculated. The trust score may be useful for detecting fraud, providing a reputation, or reducing attacks, such as denial of service (DDOS) attacks.

Figure 12:
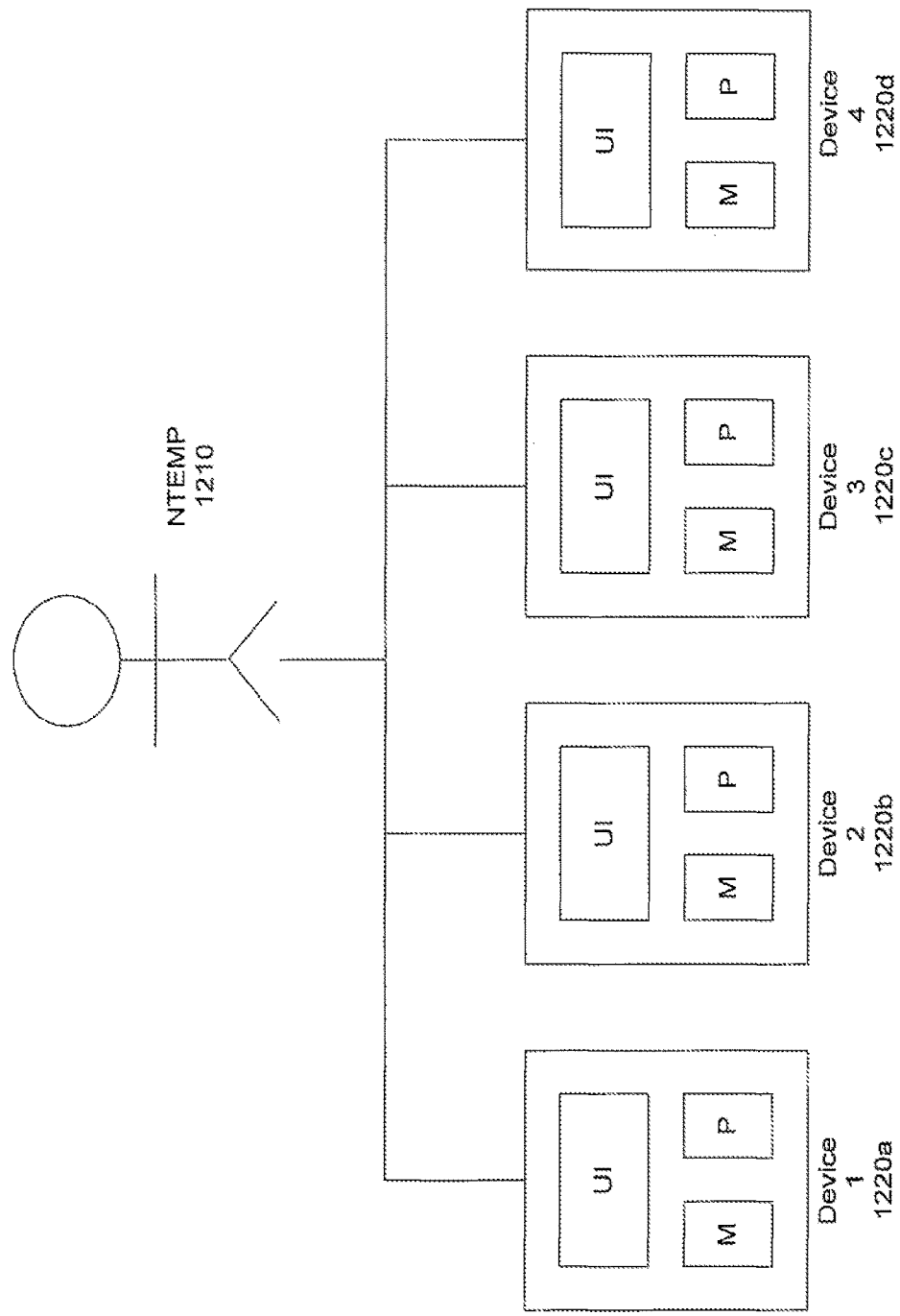
FIG. 12 provides an example of a user interacting with multiple devices in accordance with an embodiment of the invention.

FIG. 12 provides an example of a user interacting with multiple devices in accordance with an embodiment of the invention. For instance, a user (NTEMP) 1210 may interact with a system using one or more devices (e.g., Device #1 1220a, Device #2 1220b, Device #3 1220c, Device #4 1220d). The one or more devices may be identified through transaction records, as described in FIG. 11. For instance, a raw anchor value may be the user's email address (e.g., ntemp@gmail.com), or other information useful for identifying the user. A device identifier may be determined for the one or more devices based on information collected from the devices. A device similarity percent may be calculated for the information collected from the devices. If the device similarity percent is above a predetermined threshold in comparison to a previous record for a device, the device may be determined to be the same as that device from the previous record. For example, if the device similarity percent is greater than the threshold (e.g., 97%) when compared with Device #1, it may be determined that the device from a current transaction is Device #1 1220a which had a previous record. If the device similarity percent is less than 97% when compared to records for Device #1 and Device #2, but greater than 97% when compared to records for Device #3, it may be determined that the device from the current transaction is Device #3 1220c. If the device similarity percent is less than 97% when compared to all pre-existing records for devices (e.g., Device #1, Device #2, and Device #3), it may be determined that the device from the current transaction is a new device, Device #4 1220d.

The one or more devices 1220a-d that a user may use to interact with the system may include a memory (M), processor (P) and/or user interface (UI). The memory may store information, which may include non-transitory computer readable media comprising code, logic, instructions for performing one or more step. The memory may include information about the device and the setup of the device. The processor may be capable of performing one or more step, optionally in accordance with the non-transitory computer readable media. The user interface may permit the user 1210 to interact with the device. For instance, the user interface may display data to the user. A user may be able to use the device to perform a transaction with one or more entity, via the user interface. For example, a user may perform a financial transaction with a merchant using the device by using information displayed on the user interface.

Figure 3:
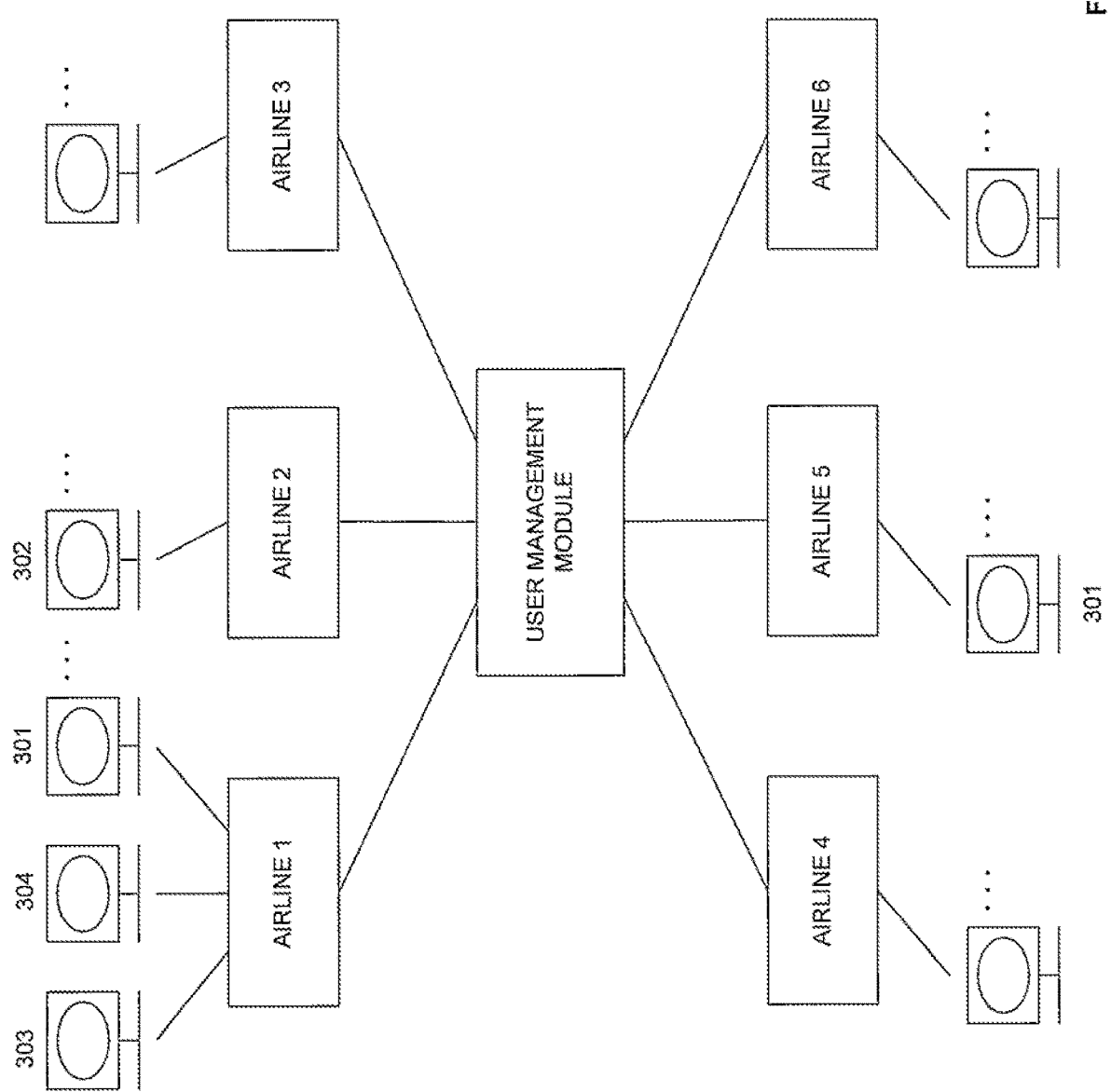
FIG. 3 shows an implementation of sharing data within a user group.

FIG. 3, as previously described, shows an implementation where data may be shared. A consortium may be provided with one or more entities (e.g., one or more merchants denoted by Airline 1-6). One or more user devices may interact with the one or more entities. A data repository (e.g., user management module) may be provided where the entities may store, access, and/or share information with one another. One or more users may interact with a plurality of entities. In one example, a user (e.g., NTEMP), may interact with one or more online entities (e.g., Airline 5, Airline 2, Airline 1) using one or more devices (e.g., Device #1 301, Device #2 302, Device #3 303, Device #4 304). In some instances, the user may interact with multiple online entities (e.g., Airline 1 and Airline 5) using the same device (e.g., Device #1 301). Information about transactions conducted between the user and the online entities using the various devices may be collected. In some instances, the information may be stored in a repository (e.g., user management module) that may be accessed by the multiple online entities, or may be stored at the multiple online entities who may communicate with one another. An anchor value may be provided pertaining to the user. For example, the user's email address (e.g., ntemp@gmail.com) may be collected for each transaction. The anchor value may serve as an index or a way of sorting records relating to the transaction.

Information from the devices (e.g., Device #1, Device #2, Device #3, Device #4) may be collected through the multiple transactions. The same device may be used for multiple transactions with the same online entity or different online entities. A device identifier may be formulated based on the information from the devices. A device similarity percent may be calculated based on information from the devices. The device similarity percent may be used to identify the device as a device from a previous transaction, or a new device. The number of visits by each of the devices may be tracked. Activity by each of the devices may be tracked. Such information may be useful for determining a reputation for a device and/or the user. For example, a particular device may act in a suspicious manner, while other devices of the user do not raise red flags. The user may be notified of this activity, and asked to verify the device that is acting in the suspicious manner. In another example, a user may act suspiciously, regardless of which device is being used. The various online merchants interacting with the user may be warned, based on the anchor value. In another example, the number of devices in themselves may be cause for suspicion (e.g., if a user uses a large number of different devices in a short period of time). In another example, such information may be useful for determining a good reputation of a device. For example, if a user has used a particular device many times without incident, the device may be 'trusted' or less likely to raise a red flag. If a user is using a new device, the device may have yet to earn the 'trust' and may be monitored more carefully or strictly for different activity.

In a consortium with one or more online merchants, each merchant may be able to autonomously choose how to weigh each parameter of a global identifier or a computer identifier. Alternatively, in a consortium, a central repository may determine the weight of each global identifier or computer identifier parameter for each of the online merchants.

Accordingly, once a merchant determines that a first fraudulent transaction may have been made, the merchant can flag the customer computer identifier, i.e. a Browser ID and delta of time. Thus, a customer computer may be correlated with a potentially fraudulent transaction based upon the customer computer identifier. In some embodiments, the computer identifier may include at least its delta of time and Browser ID, but may also include other personal and/or non-personal information. Then, the matching parameter can be used to identify a subsequent transaction which reveals a user or device with an identical set of computer identifiers. The matching is typically implemented by software, for example, on a hard disk, floppy disk, or other computer-readable medium. The subsequent transaction may occur with the same merchant or another merchant in the consortium. In some instances, a trust score may be associated with the customer computer and a fraudulent transaction can negatively impact the trust score for that computer.

In some embodiments, once a merchant web server determines the computer identifier (CI) for a first transaction, CI1 and a subsequent transaction, CI2, a comparison can be made as between the two identifiers. The two transactions may or may not be with the same merchant. After the comparison has been made, a computer implemented software program may continue to execute the next step of assigning a matching parameter value to the pair of transactions based on the similarities between the first and subsequent transactions. In some instances, the trust score for a computer of a present transaction may be provided. The website server running the program to compare computer identifiers may inform a merchant of the matching parameter value and/or trust score, which in turn may provide information suggesting to cancel or confirm the transaction, inform the customer status order, demand more information, or the like. The merchant may then choose its desired course of action. It shall be understood that the memory of a merchant web server may contain software programs with instructions to perform any combination of these steps to provide these and any other methods described herein in accordance with the invention.

Such a method may be used for a standalone merchant with customer computers or devices. Similarly, the method may be applied to one or more consortia. Either a merchant web server or an authentication repository may be determining the computer identifier and either may assign a matching parameter value. For example, the authentication repository may inform a merchant of a value and suggest confirming or denying the transaction. In some cases, the repository may determine a merchant's course of action. In one or more consortia, the matching parameter and/or trust score may be determined from information gathered from any transactions with any organizations in the consortia. Also, information gathered or processed by a merchant may be shared with other merchants in the consortia.

For instance, a series of computer identifiers, $CI_1$-$CI_4$, and/or global identifiers may be matched. Any description herein of a CI may also apply to a global identifier and vice versa. When a CI is generated by a method or software program by a device to be identified or associated with a known fraudulent transaction, it can be compared to another selected CI. These CI's may or may not be from transactions with different online organizations in a consortium.

In one embodiment of how fraud detection may be implemented, during a comparison between two transactions, a matching parameter (MP) may be calculated. The calculated value of the MP may consist of a raw number or score that is dimensionless, e.g., 11.5, or some increment of measurement including time, e.g., hours, minutes, seconds, milliseconds. The matching parameter may be thus compared in a next step to a preselected reference or baseline Matching Value (MV), e.g., 10.0. A merchant or anyone trying to identify the computer can variably set the MV relative to anticipated or measured MP values. Because of slight differences in computer clocks, network latency, variable Web traffic and bandwidth constraints, the delta of time parameters provided herein may vary from time to time even for the same selected computer. A preselected range (delta t) may be therefore defined in accordance with this aspect of the invention that allows for a certain tolerance setting or range (Range) of MP values relative to the MV. For example, a lower limit within the Range may allow for a [+/−1] variance of the MP value relative to the MV, or a higher limit within the Range may allow for a [+/−5] variance. When the MP value falls within the defined Range relative to the MV, this can indicate a positive match or identification (ID) of a device for various purposes as described herein such as linking a computer to known online fraudulent transactions. When the MP value falls outside of the defined Range relative to the MV, this can indicate a negative match or identification (ID) of a device. It shall be understood that these MP values may be alternatively defined as a Score Card value and incorporated with other corresponding aspects of the invention described elsewhere herein to detect and prevent online fraud. The matching parameters, values and ranges described in accordance with this variation of the invention can be modified and defined in a variety of ways and are not limited to those specifically provided for illustrative purposes. In some instances, a MP may be used as a DSP or vice versa. The MV may be a threshold for determining whether the same device has been used, or vice versa. The preceding steps may be carried out as methods provided herein, or alternatively as a series of software program instructions and code.

In identifying a user device, some change in a global identifier, device identifier or fingerprint may be permitted. For example, "system drift" must be considered as individual elements that are used to derive a device identifier can change over time. In one instance, additional elements not present in the original device identifier, such as a new piece of software or hardware has been installed, are not worrisome. In these cases, the device identifier is updated, and the changes noted. However, changes to existing individual device identifier values may be more worrisome. In accordance with the invention, each online host may establish rules for system drift, such as which one or more elements of the device identifier the host perceives as critical and therefore should not be changed without causing an exception/error message. For example, the serial number of the central processing unit may be considered critical and therefore will generate an error message while a change in the amount of memory in the network device alone may not raise a flag. As another example, several non-critical elements of the network device may be changed without raising any concern. Thus, depending on rules established and maintained by each online host or authentication repository, a fraudulent transaction may be detected and not be confirmed.

Furthermore, in accordance with another example of system drift, the delta of time parameter may be measured as between different times resulting from inherent limitations or flaws of the computer clock(s) in a single device as opposed to multiple devices. In this embodiment of the invention, a device fingerprint or PC fingerprint is created to identify and link a computer to known fraudulent transactions or behavior by measuring and tracking an inherent inaccuracy or flaw of a resident clock. In comparison to other embodiments of the invention, which may be described as an "external" delta of time as between two different devices (host server/user client), another variation provided herein provides a device identifier using what may be considered an "internal" delta of time as between a single device itself (standalone). Over a period of time, computers clocks as with other ordinary clocks are not perfect and tend to run fast or slow eventually. The rate at which time is gained or lost for a computer clock may be defined as "clock skew" and can be measured in microseconds per second (clock skew may be also defined as the instantaneous difference between readings of any two clocks or the time what a computer thinks it is as compared to another clock). The clock skew may be considered when matching delta of time parameters from different transactions, and may be a way of offsetting a perceived error.

If the clock has a non-zero skew, not only is the end-to-end delay measurement off by an amount equal to what can be defined as clock offset, it also gradually increases or decreases over time depending on whether it is running relatively faster or slower. Even when there is a constant clock skew, the clock offset values increases or decreases over time depending on the sign (+/−) of the skew. So any given computer or device described herein can have a single or multiple clocks (e.g., systems clock, TCP timestamps options clock) that are unable to remain consistent and accurately track time. But the clock skew of a particular device may be different from other (even seemingly identical) computers, and thus serve also as a PC fingerprint linking it to certain transactions and fraud. It is generally well known that different computer systems have different and relatively constant clock skews. This imperfection or flaw in the device can thus be exploited in a way to identify a particular device or computer in relation to certain transactions and behavior since it is relatively persistent and unique in accordance with the invention. The internal delta of time provided in accordance with this embodiment can be therefore applied in the same manner as any other external delta of time described elsewhere herein to provide a PC fingerprint linked to transactions carried out on devices involving e-tail or e-commerce fraud, breaches in security and various types of criminal online behavior.

The internal delta of time can also be calculated to offset and account for apparent changes in the external delta of time parameter over time. In other words, clock skew may also be an example of system drift and may be factored in comparing external delta of time parameters.

In this embodiment of the invention, the delta of parameter can be measured in units of microseconds per second (ms/s, first derivative or rate at which time is gained or lost) while in other embodiments of the invention the parameter can be measured in microseconds. This delta of time parameter can therefore be defined as a time difference measured between a first clock measurement and a second clock measurement over a selected period of time or time interval. For example, the TCP timestamp of a first packet of data from a computer may indicate a time $t_1$ (9:01 am) while a second packet may be sent at time $t_2$ (9:02 am). The first and second packets may arrive at a server at times $t_3$ (9:04 am) and $t_4$ (9:07 am), respectively. The clock skew of the computer can be thus calculated as the rate at which time is lost in this instance: $t_3-t_1=3$ mins; $t_4-t_2=5$ mins (may assume time differences are not attributed to network delays, latency etc. beyond clock skew). The internal delta of time parameter or clock skew in the context of this embodiment of the invention herein may be calculated as follows: 5 mins−3 mins=2 mins divided by 3 mins (which is the selected period of time between first and second packets). In other words, during the 3 mins of time between sending the first and second data packets, the computer clock lost or ran slow 2 mins (0.666 min/min). While clock skew in general is instead measured on the order of microseconds rather than minutes, this example illustrates how these and other embodiments of the invention are not limited to certain ranges. Other units of measurements are applicable to the delta of time parameters as mentioned elsewhere herein. It shall be understood that both internal and external deltas of time can be applied individually or in combination by themselves, or in addition to other parameters as described herein to provide a distinctive PC fingerprint.

In accordance with some embodiments of the invention, sharing user and/or user device information within one or more consortia may result in the collection of information in different formats. For example, various user devices may store dates and times in different formats. One device may store a date as Jul. 1, 2006 3:00:00 PM, while another device may store the date as 07/01/2006 15:00:00. In order to share data from different devices which may have different formats, consortium may have a data normalization method which may standardize the data to a common format.

In some embodiments an online host may standardize the information gathered from one or more user devices. Furthermore, in some embodiments of the invention, an authentication repository may standardize the information gathered from one or more hosts. In other embodiments, the online hosts of a consortium may standardize the information gathered from user devices in the same manner, such that they are already standardized with respect to one another.

Similarly, when one or more consortia are in communication with one another, the information gathered from user devices may be normalized. This may occur at the host level, or at the authentication repository level, or any other level. For example, when multiple authentication repositories are communicating with one another, the repositories may normalize the collected data in a consortium, and when communicating with another authentication repository, may convert the data from another authentication repository into a standard format to share with the hosts of its own consortium. Any data formatting system or method may be set up or developed in order to accommodate the sharing of information from multiple sources across one or more consortia.

FIG. 3 shows an exemplary implementation of the consortium. A plurality of organizations, such as Airlines 1-6 may be part of a user group, where the members of the user group may agree to share selected data. For example, each of the airlines of the user group may agree to share fraud-related data. Each airline of the group may interact with one or more device. For example, user computers may access a server of an airline. In some embodiments, the same user computers may interact with multiple airlines. Any description herein relating to an airline (or figures referring to airlines) may also be interchangeable with a banking organization, any other financial institution, a merchant, or any other organization.

The user group may also include a user management module. The user management module may allow members of the group (such as the airlines) to agree to share selected fraud related data. In some embodiments, the user management module may facilitate the actual sharing of data. For example, the user management module may store some of the fraud related data. Alternatively, the user management module may assist with the transfer of data from one airline's server to another airline's server. In other embodiments, it may assist with running the user group without actually implementing the data sharing.

The airlines may be sharing any data with one another. For example, the airlines may be sharing computer identifiers (CI) and/or global identifier with one another. A CI can consist of one or more personal and non-personal parameters. An example of a non-personal parameter may be a delta of time parameter. The airlines may share any other personal or non-personal data, which may include name, credit card number, email address, home address, or any other fraud-related data as discussed herein.

A user management module may obtain data elements that may be shared across the user group. The shared data elements may include personal in formation information, such as email address, billing address, name, etc., as well as non-personal information, such as PCPrint information, which may be extracted from a device and be based on a composite of the information extracted from the device. In some embodiments a PCPrint may be a hash string based on information collected from the device. In some embodiments, a delta of time parameter may be obtained separately or in addition to the PCPrint. The combination of the PCPrint and delta of time parameter may or may not be hashed.

Preferably, data collected to form a computer identifier, such as a PCPrint may be extracted from a device. Data may be extracted without downloading an application or otherwise providing a client to the device. Thus, the system may operate taglessly. A computer identifier or other parameters may function differently from a tag, in that they are not a number or value pushed onto a device. Rather, information may be pulled from the device to form the computer identifier, or any other identifying parameter. The system may be operating clientlessly.

Figure 4:
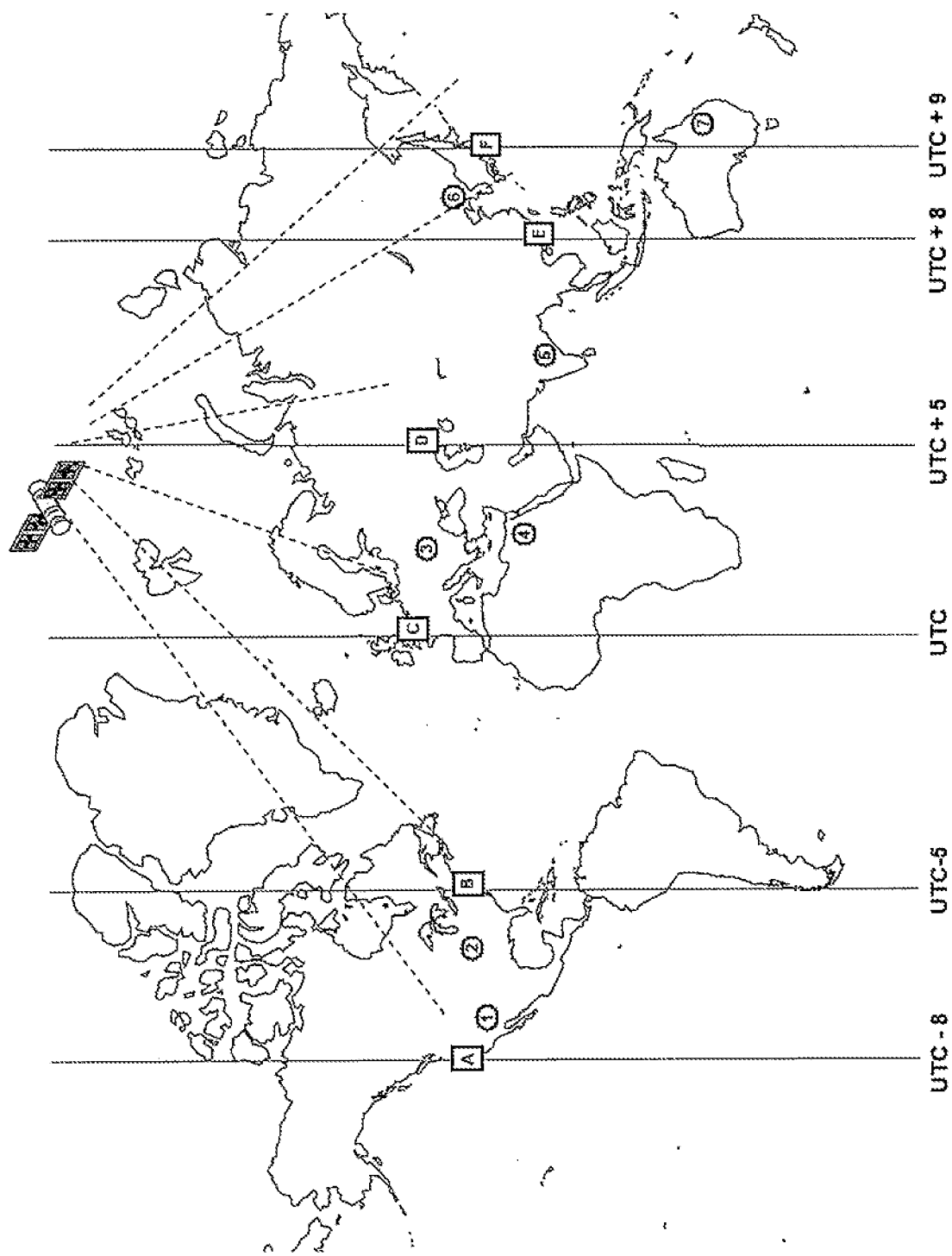
FIG. 4 illustrates an implementation of the consortium in a global setting.

FIG. 4 illustrates an implementation of the consortium in a global setting. When calculating a delta of time parameter for a user device in a consortium where a user device may interact with one or more online hosts, accommodations may be made to enable a consistent delta of time calculation between the user device and multiple hosts.

A challenge may arise when multiple online host servers have different clock times or are located in different time zones. For example, server A may be located at a time zone that is UTC −8, server B may be located a time zone that is UTC −5, server C may be located at a time zone that is UTC, server D may be located at a time zone that is UTC +5, server E may be located at a time zone that is UTC +8, and server F may be located at a time zone that is UTC +9. The various online host servers may be located anywhere in the world, such that some or all of the servers may be in different time zones. Similarly, various user devices may be located globally as well. For example, client computers 1-7 are scattered throughout the world. Client computers may be able to interact with one or more servers, which may or may not be in different time zones.

Using the previously described embodiment of the invention of calculating a delta of time parameter by taking the difference between the client computer time and the host server local time may result in discrepancies within a consortium if a standardized time is not used. For example, if a server A is located at UTC −8, and a server B is located at UTC −5, and client computer 1 is located at UTC −7, a delta of time between client computer 1 and server A may be +1, while a delta of time between client computer 1 and server B may be −2. If this information is shared within the consortium, it will appear that client computer 1 has inconsistent delta of times. Various embodiments of the invention may be used to accommodate calculating a delta of time parameter within a consortium.

As discussed previously, a website server can capture the local time of the client computer, as well as a reference time. In some embodiments of the invention, the reference time may be the time of the server's computer. The time of a server's computer may include the local server time and any relevant time zone information, or the server may be synchronized to a set time, such as the authentication repository time or UTC time. For example, in some cases, the website servers in a consortium may all automatically be synchronized to a time. For instance, the authentication repository may cause the website servers to synchronize to an authentication repository time, which in some cases may be synchronized to UTC time.

The synchronization may occur by any methods known in the art. In one example, the servers may be synchronized via a satellite or satellite network. In another example, software may be used to synchronize the servers. In some implementations, the website servers may be synchronized to a reference time, such as UTC time, by asking them to voluntarily synchronize their clocks to the reference time.

In other implementations, the website servers may be synchronized such that they are synchronized to their local time—i.e. when it is precisely 9:00:00 AM in California, server A may be synchronized to be 9:00:00 AM, while server B may be synchronized to be precisely 12:00:00 PM. When calculating a delta of time parameter, the relevant time zone information of the servers may be taken into account. Similarly, in some other implementations, the website servers may not be synchronized at all, such as server A may think it's 9:00:00 AM in California, while server B may think it's 12:00:45 PM in New York. The offset between the two servers may be tracked and be taken into account. In some cases, the authentication repository may keep track of the difference in times between the various servers.

In some embodiments of the invention, the reference time may be an authentication repository time. For example, a delta of time parameter may be determined by the difference between the client computer and the authentication repository time. In some cases, the authentication repository time may be synchronized with a global time, such as UTC, and the delta of time parameter may be the difference between the client computer and UTC. In some other cases, an authentication repository time may be an authentication repository local time, or an arbitrary time.

One implementation of the invention taking relevant time zone information into account is illustrated in greater detail. For instance, a delta of time parameter may be calculated between a local client time and local host server time with relevant time zone information taken into account. Each local time for any client or server connected to the Internet or other network system can be measured according to the clock for that particular device. The measured Delta Time parameter for any selected moment of action in accordance with the invention may be perceived as having two temporal components: an actual time and a time zone. For example, the measured local time at a client site may include a Browser Time of Feb. 1, 2005 14:00:00 PM, and a Browser Time Zone of UTC −8. In one example, a measured local time at a server site may include a Server Time of Feb. 1, 2005 17:01:13 PM, and a Server Time Zone of UTC −5. The Delta Time as between the Browser Time and the Server Time, and the Browser Time Zone in comparison to the Server Time Zone, can be therefore calculated in accordance with the invention.

A preferable embodiment of the invention provides a Delta Time or time differential which takes into consideration daylight saving time (DST) in selected time zones and countries around the world. In addition to collecting respective local times and time zones from clients or customer computers and website servers at a current selected date or moment of action, a website server or any other network computer can also capture information relating to particular time and time zones for selected (future or even past) dates. A selected Delta Time during DST (DST Delta Time) can be determined for a particular customer or client computer when the registered time for such other date is different than the current selected date. For example, the Delta Time value for such other date(s) can be +/−one hour ahead or behind. For time zones that do not observe DST, the Delta Time value will remain unchanged during such dates when DST would be normally observed. By calculating and identifying values for Delta Time and relevant Time Zones for multiple dates ahead of time in accordance with the invention, accurate delta of time values can be provided to assist in uniquely identifying or fingerprinting a client or customer computer throughout the year regardless of whether DST is observed in the relevant country or region of the world. Because only certain countries and regions of the world observe DST while others do not, it may be possible to pinpoint in which location the device resides based at least in part on the geo-location fingerprints provided by the invention.

DST (also called Summer Time) is the portion of the year in which the local time of a region is usually advanced by one hour from its official standard time. This system was originally intended to "save" daylight, as opposed to "wasting" time (for example, by sleeping past sunrise). The official time is adjusted forward during the spring and summer months, so that the active hours of daily life involving events such as work and school will better match the hours of daylight in theory. Today approximately 70 countries utilize DST in at least a portion therein—the only major industrialized country not to have introduced daylight saving is currently Japan. DST begins for most of the United States of America at 2:00 AM on the first Sunday of April and clocks are turned (spring) forward one hour. Time reverts to standard time at 2:00 AM on the last Sunday of October and clocks are turned (fall) back one hour. Each time zone switches to and from DST at a different time. Furthermore, legislation may be passed by Congress and other state governmental bodies from time to time on whether to observe, shorten or lengthen DST. DST for the United States of America and its territories is not observed in Hawaii, American Samoa, Guam, Puerto Rico, the Virgin Islands, most of the Eastern Time Zone portion of the State of Indiana, and the state of Arizona (except the Navajo Indian Reservation which does observe DST). Meanwhile, for all countries in the European Union except Iceland, Summer Time begins and ends at 1:00 AM Coordinated Universal Time, UTC which generally starts on the last Sunday in March, and ends the last Sunday in October. All time zones change at the same moment in the EU. It shall be understood that observance of DST is controversial and ever changing so the. delta of time parameter provided in accordance with this embodiment of the invention can be flexibly adapted to devices all over the world when it changes and whether or not DST is observed in certain countries or states within particular time zones.

In this embodiment of the invention, various time zones can be predetermined such that it is known ahead of time whether or not DST is applicable for that region. For example, a Delta Time parameter may be calculated for a client computer at some future date(s) during DST. When the clock of a client computer registers a time of 8:00 PM PST (Coordinated Universal Time UTC −8) on a selected date during the fall season, its respective delta of time is changed one hour ahead to 9:00 PM PST (UTC −8) on a selected date in the spring season to account for DST when applicable. By collecting and determining times at one or more selected dates in the future, it is possible to determine whether a device will or will not go into DST from the beginning rather than waiting until later to see whether the registered time is the same or different. This will also assist in identifying the country or region for a selected user device. Accordingly, seemingly unrelated transactions can be linked at least in part from a distinctive timestamp delta of time (Delta Time) that can be measured from the internal clock or data (TCP, NTP, RTP etc. timestamps within data packets) sent from the device. It should be understood that the Delta Time parameter can be calculated according to any selected units of time as with other embodiments of the invention herein such as days, hours, minutes, seconds, or milliseconds.

Figure 5A:
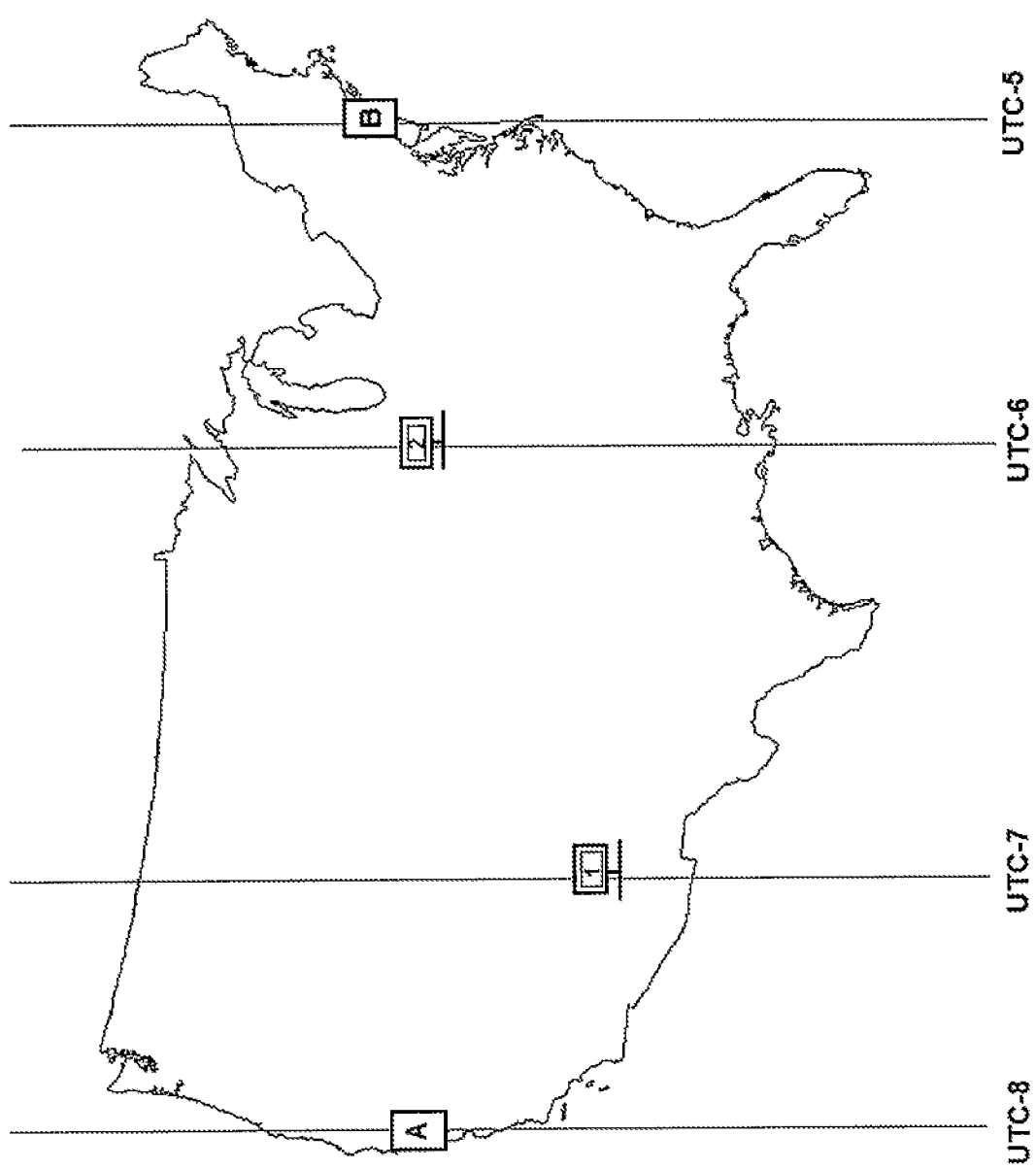
FIG. 5A illustrates an implementation of the consortium with a reference time.

FIG. 5A illustrates an implementation of the consortium with a reference time. Server A may be located at a time zone that is UTC −8, and server B may be located a time zone that is UTC −5. User device 1 may be located at a time zone that is UTC −7 and user device 2 may be located at a time zone that is UTC −6.

FIG. 5B shows a table with an example of the use of the consortium with a reference time. For instance, user devices 1 and 2 may interact with server A. In one transaction, server A's local time may be 1/1/08 9:00 AM while user device 1's local time may be 1/1/08 10:00 AM. Additional information about the user computer may be stored in any format, which in some cases may include a hash string. In some embodiments of the invention, a delta of time may be calculated as the difference between the user device local time and the server local time, which in this case would yield an initial delta of time value of +1 hours. In another transaction, server A's local time may be 1/1/08 9:05 AM while user device 2's local time may be 1/1/08 11:05 AM. If calculating the difference between the user device local time and the server local time, an initial delta of time value may be +2 hours.

However, as previously discussed, when a user device may interact with multiple servers which may not have the same time, challenges for calculating the delta of time may arise. For instance, user devices 1 and 2 may also interact with server B. In one transaction, server B's local time may be 1/1/08 11:00 AM while user device 1's local time may be 1/1/08 9:00 AM. If calculating a delta of time as the difference between the user device local time and the server local time, an initial delta of time value for user device 1 would be −2 hours. In another transaction, server B's local time may be 1/1/08 11:05 AM while user device 2's local time may be 1/1/08 10:05 AM. If calculating a delta of time as the difference between the user device local time and the server local time, an initial delta of time value for user device 2 would be −1 hours. This shows a discrepancy may exist in information shared between servers A and B, where for servers A and B, user device 1 has an initial delta of time value of +1 hours and −2 hours respectively, and user device 2 has an initial delta of time value of +2 hours and −1 hours respectively.

In some embodiments, the relevant time zone information is considered and accounted for in the delta of time parameter. For example, the difference between a server time and a consortium time may be used to offset the initial delta of time value. For example, if the consortium time is UTC time, a time difference between server A and UTC may be −8 hours, and a time difference between server B and UTC may be −5 hours. The offset may be added to the initial delta of time value, which for both servers A and B would yield a delta of time parameter of −7 hours for user device 1 with respect to the consortium time, and a delta of parameter of −6 hours for user device 2 with respect to the consortium time. Thus, in some embodiments, adding a delta of time between a local server time and consortium time to a difference between a user device time and a local server time may yield a delta of time parameter for a user device with respect to the consortium time.

In a preferable embodiment, clocks of servers A and B may be synchronized to a consortium reference time, such as UTC. During a transaction between server A and user device 1, user device 1's local time may be 10:00 AM while the consortium time may be 1/1/08 5:00 PM. A delta of time parameter may be calculated as the difference between user device 1's local time and the consortium time to yield a delta of time of −7 hours for user device 1. During another transaction between server A and user device 2, user device 2's local time may be 11:05 AM while the consortium time may be 1/1/08 5:05 PM. A delta of time parameter may be calculated as the difference between user device 2's local time and the consortium time to yield a delta of time of −6 hours for user device 2.

Similarly, during a transaction between server B and user device 1, user device 1's local time may be 1/1/08 9:00 AM while the consortium time may be 1/1/08 4:00 PM. A delta of time parameter may be calculated as the difference between user device 1's local time and the consortium time to yield a delta of time of −7 hours for user device 1. During another transaction between server B and user device 2, user device 2's local time may be 1/1/08 10:05 AM while the consortium time may be 1/1/08 4:05 PM. A delta of time parameter may be calculated as the difference between user device 2's local time and the consortium time to yield a delta of time of −6 hours for user device 2. The delta of time parameters of user devices 1 and 2 may be consistent between servers A and B because servers A and B are synchronized to a consortium time.

Figure 6A:
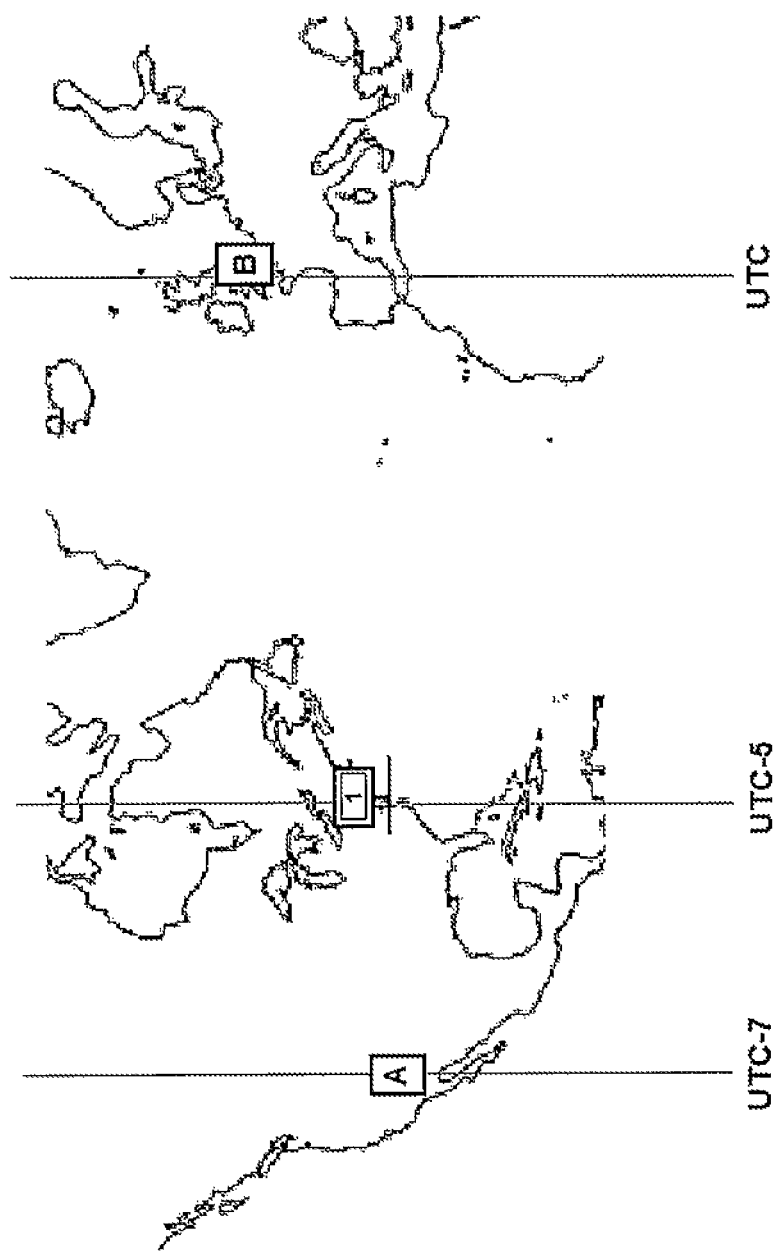
FIG. 6A illustrates an additional implementation of the consortium with a reference time.

FIG. 6A illustrates an additional implementation of the consortium with a reference time. Server A may be located at a time zone that is UTC −7, and server B may be located a time zone that is at UTC time. User device 1 may be located at a time zone that is UTC −5.

FIG. 6B shows a table with an additional example of the use of the consortium with a reference time. For instance, user device 1 may interact with servers A and B. In one transaction, server A's local time may be 1/1/08 8:00 AM while user device 1's local time may be 1/1/08 10:00 AM. In some embodiments of the invention, a delta of time may be calculated as the difference between the user device local time and the server local time, which in this case would yield an initial delta of time value of +2 hours. In another transaction, server B's local time may be 1/1/08 4:00 PM while user device 1's local time may be 1/1/08 11:00 AM. If calculating a delta of time as the difference between the user device local time and the server local time, an initial delta of time value for user device 1 would be −5 hours. Again, this shows a discrepancy may exist in the information shared between servers A and B.

In some embodiments, the relevant time zone information is corrected and accounted for in the delta of time parameter. For example, the difference between a server time and a consortium time may be used to offset the initial delta of time value. For example, if the consortium time is UTC time, a time difference between server A and UTC may be −7 hours, and a time difference between server B and UTC may be 0 hours. The offset may be added to the initial delta of time value, which for both servers A and B would yield a delta of time parameter of −5 hours for user device 1 with respect to the consortium time. Thus, in some embodiments, adding a delta of time between a local server time and consortium time to a difference between a user device time and a local server time may yield a delta of time parameter for a user device with respect to the consortium time.

This principle may apply in any situation where the servers are not synchronized. For example, server times may be determined by their own clocks, which may or may not be accurate. Adding a time difference between the server time and consortium time to the difference between a user device time and server time may yield a delta of time parameter for a user device with respect to the consortium time, irrespective of whether a server clock is accurate or not. However, the time difference between the server time and consortium time must be tracked in order to calculated offsets.

In a preferable embodiment, clocks of servers A and B may be synchronized to a consortium reference time, such as UTC. During a transaction between server A and user device 1, user device 1's local time may be 1/1/08 10:00 AM while the consortium time may be 1/1/08 3:00 PM. A delta of time parameter may be calculated as the difference between user device 1's local time and the consortium time to yield a delta of time of −5 hours for user device 1. Similarly, during a transaction between server B and user device 1, user device 1's local time may be 1/1/08 11:00 AM while the consortium time may be 1/1/08 4:00 PM. A delta of time parameter may be calculated as the difference between user device 1's local time and the consortium time to yield a delta of time of −5 hours for user device 1. The delta of time parameters of user device 1 may be consistent between servers A and B because servers A and B are synchronized to a consortium time.

In another embodiment of the invention, a delta of time parameter may be calculated between the user device local time and an authentication repository time. For instance, the delta of time parameter may be calculated as user device 1's time minus repository time X. Repository time X may be the consortium reference time, which in some implementations may be UTC time. However, regardless of what the actual value of X is, during a first transaction between server A and user device 1, user device 1's local time may be 1/1/08 10:00 AM while repository time may be X. A delta of time parameter may be calculated as 1/1/08 10:00 AM−X hours for user device 1. Similarly, during a second transaction that occurs 1 hours later between server B and user device 1, user device 1's local time may be 1/1/08 11:00 AM while the repository time may be X+1:00 hour. A delta of time parameter may be calculated as 1/1/08 11:00 AM−(X+1 hour)=1/1/08 10:00 AM −X hours for user device 1. The delta of time parameters of user device 1 may be consistent between servers A and B when the delta of time is taken between the user device and authentication repository.

As discussed previously, a consortium time may be any reference time, which in some cases may be the UTC time. Also, any other reference time may be used, including an arbitrary time, or an authentication repository clock time, which may be the local time according to an authentication repository clock or which may be synchronized to another time, such as UTC time.

Another aspect of the invention provided herein extends to detecting and preventing fraudulent transaction based on information obtained through "scams" or deceptive practices developed to gain personal, confidential and/or financial information. For example, a common technique today known as "phishing" involves gaining personal information from an individual to commit identify theft by typically using fraudulent e-mail messages that appear to come from legitimate businesses. "Phishing" can be defined as the act of sending an e-mail to a user falsely claiming to be an established legitimate enterprise in an attempt to scam the user into surrendering private information that will be used for identity theft. The e-mail often directs the user to visit a website where they are asked to provide or update personal information, such as passwords and credit card, social security, and bank account numbers, that the legitimate organization already has. But the website to which the user is directed is phony and established to steal the user information during a fake session. For example, a widely recognized website, e.g., eBay, can be targeted in a phishing scam whereby users received e mails supposedly claiming that the user account is about to be suspended unless they clicked-on a provided link and updated the credit card information that the genuine website already had. Because it is relatively simple to make a website look like a legitimate organizations site by mimicking the HTML code, people can be tricked into thinking they were actually being contacted by the website and will subsequently go to the fraudulent site to update or provide their account information. Moreover, by spamming large groups of people (or spamming them which spam sent over Instant Messaging (IM) applications that can include links to fake sites), the "phisher" could rely on a response from at least some percentage of people who actually had listed credit card numbers with the website legitimately. The concept of phishing in general can also referred to as brand spoofing or carding, a variation on the idea whereby bait is set with the hope that some will bite despite most individuals knowing better. By way of these seemingly legitimate e-mails, criminals "go fishing" for information which is in turn later used to gain access to a real account. Such information includes commonly stolen items in identify theft including a personal identification number (PIN), user account name, a credit card number, and an account number. Regardless of how this information is obtained, the fraud detection and prevention systems provided herein incorporate unique fraud parameters such as delta of time and clock differential parameters to "phish"-out fraudsters from legitimate users.

The criminal act that is often committed after information is "phished" can be ultimately referred to as "account takeover." These scams are commonly committed by e-mail to users at least partially because millions can be rapidly and efficiently sent to random or selected individuals, but other techniques can involve transmission of a virus through attachments to e-mails. In particular, some viruses can be created to replace the universal resource locator (URL) of a merchant, financial institution or other party commonly stored in a web browser "Favorites" folder. Instead of being routed to an intended legitimate website, the user is sent to a fake or spoofed site where user information is shared unknowingly with a fraudster. Similar in nature to e-mail phishing, another Internet scam referred to as "pharming" seeks to obtain personal or private (usually financial related) information through domain spoofing. Rather than being spammed with malicious and mischievous e-mail requests for you to visit spoof websites which appear legitimate, pharming can "poison" a DNS server by infusing into it false information resulting in a user request being redirected elsewhere. A browser however will indicate the correct website location, which can make pharming a bit more serious and more difficult to detect. A distinction however is that generally phishing attempts to scam people one at a time with an e-mail while pharming allows the scammers to target large groups of people at one time through domain spoofing. Meanwhile, "spoofing" basically includes a variety of ways in which hardware and software can be fooled into operating as if there was a legitimate transaction or exchange taking place. "IP spoofing" more particularly involves trickery that makes a message appear as if it came from an authorized IP address, e.g., e-mails spoofing. As a result, access can be gained to computers through IP spoofing when an intruder sends messages to a computer with an IP address indicating that the message is coming from a trusted host. To engage in IP spoofing, a hacker must first use a variety of techniques to find an IP address of a trusted host and then modify the packet headers so that it appears that the packets are coming from that host.

Malicious software (aka malware) can be also involuntarily downloaded to a computer and designed specifically to damage or disrupt a system by means of a virus or a Trojan horse. A "Trojan horse" is a program that masquerades as a benign application and unlike many viruses, they do not replicate themselves but can be just as destructive. One of the most insidious types of Trojan horse is a program that claims to rid your computer of viruses but instead introduces viruses onto a computer. The concepts relating to fraud detection and prevention can be applied also to other traditional methods of stealing personal information also include e-mail or other means that involve a fake premise or story such as seeking help fleeing from a third world country (e.g., Nigerian scam) or conducting some type of customer service call or transaction (e.g., "Hello, I am from your bank . . . ").

The fundamental problem of user authentication is exploited time and time again in order to commit fraudulent transaction online. Both financial institutions and merchants face a shared problem and ultimate challenge in properly authenticating who is really on the opposite end of a transaction. Information such as account user names and passwords are useless and rendered ineffective as reliable credentials in light of phishing and other Internet fraud scams. Authentication can be attempted by obtaining various types of information broadly ranging from any or all of the following: something you have; something you know; and/or something you are (biometrics). These include information obtained from tokens (hard, soft, dynamic), shared secret or things not commonly known such as a mother's maiden, a pet's name or a favorite color. An evolving system of security certificates (encryption with public key infrastructure (PKI), secure sockets layer (SSL)) may be relied upon also to verify and authenticate the validity of a party involved in an Internet transaction. Third party bureaus are also relied upon to provide information that can be used to authenticate an individual such as D&B reports, credit histories from Equifax and other agencies, and also Caller ID to identify the number associated with a person. At the same time, a user may attempt to authenticate a merchant, bank or other party at the other end of an online transaction also. Various tool bars may be employed to allow users to verify a website, an IP address or some other indication that a user is indeed in contact with a merchant, bank or other desired party in a transaction.

The information and actions by a party attempting to prevent or detect fraud is often met with an equally effective and opposite countermeasure by learned fraudsters. When banks or merchants create user names and passwords, they can be rendered ineffective by numerous scams and ways of obtaining user information such as phishing and key-loggers. "Key-loggers" are a type of surveillance software such as spyware that has the capability to record keystrokes to a log file (usually encrypted) made from instant messages, e-mail and any information (including e-mail addresses and website URLs visited) typed using a keyboard which can be later sent to a specified receiver. Key-loggers, as a surveillance tool, are often used by employers to ensure employees use work computers for business purposes only. Unfortunately, key-loggers can also be embedded in spyware allowing your information to be transmitted to an unknown third party. Similarly, cookies that are often created to contain selected information used for identification can be simply deleted, and IP addresses that are associated with fraud can simply hide behind proxies.

Furthermore, when tokens are frequently used as a security measure to gain access to user information, the entire session or exchange can be merely cloned. The term "session cloning" may be defined as the ability of a third party to duplicate the session ID of a user and use it to interact with the web-based application at the same time as the original user. Session cloning is generally more of a threat when session IDs are predictable or obtainable, or if the site allows IP hopping. IP hopping is permitting the user to change their IP address mid-session without having to re-authenticate to the website. To minimize fraud and prevent IP hopping, one alternative is to track the domain of the source address (remembering domains can have more than two components) and require re-authentication if the domain changes. This does not prevent IP hopping within the same ISP but does limit the exposure. Another option to minimize risk is to consider using an inactivity timeout or terminating a session after a certain period of inactivity in order to protect people who leave their accounts signed-on and their systems unattended. Regardless of these preventative measures taken against session cloning, the risk of fraud remains which provides an opportunity for the invention herein to detect and prevent such activity when an attempt is made to use information from a computer.

Additionally, systems and methods described herein may be used to establish device and/or user reputation. A trust or reputation score or rating may be generated. In some instances, reputation scores may be built or evolve over time. Low reputation scores may be indicators of increased fraud threat, such as those described herein. High reputation scores may be indicators of decreased fraud threat. In some instances, "denial of service" (DDOS) attacks, such as distributed denial of service attacks, may occur in an attempt to make a machine or network resource unavailable to its intended users. Perpetrators may target sites or services, and saturate the target machine(s) with external communication requests, such that it cannot respond to legitimate traffic, or responds so slowly as to be rendered essentially unavailable, which can lead to server overload. The DDOS attack can force the targeted device(s) to reset, or consume their resources so that it can no longer provide its intended service or obstruct the communication media between the intended users and the victim. Establishing a trust or reputation score can assist with preventing or reducing the effectiveness of DDOS attacks. In some instances, devices with low reputations can be ignored by the servers or other devices. In some instances, during an attack, all devices may be ignored, except those that have a high reputation or trust, which may be permitted to pass through to access the servers or other devices. Thus, devices with high reputations may be provided access in situations where other devices are denied access.

It shall be understood that the description of fraudulent schemes provided herein is not exhaustive and that additional techniques will be developed in the future to improperly gain access to user information. Regardless of the means and methods used to obtain such information, the concepts of the invention can be applied to detect and prevent fraud by uniquely linking or fingerprinting such criminal activity with devices based upon selected delta of time parameters, clock differentials and time based parameters provided elsewhere herein. The sharing of information across one or more consortia may allow fraud detection systems to benefit from a larger pool of information, and thereby be more likely to detect and prevent fraud. These solutions can be implemented with no behavioral modification and have a zero imposition on a user as new ways are constantly developed to break past security barriers. The onus is not placed on the consumer to prevent attacks, nor is the consumer asked to change certain behavior to combat phishing or any other criminal behavior or scheme developed in the future.

An aspect of the invention may be directed to identifying a device in order to provide a device with access to a system or enable a device to perform an action with a system. For example, a device may be attempting to engage in an online transaction. In some instances, the device may perform an online transaction with an entity via the entity's system or a third party system. In some instances, the device may be permitted to access the system (e.g., access information on the system) or perform an action (e.g., online transaction), once the device has been verified.

In some instances, the device may be verified or information about the device may be accessed by the entity or the third party system. In some examples, the third party system may be a bank (e.g., acquiring bank, issuing bank) or global financial service (e.g., credit card company, debit card company, prepaid card company, gift card company, bank). In some instances, the third party system may be verifying or confirming a transaction between the device and the entity. For example, if the entity is a merchant, a user may participate in a financial transaction with the merchant. The merchant, or a financial institution involved in verifying the payment on behalf of the merchant, may be able to use information identifying the device to access records associated with the device. Such records may assist in determining whether to confirm or deny the transaction. The records may include reputation information about the device, which may be used for confirming or denying the transaction.

In some embodiments, a registry may be provided wherein the device may be registered. In some instances, the device may be pre-registered via an action by a user of the device. For example, a consumer for an online merchant or other entity may register the device with the registry. Such registration may occur by the user manually entering information about the device and/or user, or by automatically collecting information about the device and/or user, or any combination thereof. For example, the user may select an option to register the device, and the device's fingerprint may be collected. Information used to identify and/or register the device may include any information discussed elsewhere herein, including but not limited to IP addresses, delta of time parameters, or any other information. Specific characteristics of the device may be collected alone or in combination. A registry may have a device identifier for the registered device which may be derived from information about the device, such as a non-personal parameter and a delta of time parameter. Optionally, such information may be extracted from the device in a tagless manner. Such information may be pulled without requiring further intervention from the user. Alternatively, the user may provide additional information that may assist with the registration process. The user may provide information that may connect the user personal information with the user device information.

A user may be presented with a graphical user interface for registering the device. In some embodiments, the graphical user interface may be displayed on the device to be registered. Alternatively, the graphical user interface may be displayed on a separate device from the device to be registered. The graphical user interface may prompt a user to provide information about the user and/or the user device. In some embodiments, information about the device may be collected for registering the device without requiring any entry of information through the graphical user interface. The user may be authenticated (e.g., enter a password) prior to registering a device. The registered device may be associated in the registry with user information.

In some embodiments, a device may only be permitted to access a system and/or interact with the system if the device has been registered in the registry. Information about the device may be collected and compared to information in the registry to determine if the device has already been registered. For example, a device fingerprint may be pulled when the device is attempting to access a system and/or perform an action. The device fingerprint may be compared to one or more device fingerprint stored in the registry. One or more characteristic of the device (e.g., IP address, delta of time), alone or in aggregate may be compared with one or more characteristic of the device stored in the registry. It may be determined whether a device identifier for the current device matches a device identifier stored in the registry. Strict or loose tolerances for matching may be provided. In one example, a matching parameter may be generated between the device information stored in the registry and that is currently being used. If fewer differences are provided between the current device and a registered device, the matching parameter may have a lower value, or a higher value. If the matching parameter falls within an expected range (e.g., indicating a high likelihood of a match), the current device may be identified as the registered device. In some embodiments, the match of the characteristics of the devices must be exact in order to identify a current device as a registered device. In other embodiments, some parameters may change slightly and still permit a current a device to be identified as a registered device. Once there is confirmation that the current device is on the registry, the device may be permitted to access the system and/or perform an action on the system.

The registry may serve as a gatekeeper to determine whether a device may be able to access the system and/or perform an action. For example, if a device has not been registered, the device may be prevented from accessing the system and/or performing an action on the system. In some instances, the devices may be capable of performing certain actions on the system without being on the registry, but may require registration for performing other specific actions (e.g., transactions involving the exchange of funds, goods, and/or services, or accessing sensitive information).

In some embodiments, a device may be flagged as engaging in fraudulent or suspicious behavior. Such information may be tracked by the registry. In some instances, access may be denied or restricted for such flagged devices. For example devices with known fraudulent transactions may be prevented from making online transactions. Devices that have been engaging in suspicious activity may be prevented from making online transactions. In some embodiments, information about suspicious activity may be accumulated over time. Such information may be provided to the registry and/or stored at the registry. In some embodiments, a threshold of suspicious activity may be surpassed before putting a registered device on a blacklist where the device can not be used to perform certain online transactions. A registry may track and/or monitor which devices have permission to access and/or perform actions within a system (which may encompass a single entity or multiple entities), and which do not.

The registry may link user information with device information. For example, users may register specific devices. The users may specify that only registered devices may be used to access the system and/or perform an action. In one instances, only registered devices may be used for online transactions that involve the user. If someone who claims to be the same user tries to access the system using a different device, the system may deny access. This may provide an additional level of security. The user may add or remove devices from the registry. The user may be authenticated prior to adding or removing devices from the registry. Different levels of access and/or actions may be permitted depending on device identity. For example, the user may specify that a first device may be able to perform all types of online transactions while a second device may be used for only particular types of transactions.

In some embodiments, a registry may be specific to a merchant, online organization, or other entity. For example, each entity may have its own registry where the user may register one or more devices. The rules of whether a device can be used for various levels of access and/or action may be specific to the entity. For example, a user may have an account at a first website, and may register a first device and a second device. The user may have an account at a second website and may register the second account only. The registries may or may not share information. Sharing information may occur via a consortium, such as those described elsewhere herein. For example, if a device is found to be fraudulent based on a transaction with a first entity, such information may be shared among the various entities of the consortium, and registries may be updated accordingly. For example, if a fraudulent transaction occurs with a first entity, the registry of a second entity may be flagged for the same device, and that device may be denied access or may not be permitted to perform an online transaction at the second entity. Device identification in order to determine if the device is already registered may occur in accordance with embodiments described elsewhere herein. For example, a device fingerprint may be taken. One or more characteristic of the device, such as IP address and/or delta of time parameter may be used to determine whether a device is one of the devices that the user has registered.

In some embodiments, a registry may be shared across a consortium. A user may specify devices that are to be registered with the registry and permitted to access and/or perform certain actions on behalf of the user. This may be applied universally to all of the entities within the consortium. For example, the user may access a first website and a second website. The user may specify a first device and second device that has been registered with the consortium registry. Thus, the first and second devices may be used to perform an online transaction on the first and second websites on behalf of the user. A user may be able to add or remove a device from a registry, and such addition or removal of the device may be applied to all entities across the consortium. Device identification in order to determine if the device is already registered may occur in accordance with embodiments described elsewhere herein. For example, a device fingerprint may be taken. One or more characteristic of the device, such as IP address and/or delta of time parameter may be used to determine whether a device is one of the devices that the user has registered with the consortium registry.

The registry may be stored in any memory described herein. The registry may be distributed over a single or multiple databases. In some instances, the registry may be provided in a distributed manner on a cloud computing infrastructure. The registry may be provided with an authentication repository or separately from the authentication repository. The registry may also operate in a peer to peer manner.

The systems and methods described herein may utilize or be combined with aspects, components, characteristics, steps, or features of one or more of the following: U.S. Pat. No. 7,853,533 issued Dec. 14, 2010; U.S. Patent Publication No. 2009/0083184 published Mar. 26, 2009; U.S. patent application Ser. No. 12/732,034 filed Mar. 25, 2010 entitled SYSTEMS AND METHODS OF SHARING INFORMATION THROUGH A TAG-BASED CONSORTIUM; and PCT Patent Application No. PCT/US2013/053495 filed Aug. 2, 2013 entitled SYSTEMS AND METHODS FOR ACCESSING RECORDS VIA DERIVATIVE LOCATORS, which are hereby incorporated by reference in their entirety.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A computer-implemented method comprising:
by a computer processor of an authentication server:
receiving a first device identifier associated with a first device during an online transaction;
comparing the first device identifier to a second device identifier to formulate a device similarity score;
determining that the second device identifier evolved from the first device identifier based at least in part on the device similarity score and an indication that one or more parameters associated with the second device identifier have changed;
retrieving a trust score associated with the second device identifier, the trust score indicating a likelihood of a device associated with the second device identifier to engage in a fraudulent activity; and
based at least in part on a determination that the trust score associated with the second device identifier is below a predetermined threshold, flagging the online transaction associated with the first device identifier as potentially fraudulent.

2. The computer-implemented method of claim 1, wherein the device similarity score indicates a likelihood that the first device identifier and the second device identifier belong to the first device.

3. The computer-implemented method of claim 1, wherein the device similarity score is determined based at least in part on numerical or value differences between one or more parameters associated with the first device identifier and the second device identifier.

4. The computer-implemented method of claim 1, wherein the device similarity score is determined based at least in part on similarity thresholds for each of parameters associated with the first device identifier and the second device identifier.

5. The computer-implemented method of claim 4, wherein the similarity thresholds are determined based at least in part on expected rate of change for each of the parameters associated with the first device identifier and the second device identifier.

6. The computer-implemented method of claim 1, wherein the second device identifier is associated with one or more known online fraudulent transaction.

7. The computer-implemented method of claim 1, wherein the first device identifier is associated with an anchor value comprising personal information of a user of the first device.

8. The computer-implemented method of claim 7, wherein the anchor is selected from one or more of the following: email address, credit card number, name, social security number, phone number, IP address, class C address, user ID, ABA routing number, or account number.

9. The computer-implemented method of claim 1 further comprising:
based at least in part on a determination that the trust score associated with the second device identifier is below the predetermined threshold, denying the online transaction.

10. The computer-implemented method of claim 1 further comprising:
based at least in part on a determination that the trust score associated with the second device identifier is below the predetermined threshold, requesting additional authentication information from the first device.

11. The computer-implemented method of claim 1 further comprising:
based at least in part on the determination that the second device identifier evolved from the first device identifier:
accessing a global identifier associated with the first device identifier and the online transaction; and
associating the second device identifier with the global identifier,
wherein the global identifier is used to track evolution of device identifiers of the first device over time.

12. The computer-implemented method of claim 1 further comprising:
based at least in part on a determination that the trust score associated with the second device identifier is above the predetermined threshold:
retrieving a trust score associated with the first device identifier; and
increasing the trust score associated with the first device identifier.

13. The computer-implemented method of claim 1, wherein the comparison between the first device identifier and the second device identifier comprises:
comparing the second device identifier and a plurality of the previous device identifiers associated with the first device identifier.

14. The computer-implemented method of claim 1 further comprising:
based at least in part on the determination that the second device identifier evolved from the first device identifier, associating the trust score associated with the second device identifier with the first device identifier.

15. A system comprising:
a processor;
a memory storing computer-executable instruction that, when executed, cause the processor to at least:
receiving a first device identifier associated with a first device during an online transaction;
comparing the first device identifier to a second device identifier to formulate a device similarity score;

determining that the second device identifier evolved from the first device identifier based at least in part on the device similarity score and an indication that one or more parameters associated with the second device identifier have changed;

retrieving a trust score associated with the second device identifier, the trust score indicating a likelihood of a device associated with the second device identifier to engage in a fraudulent activity; and based at least in part on a determination that the trust score associated with the second device identifier is below a predetermined threshold, flagging the online transaction associated with the first device identifier as potentially fraudulent.

16. The system of claim 15, wherein the computer-executable instructions further cause the processor to:

based at least in part on a determination that the trust score associated with the second device identifier is below the predetermined threshold, requesting additional authentication information from the first device.

17. The system of claim 15, wherein the computer-executable instructions further cause the processor to:

based at least in part on the determination that the second device identifier evolved from the first device identifier:
accessing a global identifier associated with the first device identifier and the online transaction; and
associating the second device identifier with the global identifier,
wherein the global identifier is used to track evolution of device identifiers of the first device over time.

18. A non-transitory computer storage medium storing therein computer-executable instructions that, when executed, cause a processor of a computer system to:

receive a first device identifier associated with a first device during an online transaction;

compare the first device identifier to a second device identifier to formulate a device similarity score;

determine that the second device identifier evolved from the first device identifier based at least in part on the device similarity score and an indication that one or more parameters associated with the second device identifier have changed;

retrieve a trust score associated with the second device identifier, the trust score indicating a likelihood of a device associated with the second device identifier to engage in a fraudulent activity; and based at least in part on a determination that the trust score associated with the second device identifier is below a predetermined threshold, flag the online transaction associated with the first device identifier as potentially fraudulent.

19. The non-transitory computer storage medium of claim 18, wherein the computer-executable instructions further cause the computer system to:

based at least in part on a determination that the trust score associated with the second device identifier is below the predetermined threshold, request additional authentication information from the first device.

20. The non-transitory computer storage medium of claim 18, wherein the computer-executable instructions further cause the computer system to:

based at least in part on the determination that the second device identifier evolved from the first device identifier:
access a global identifier associated with the first device identifier and the online transaction; and
associate the second device identifier with the global identifier,
wherein the global identifier is used to track evolution of device identifiers of the first device over time.

* * * * *